United States Patent
Zhang et al.

(10) Patent No.: US 12,107,783 B2
(45) Date of Patent: Oct. 1, 2024

(54) SIGNAL TRANSMISSION METHOD, APPARATUS, DEVICE, AND COMPUTER STORAGE MEDIUM

(71) Applicant: ZTE CORPORATION, Shenzhen (CN)

(72) Inventors: Shujuan Zhang, Shenzhen (CN); Chuangxin Jiang, Shenzhen (CN); Feng Bi, Shenzhen (CN); Xing Liu, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 776 days.

(21) Appl. No.: 17/261,503

(22) PCT Filed: Jul. 19, 2019

(86) PCT No.: PCT/CN2019/096904
§ 371 (c)(1),
(2) Date: Jan. 19, 2021

(87) PCT Pub. No.: WO2020/015757
PCT Pub. Date: Jan. 23, 2020

(65) Prior Publication Data
US 2021/0266128 A1     Aug. 26, 2021

(30) Foreign Application Priority Data
Jul. 19, 2018     (CN) .......................... 201810796374.7

(51) Int. Cl.
*H04L 5/00*     (2006.01)
*H04W 24/10*     (2009.01)

(52) U.S. Cl.
CPC ........... *H04L 5/0048* (2013.01); *H04W 24/10* (2013.01)

(58) Field of Classification Search
CPC ................. H04L 5/0048; H04L 5/0051; H04L 27/261; H04L 25/0226; H04L 25/03184;
(Continued)

(56) References Cited

U.S. PATENT DOCUMENTS

2011/0292823 A1     12/2011  Barbieri et al.
2017/0070903 A1      3/2017  Yamada et al.
(Continued)

FOREIGN PATENT DOCUMENTS

CN     104219724 A     12/2014
CN      10811282 A      6/2018
(Continued)

OTHER PUBLICATIONS

Extended European Search Report for Application No. 19837606.3, dated Apr. 4, 2022, 15 pages.
(Continued)

*Primary Examiner* — Mang Hang Yeung
(74) *Attorney, Agent, or Firm* — Morgan, Lewis & Bockius LLP

(57) ABSTRACT

Provided are a signal transmission method and apparatus, a device, and a computer storage medium. A method for sending a measurement reference signal includes: determining parameter information of the measurement reference signal according to received signaling information and/or a pre-negotiated parameter determination rule; and sending the measurement reference signal according to the determined parameter information.

19 Claims, 13 Drawing Sheets

---

S1301
Determine a correspondence between U resource sets and Q objects according to transmitted fifth signaling information and/or a third parameter determination rule S1302
Transmit a channel or signal according to the determined correspondence

(58) Field of Classification Search
CPC ...... H04L 5/0016; H04W 24/10; H04B 7/022; H04B 7/0617
USPC .......................................................... 370/329
See application file for complete search history.

(56) References Cited

U.S. PATENT DOCUMENTS

| | | | | |
|---|---|---|---|---|
| 2019/0281487 | A1* | 9/2019 | Liu ....................... | H04L 5/0048 |
| 2019/0363810 | A1* | 11/2019 | Luo ....................... | H04J 11/0053 |
| 2020/0287677 | A1* | 9/2020 | Kakishima ............ | H04L 5/0048 |
| 2020/0322113 | A1* | 10/2020 | Gao ...................... | H04B 7/0626 |

FOREIGN PATENT DOCUMENTS

| | | |
|---|---|---|
| CN | 108111282 A | 6/2018 |
| CN | 108111287 A | 6/2018 |
| WO | WO-2018127149 A1 | 7/2018 |

OTHER PUBLICATIONS

Huawei, "Overview consideration on RAN1 IAB aspects", 3GPP Draft; R2-1810695 Overview Consideration on RAN1 IAB Aspects, 3rd Generation Partnership Project (3GPP), Mobile Competence Centre; 650, Route Des Lucioles; F-06921 Sophia-Antipolis Cedex; France, vol. RAN WG2, No. Montreal, Canada; Feb. 7, 2018-Jun. 7, 2018 Jun. 22, 2018 (Jun. 22, 2018), XP051526454, Retrieved from the Internet: URL:http://www.3gpp.org/ftp/tsg%5Fran/WG2%5FRL2/TSGR2%5FAHs/2018%5F07%5FNR/Docs/R2%2D1810695%2Ezip [retrieved on Jun. 22, 2018] p. 2, paragraph section 1.3-p. 3 figure 3.

ZTE, "Discussion on Measurements and RS Design for CLI Mitigation", 3GPP Draft; R1-1707204, 3rd Generation Partnership Project (3GPP), Mobile Competence Centre; 650, Route Des Lucioles; F-06921 Sophia-Antipolis Cedex; France, vol. RAN WG1, May 5, 2017 (May 5, 2017), pp. 1-9, XP051261271, Retrieved from the Internet: URL:http://www.3gpp.org/ftp/tsg_ran/WG1_RL1/TSGR1_89/Docs/ p. 3, paragraph section 3.2(b) p. 4, paragraph section 4.2(b)-p. 8, paragraph section 6.3 figures 1, 2.

ZTE, "UE-to-UE measurement as an enabler 1-15 for CLI mitigation schemes", 3GPP Draft; R1-1715563-6.5.1 Ue-To-Ue Measurement as an Enabler for CLI Mitigation Schemes, 3rd Generation Partnership Project (3GPP), Mobile Competence Centre; 650, Route Des Lucioles; F-06921 SO, vol. RAN WG1, No. Nagoya, Japan; Sep. 18, 2017-Sep. 21, 2017 Sep. 17, 2017 (Sep. 17, 2017), XP051339030, Retrieved from the Internet: URL:http://www.3gpp.org/ftp/Meetings_3GPP_SYNC/RAN1/Docs/ [retrieved on Sep. 17, 2017] p. 3, paragraph section 3.1-p. 5 figure 1.

Canadian Office Action for Application No. 3107122, dated Feb. 2, 2022, 3 pages.

Chinese Office Action for Application No. 201810796374.7, dated Dec. 8, 2021, 15 pages including translation.

International Search Report for Application No. PCT/CN2019/096904, dated Oct. 11, 2019, 4 pages.

Korean Office Action for Application No. 10-2021-7004577, dated Feb. 29, 2024, 13 pages including translation.

3GPP, TS38.211 v15.2.0, NR Physical channels and modulation (Release 15), 3GPP server publication date (Jun. 20, 2018), 96 pages.

* cited by examiner

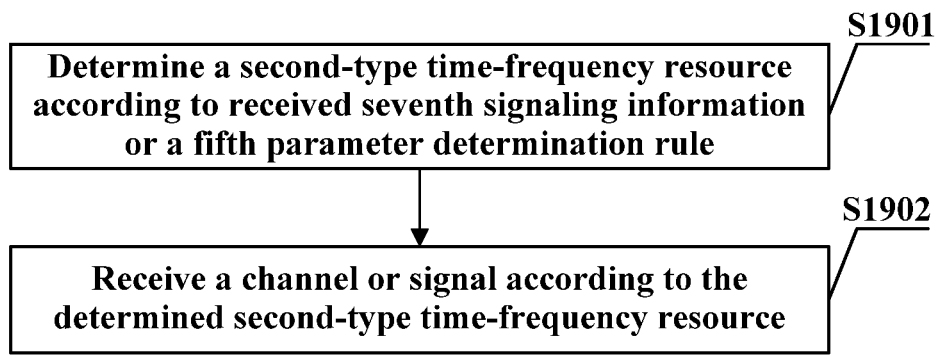
FIG. 19
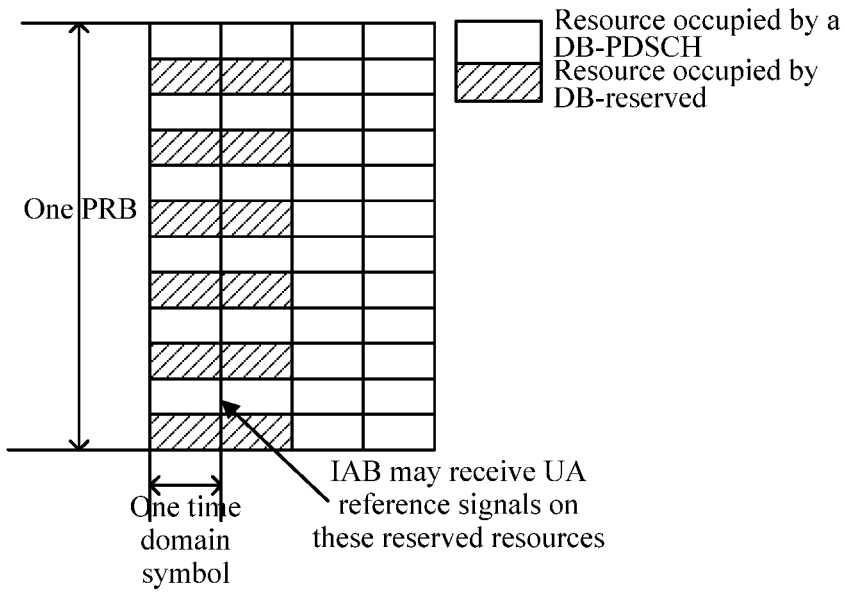
FIG. 20
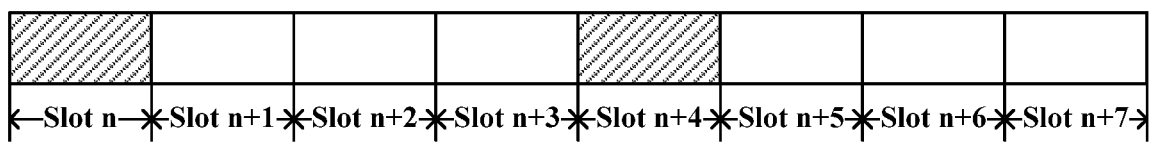
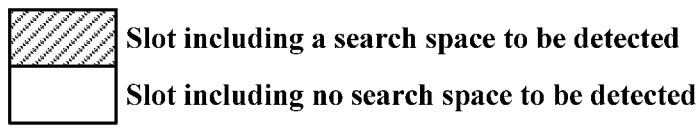
FIG. 21-1

SIGNAL TRANSMISSION METHOD, APPARATUS, DEVICE, AND COMPUTER STORAGE MEDIUM

CROSS-REFERENCE TO RELATED APPLICATIONS

This is a National Stage Application, filed under 35 U.S.C. 371, of International Patent Application No. PCT/CN2019/096904, filed on Jul. 19, 2019, which claims priority to Chinese Patent Application No. 201810796374.7 filed with the CNIPA on Jul. 19, 2018, the disclosure of which is incorporated herein by reference in its entirety.

TECHNICAL FIELD

The present disclosure relates to, but is not limited to, the field of communications and, in particular, relates to, but is not limited to, a signal transmission method and apparatus, a device, and a storage medium.

BACKGROUND

To increase coverage and reduce the deployment costs of operators, an integrated access and backhaul (IAB) node (which may also be referred to as a relay node) is introduced in the related art. There is no wired connection between the IAB node and a core network, and the IAB node is connected to the core network through a wireless backhaul link. The IAB node not only needs to communicate with an upper-level node through the wireless backhaul link but also needs to communicate with a user equipment (UE) under its coverage through a wireless access link or with a lower-level IAB node through another wireless backhaul link. A node with a wired connection to the core network may be referred to as an IAB donor node. To increase spectral efficiency and reduce a delay, a signal over the backhaul link and a signal over the access link are allowed to adopt a spatial division multiplex (SDM) mode at the IAB node. The SDM refers to that signals over two links may occupy the same time/frequency domain resource and are distinguished by beams in spatial domain. The significant features of the SDM are a high spectrum utilization rate and a small delay, but interference cannot be avoided. Therefore, how to reduce the interference between two links through reasonable interference measurement is to be solved.

SUMMARY

The embodiments of the present disclosure provide a signal transmission method and apparatus, a device, and a storage medium, which mainly solve how to reduce interference between links of a communication node that adopt space-division multiplexing.

The present disclosure provides a method for sending a measurement reference signal, which includes: determining parameter information of the measurement reference signal according to received first signaling information and/or a pre-negotiated first parameter determination rule; and sending the measurement reference signal according to the parameter information.

The present disclosure provides a method for receiving a measurement reference signal, which includes: sending first signaling information, where the first signaling information includes parameter information of the measurement reference signal; and receiving the measurement reference signal according to the parameter information.

The present disclosure further provides a method for sending a measurement reference signal, which includes steps described below. A first communication node determines a resource of at least one type of measurement reference signal according to second signaling information received from a second communication node and/or a second parameter determination rule pre-negotiated with the second communication node. The first communication node sends the at least one type of measurement reference signal on the determined resource of the at least one type of measurement reference signal; where the at least one type of measurement reference signal includes a first type of measurement reference signal for interference measurement.

The present disclosure provides a method for receiving a measurement reference signal, which includes steps described below. A second communication node sends second signaling information to a first communication node, where the second signaling information includes information about resources of P types of measurement reference signals. The second communication node receives the P types of measurement reference signals on the resources of the P types of measurement reference signals. The resources of the P types of measurement reference signals include a resource of a measurement reference signal for interference measurement, and P is a positive integer.

The present disclosure further provides a method for receiving a measurement reference signal, which includes a step described below. A first communication node receives third signaling information sent by a second communication node, where the third signaling information includes information about an interference measurement resource. The first communication node receives signals sent by one or more third communication nodes on the interference measurement resource determined according to the information about the interference measurement resource, and/or an intersection between a parameter type included in the information about the interference measurement resource and a parameter type for determining an uplink reference signal pattern is non-empty, and/or the first communication node does not receive a downlink measurement reference signal on the interference measurement resource.

The present disclosure further provides a method for receiving a measurement reference signal, which includes a step described below. A second communication node sends third signaling information to a first communication node, where the third signaling information includes information about an interference measurement resource. The third signaling information is used for instructing the first communication node to receive signals sent by one or more third communication nodes on the interference measurement resource determined according to the information about the interference measurement resource, and/or an intersection between a parameter type included in the information about the interference measurement resource and a parameter type for determining an uplink reference signal pattern is non-empty, and/or the second communication node does not send a downlink signal on the interference measurement resource.

The present disclosure further provides a signal transmission method, which includes steps described below. A correspondence between U resource sets and Q objects is determined according to transmitted fifth signaling information and/or a third parameter determination rule, where the objects are one of the following: spatial transmit filtering parameter sets, quasi co-location reference signal sets, sets of combinations of spatial transmit filtering parameters and quasi co-location reference signals, frequency domain resource sets, reference signal sets, frequency domain resource divisions of A links, power parameter sets, multiplexing mode sets of B links, or sets of combinations of C reference signals over C links. A channel or signal is transmitted according to the correspondence. U and Q are positive integers greater than or equal to 1, A, B and C are positive integers greater than 1, and a resource includes at least one of a time domain resource, a frequency domain resource, or a reference signal resource.

The present disclosure further provides a signal sending method, which includes: determining a first-type time-frequency resource according to received sixth signaling information or a fourth parameter determination rule; and sending a channel or signal according to the determined first-type time-frequency resource; where the channel or signal is unable to occupy the first-type time-frequency resource.

The present disclosure further provides a channel or signal receiving method, which includes: determining a second-type time-frequency resource according to received seventh signaling information or a fifth parameter determination rule; and receiving a channel or signal according to the determined second-type time-frequency resource; where the channel or signal does not occupy the second-type time-frequency resource.

The present disclosure further provides a signaling information transmission method, which includes steps described below. A first communication node sends eighth signaling information to a second communication node and/or the first communication node receives ninth signaling information sent by the second communication node. The eighth signaling information and/or the ninth signaling information include at least one of: information about a first signal set including a reference signal or information about a second signal set including a reference signal. A first channel or signal and at least one signal in the first signal set satisfy a quasi co-location relationship with respect to one or more channel large-scale characteristic parameters; and/or a spatial transmit filtering parameter of a second channel or signal is obtained according to at least one signal in the second signal set; where the first channel or signal is a channel or signal sent by the first communication node to one or more third communication nodes, and the second channel or signal is a channel or signal sent by one or more third communication nodes to the first communication node.

The present disclosure further provides an apparatus for sending a measurement reference signal, which includes a first parameter determination module and a first signal sending module. The first parameter determination module is configured to determine parameter information of the measurement reference signal according to received first signaling information and/or a pre-negotiated first parameter determination rule. The first signal sending module is configured to send the measurement reference signal according to the parameter information.

The present disclosure further provides an apparatus for receiving a measurement reference signal, which includes a second parameter determination module and a third signal receiving module. The second parameter determination module is configured to send first signaling information, wherein the first signaling information comprises parameter information of the measurement reference signal. The third signal receiving module is configured to receive the measurement reference signal according to the parameter information.

The present disclosure further provides an apparatus for sending a measurement reference signal, which is applied to a first communication node and includes a first resource determination module and a second signal sending module.

The first resource determination module is configured to determine resources of P types of measurement reference signals according to second signaling information received from a second communication node and/or a second parameter determination rule pre-negotiated with the second communication node. The second signal sending module is configured to send the P types of measurement reference signals on the resources of the P types of measurement reference signals. The resources of the P types of measurement reference signals include a resource of a measurement reference signal for interference measurement, and P is a positive integer.

The present disclosure further provides an apparatus for receiving a measurement reference signal, which is applied to a second communication node and includes a fourth resource determination module and a fourth signal receiving module. The fourth resource determination module is configured to determine resources of P types of measurement reference signals according to second signaling information sent to a first communication node and/or a second parameter determination rule pre-negotiated with the first communication node. The fourth signal receiving module is configured to receive the P types of measurement reference signals on the determined resources of the P types of measurement reference signals. The resources of the P types of measurement reference signals include a resource of a measurement reference signal for interference measurement, and P is a positive integer.

The present disclosure further provides an apparatus for receiving a measurement reference signal, which is applied to a first communication node and includes a first information receiving module and a first signal receiving module. The first information receiving module is configured to receive third signaling information sent by a second communication node, where the third signaling information includes information about an interference measurement resource. The first signal receiving module is configured to receive signals sent by one or more third communication nodes on the interference measurement resource determined according to the information about the interference measurement resource, and/or an intersection between a parameter type included in the information about the interference measurement resource and a parameter type for determining an uplink reference signal pattern is non-empty.

The present disclosure further provides an apparatus for receiving a measurement reference signal, which is applied to a second communication node and includes a third information sending module. The third information sending module is configured to send third signaling information to a first communication node, where the third signaling information includes information about an interference measurement resource. The third signaling information is used for instructing the first communication node to receive signals sent by one or more third communication nodes on the interference measurement resource determined according to the information about the interference measurement resource, and/or an intersection between a parameter type included in the information about the interference measurement resource and a parameter type for determining an uplink reference signal pattern is non-empty, and/or the second communication node does not send a downlink signal on the interference measurement resource.

The present disclosure further provides a signal transmission apparatus, which includes a determination module and a transmission module. The determination module is configured to determine a correspondence between U resource sets and Q objects according to transmitted fifth signaling information and/or a third parameter determination rule, where the objects are one of the following: spatial transmit filtering parameter sets, quasi co-location reference signal sets, sets of combinations of spatial transmit filtering parameters and quasi co-location reference signals, frequency domain resource sets, reference signal sets, frequency domain resource divisions of A links, power parameter sets, or multiplexing mode sets of B links. The transmission is configured to transmit a channel or signal according to the correspondence. U and Q are positive integers greater than or equal to 1, A and B are positive integers greater than 1, and a resource includes at least one of a time domain resource, a frequency domain resource, or a reference signal resource.

The present disclosure further provides a signal sending apparatus, which includes a second resource determination module and a third signal sending module. The second resource determination module is configured to determine a first-type time-frequency resource according to received sixth signaling information or a fourth parameter determination rule. The third signal sending module is configured to send a channel or signal according to the determined first-type time-frequency resource. The channel or signal is unable to occupy the first-type time-frequency resource.

The present disclosure further provides a channel or signal receiving apparatus, which includes a third resource determination module and a second signal receiving module. The third resource determination module is configured to determine a second-type time-frequency resource according to received seventh signaling information or a fifth parameter determination rule. The second signal receiving module is configured to receive a channel or signal according to the determined second-type time-frequency resource. The channel or signal does not occupy the second-type time-frequency resource.

The present disclosure further provides a signaling information transmission apparatus, which is applied to a first communication node and includes a second information sending module and/or a second information receiving module. The second information sending module is configured to send eighth signaling information to a second communication node. The second information receiving module is configured to receive ninth signaling information from the second communication node. The eighth signaling information and/or the ninth signaling information include at least one of: information about a first signal set including a reference signal or information about a second signal set including a reference signal. A first channel or signal and at least one signal in the first signal set satisfy a quasi co-location relationship with respect to one or more channel large-scale characteristic parameters; and/or a spatial transmit filtering parameter of a second channel or signal is obtained according to at least one signal in the second signal set; where the first channel or signal is a channel or signal sent by the first communication node to one or more third communication nodes, and the second channel or signal is a channel or signal sent by one or more third communication nodes to the first communication node.

The present disclosure further provides a communication node device, which includes a processor, a memory, and a communication bus. The communication bus is configured to implement a communication connection between the processor and the memory. The memory is configured to store one or more first programs, and the processor is configured to perform the one or more first programs to implement steps of the method for sending a measurement reference signal described above. Alternatively, the memory is configured to store one or more second programs, and the processor is configured to perform the one or more second programs to implement steps of the method for receiving a measurement reference signal described above. Alternatively, the memory is configured to store one or more third programs, and the processor is configured to perform the one or more third programs to implement steps of the method for sending a measurement reference signal described above. Alternatively, the memory is configured to store one or more fourth programs, and the processor is configured to perform the one or more fourth programs to implement steps of the method for receiving a measurement reference signal described above. Alternatively, the memory is configured to store one or more fifth programs, and the processor is configured to perform the one or more fifth programs to implement steps of the method for receiving a measurement reference signal described above. Alternatively, the memory is configured to store one or more sixth programs, and the processor is configured to perform the one or more sixth programs to implement steps of the method for receiving a measurement reference signal described above. Alternatively, the memory is configured to store one or more seventh programs, and the processor is configured to perform the one or more seventh programs to implement steps of the signal transmission method described above. Alternatively, the memory is configured to store one or more eighth programs, and the processor is configured to perform the one or more eighth programs to implement steps of the signal sending method described above. Alternatively, the memory is configured to store one or more ninth programs, and the processor is configured to perform the one or more ninth programs to implement steps of the channel or signal receiving method described above. Alternatively, the memory is configured to store one or more tenth programs, and the processor is configured to perform the one or more tenth programs to implement steps of the signaling information transmission method described above.

The present disclosure further provides a computer-readable storage medium. The computer-readable storage medium is configured to store one or more first programs, where the one or more first programs are executable by one or more processors to implement steps of the method for sending a measurement reference signal described above. Alternatively, the computer-readable storage medium is configured to store one or more second programs, where the one or more second programs are executable by one or more processors to implement steps of the method for receiving a measurement reference signal described above. Alternatively, the computer-readable storage medium is configured to store one or more third programs, where the one or more third programs are executable by one or more processors to implement steps of the method for sending a measurement reference signal described above. Alternatively, the computer-readable storage medium is configured to store one or more fourth programs, where the one or more fourth programs are executable by one or more processors to implement steps of the method for receiving a measurement reference signal described above. Alternatively, the computer-readable storage medium is configured to store one or more fifth programs, where the one or more fifth programs are executable by one or more processors to implement steps of the method for receiving a measurement reference signal described above. Alternatively, the computer-readable storage medium is configured to store one or more sixth programs, where the one or more sixth programs are executable by one or more processors to implement steps of the method for receiving a measurement reference signal described above. Alternatively, the computer-readable storage medium is configured to store one or more seventh programs, where the one or more seventh programs are executable by one or more processors to implement steps of the signal transmission method described above. Alternatively, the computer-readable storage medium is configured to store one or more eighth programs, where the one or more eighth programs are executable by one or more processors to implement steps of the signal sending method described above. Alternatively, the computer-readable storage medium is configured to store one or more ninth programs, where the one or more ninth programs are executable by one or more processors to implement steps of the channel or signal receiving method described above. Alternatively, the computer-readable storage medium is configured to store one or more tenth programs, where the one or more tenth programs are executable by one or more processors to implement steps of the signaling information transmission method described above.

According to the signal transmission method and apparatus, the device, a system, and the storage medium provided by the embodiments of the present disclosure, the parameter information of the measurement reference signal may be determined according to received signaling information and/or a pre-negotiated parameter determination rule, and the measurement reference signal is sent according to the determined parameter information to perform the measurement. In some disclosure examples, the measurement reference signal, which includes, but is not limited to, the first type of measurement reference signal for interference measurement, may be sent for effectively measuring the interference between links of the communication node that adopt the space-division multiplexing, so that the communication node can send or receive signals on resources with low interference in a space-division multiplexing mode, thereby reducing the mutual interference between links that adopt the space-division multiplexing and ensuring a communication quality.

Other features of the present disclosure and the corresponding beneficial effects are set forth later in the description, and it is to be understood that at least part of the beneficial effects become apparent from the description of the present disclosure.

BRIEF DESCRIPTION OF DRAWINGS

FIG. 1-2 is a schematic diagram one of a detail sketch of FIG. 1-1;

FIG. 1-3 is a schematic diagram two of a detail sketch of FIG. 1-1;

FIG. 2-1 is a flowchart of a method for sending a measurement reference signal according to embodiment one of the present disclosure;

FIG. 2-2 is a flowchart of a method for receiving a measurement reference signal according to embodiment one of the present disclosure;

FIG. 3-1 is a flowchart of a method for sending a measurement reference signal according to embodiment two of the present disclosure;

FIG. 3-2 is a flowchart of a method for receiving a measurement reference signal according to embodiment two of the present disclosure;

FIG. 15-1 is a schematic diagram illustrating that different time domain resources correspond to different spatial transmit filtering parameter sets according to embodiment seven of the present disclosure;

FIG. 15-2 is a schematic diagram illustrating that different time domain resources correspond to different frequency domain resource divisions according to embodiment seven of the present disclosure;

FIG. 15-3 is a schematic diagram of different frequency domain resource divisions of A links according to embodiment seven of the present disclosure;

FIG. 15-4 is a schematic diagram illustrating that different time domain resources correspond to different available frequency domain resource sets over UB/DB according to embodiment seven of the present disclosure;

FIG. 15-5 is a schematic diagram illustrating that different time domain resources correspond to different available reference signal sets over UB/DB according to embodiment seven of the present disclosure;

FIG. 15-6 is a schematic diagram illustrating that M time domain resources appear in turn according to embodiment seven of the present disclosure;

FIG. 19 is a flowchart of a channel or signal receiving method according to embodiment nine of the present disclosure;

FIG. 20 is a schematic diagram of an SRS pattern occupied by a reserved resource or a rate matching resource over a DB link according to embodiment nine of the present disclosure;

FIG. 21-1 is a schematic diagram one in which a resource type is determined according to a relationship between a predetermined threshold and an interval between a resource and a control channel closest to the resource according to embodiment eleven of the present disclosure;

FIG. 21-2 is a schematic diagram two in which a resource type is determined according to a relationship between a predetermined threshold and an interval between a resource and a control channel closest to the resource according to embodiment eleven of the present disclosure;

FIG. 21-3 is a schematic diagram of different resource divisions of A links corresponding to different resource types according to embodiment eleven of the present disclosure;

FIG. 22-1 is a structural diagram of an apparatus for sending a measurement reference signal according to embodiment fourteen of the present disclosure;

FIG. 22-2 is a structural diagram of an apparatus for receiving a measurement reference signal according to embodiment fourteen of the present disclosure;

FIG. 23-1 is a structural diagram of an apparatus for sending a measurement reference signal according to embodiment fifteen of the present disclosure;

FIG. 23-2 is a structural diagram of an apparatus for receiving a measurement reference signal according to embodiment fifteen of the present disclosure;

FIG. 24-1 is a structural diagram of an apparatus for receiving a measurement reference signal according to embodiment sixteen of the present disclosure;

FIG. 24-2 is a structural diagram of another apparatus for receiving a measurement reference signal according to embodiment sixteen of the present disclosure;

DETAILED DESCRIPTION

Embodiments of the present disclosure are described below in detail in conjunction with the drawings and specific implementations. It is to be understood that the embodiments described herein are merely intended to explain the present disclosure and not to limit the present disclosure.

Embodiment One

Figure 1:
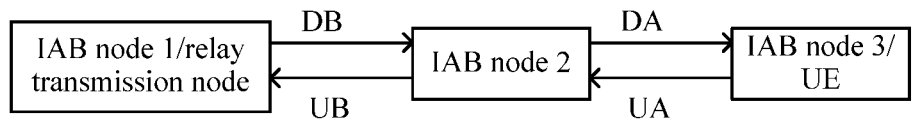
FIG. 1-1 is a structural diagram illustrating connections of a relay node according to embodiment one of the present disclosure.

In the related art, interference exists between two links of a communication node that adopt space division multiplexing (SDM). For example, as shown in FIG. 1-1, a relay node 1 (IAB node 1) or a relay transmission node (IAB donor node) is connected to a relay node 2 (IAB node 2), and the relay node 2 is connected to a relay node 3 (IAB node 3) or a UE under the relay node 2. As shown in FIG. 1-1, an SDM mode may be used between an uplink backhaul (UB) signal and a downlink access (DA) signal, and the SDM mode may also be used between a downlink backhaul (DB) signal and an uplink access (UA) signal. The significant features of the SDM are a high spectrum utilization rate and a small delay, but the interference cannot be avoided. How to reduce the interference between the two links (e.g., UB and DA, or DB and UA) through reasonable interference measurement can be solved in the embodiment. Moreover, considering that a channel environment between two IAB nodes of backhaul links is mainly a direct path, this embodiment may also improve the spectrum utilization rate by a scheme of enhancing a reference signal pattern.

In FIG. 1-1, an access link includes a communication link between the IAB node 2 and the IAB node 3 and may also include a communication link between the IAB node 2 and the UE covered by the IAB node 2. For example, FIG. 1-1 may be decomposed into FIG. 1-2 and FIG. 1-3. The communication link between the IAB node 2 and the IAB node 3 is referred to as the backhaul link, and the communication link between the IAB node 2 and the UE is referred to as the access link. For ease of description and understanding, the following description in this embodiment adopts the manner in FIG. 1-1, where the backhaul link is for the communication between an IAB node and an upper-level communication node, and the access link is for the communication between the IAB node and a lower-level communication node or a UE covered by the IAB node. In FIG. 1-1, the scheduling of the UB/DB link may be controlled by the IAB node 1/IAB donor node, and the scheduling of the UA and DA links may be controlled by the IAB node 2.

Figures 1, 2:
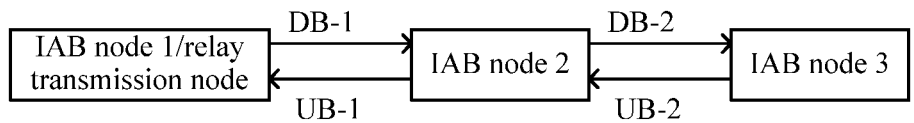

In view of the interference between links of the communication node that adopt the SDM, this embodiment provides a method for sending a measurement reference signal. As shown in FIG. 2-1, the method includes steps described below.

In S201, parameter information of a measurement reference signal is determined according to received first signaling information and/or a pre-negotiated first parameter determination rule.

In S202, the measurement reference signal is sent according to the determined parameter information, to perform the corresponding measurement.

Correspondingly, this embodiment may further include a method for receiving a measurement reference signal. As shown in FIG. 2-2, the method includes steps described below.

In S203, first signaling information is sent. The first signaling information includes parameter information of a measurement reference signal.

In S204, the measurement reference signal is received according to the parameter information.

In this embodiment, when interference measurement needs to be performed, the measurement signal generated and sent according to the process shown in FIG. 2-1 in some disclosure examples may include a measurement reference signal for interference measurement, which may also be referred to as an interference measurement reference signal. The interference measurement reference signal may be an uplink interference measurement reference signal which is used for effectively measuring the interference between links of the communication node that adopt SDM, so that the communication node can send or receive signals on resources with low interference in the SDM mode, thereby reducing the mutual interference between links that adopt the SDM and ensuring a communication quality.

In this embodiment, channel measurement may also be performed as needed in addition to the interference measurement. Therefore, in some disclosure examples, the measurement signal generated and sent according to the process shown in FIG. 2-1 may include a measurement reference signal for channel measurement, which may also be referred to as a channel measurement reference signal. Which types of measurement reference signals are included may be flexibly configured as needed.

In some disclosure examples, the measurement reference signal, which includes but is not limited to the measurement reference signal for interference measurement, may be sent to be used for effectively measuring the interference between the links of the communication node that adopt the SDM, so that the communication node can send or receive signals on the resources with low interference in the SDM mode, thereby reducing the mutual interference between links that adopt the SDM and ensuring the communication quality.

In order to improve the spectrum utilization rate, this embodiment may also improve the spectrum utilization rate by configuring a pattern of the measurement reference signal. Therefore, the parameter information determined in the above step may include, but is not limited to, at least one of: a lowest subcarrier index or a highest subcarrier index in each group of M groups of subcarriers occupied by the measurement reference signal in one physical resource block; a lowest time domain symbol index or a highest time domain symbol index in each group of N groups of time domain symbols occupied by the measurement reference signal in one time unit; information about a code division multiplexing type of a port of the measurement reference signal; density information p of the measurement reference signal; information about a physical resource block set corresponding to the measurement reference signal; information about a code division multiplexing length corresponding to one code division multiplexing group included in the measurement reference signal; a multiplexing length of one code division multiplexing group, included in the measurement reference signal, in time domain; a multiplexing length of one code division multiplexing group, included in the measurement reference signal, in frequency domain; the number of ports of the measurement reference signal; a total number of combs corresponding to the measurement reference signal; a comb offset corresponding to the measurement reference signal; a non-empty intersection between a parameter type set included in the parameter information and a parameter type set required for determining a pattern of a downlink measurement reference signal; the number of time domain symbols included in one group of time domain symbols occupied by the measurement reference signal; a hopping parameter of a sequence group or a sequence number; or parameter information for sequence hopping. M and N are positive integers.

To facilitate the confirmation and selection of a parameter, the parameter information in this embodiment may also include selection information of a parameter type set. The parameter type set includes at least one of a first parameter type set or a second parameter type set. The first parameter type set includes parameter information required for determining a pattern of a first-type measurement reference signal, and the second parameter type set includes parameter information required for determining a pattern of a second-type measurement reference signal.

It is to be understood that the first-type measurement reference signal and the second-type measurement reference signal in this embodiment may adopt the same pattern or different patterns, which may be specifically and flexibly selected according to application scenarios.

In an example, the second-type measurement reference signal adopts a channel state information reference signal (CSI-RS) pattern, and thus the second parameter type set may include, but is not limited to, at least one of the following parameters: a lowest subcarrier index or a highest subcarrier index in each group of M groups of subcarriers occupied by an uplink measurement reference signal in one physical resource block, where each group of the M groups of subcarriers may include consecutive subcarriers or may be a group of code division multiplexed subcarriers; a lowest time domain symbol index or a highest time domain symbol index in each group of N groups of time domain symbols occupied by an uplink measurement reference signal in one time unit, where each group of the N groups of time domain symbols may include consecutive time domain symbols or may be a group of code division multiplexed time domain symbols; information about a code division multiplexing type of a port of an uplink measurement reference signal; density information of an uplink measurement reference signal; information about a physical resource block set corresponding to an uplink measurement reference signal; or the number of ports of an uplink measurement reference signal.

In another example, the first-type measurement reference signal adopts a sounding reference signal (SRS) pattern, and thus the first parameter type set may include, but is not limited to, at least one of the following parameters: a lowest subcarrier index or a highest subcarrier index in each group of M groups of subcarriers occupied by an uplink measurement reference signal in one physical resource block, where each group of the M groups of subcarriers may include consecutive subcarriers or may be a group of code division multiplexed subcarriers; a lowest time domain symbol index or a highest time domain symbol index in each group of N groups of time domain symbols occupied by an uplink measurement reference signal in one time unit, where each group of the N groups of time domain symbols may include consecutive time domain symbols or may be a group of code division multiplexed time domain symbols; the number of ports of an uplink measurement reference signal; the total number of combs corresponding to an uplink measurement reference signal; a comb offset corresponding to an uplink measurement reference signal; a multiplexing length of one code division multiplexing group, included in an uplink measurement reference signal, in time domain; or a multiplexing length of one code division multiplexing group, included in an uplink measurement reference signal, in frequency domain.

In an example of this embodiment, when the preceding parameter information includes the following information, and the following information may satisfy at least one of the following characteristics that: the information about the code division multiplexing type includes at least one of: no code division multiplexing; code division multiplexing with a frequency domain length of 2; code division multiplexing with a frequency domain length of 2, a time domain length of 2, and a total length of 4; or code division multiplexing with a frequency domain length of 2, a time domain length of 4, and a total length of 8; the density information p represents an average number of subcarriers occupied by each port of the measurement reference signal in each physical resource; the density information p represents that the pattern of the measurement reference signal is repeated once in the frequency domain every 1/p physical resource blocks; the density information p includes {0.5, 1, 3}; each group of the M groups of subcarriers is a group of subcarriers corresponding to one code division multiplexing group in the frequency domain; each group of the M groups of subcarriers is a group of subcarriers consecutive in the frequency domain; subcarriers in each group of the M groups of subcarriers are distributed at equal intervals; the number of subcarriers included in each group of the M groups of subcarriers belongs to {1, 2}; each group of the N groups of time domain symbols is a group of time domain symbols corresponding to one code division multiplexing group in the time domain; each group of the N groups of time domain symbols is a group of time domain symbols consecutive in the time domain; time domain symbols in each group of the N groups of time domain symbols are distributed at equal intervals; the information about the physical resource block set corresponding to the measurement reference signal includes information about a starting physical resource index and the number of physical resource blocks; the physical resource block set corresponding to the measurement reference signal includes non-consecutive physical resource blocks; the measurement reference signal occupies physical resource blocks in the physical resource block set at equal intervals; the total number of combs corresponding to the measurement reference signal belongs to {1, 2, 4, 8, 12, a*12, b*4}, where a and b are positive integers; or a maximum value of the comb offset corresponding to the measurement reference signal belongs to {0, 1, 3, 7, 11, a*12−1, b*4−1}.

In an example, the pattern of the first-type measurement reference signal may also be an uplink reference signal pattern. An uplink reference signal in this embodiment includes, but is not limited to, at least one of an uplink measurement reference signal, an uplink demodulation reference signal, an uplink phase-tracking reference signal (PTRS), or an uplink preamble sequence. In an example, the pattern of the second-type measurement reference signal may be a downlink reference signal pattern. A downlink reference signal in this embodiment includes, but is not limited to, at least one of a downlink measurement reference signal, a downlink demodulation reference signal, a downlink phase-tracking reference signal (PTRS), or a downlink synchronization signal.

In some disclosure examples, the first-type measurement reference signal may be a measurement reference signal received by a first communication node over an uplink and sent by one or more third communication nodes, and the second-type measurement reference signal is a measurement reference signal sent by the first communication node to one or more third communication nodes over a downlink. Alternatively, the first-type measurement reference signal may be a measurement reference signal received by a second communication node over an uplink and sent by one or more fourth communication nodes, and the second-type measurement reference signal may be a measurement reference signal sent by the second communication node to one or more fourth communication nodes over a downlink.

In some examples, a determination result of whether the measurement reference signal is an uplink reference signal over a backhaul link is associated with the selection information of the parameter type set. For example, in response to determining that the measurement reference signal is the uplink reference signal over the backhaul link, the pattern of the uplink reference signal adopts the CSI-RS pattern, and generally, an uplink reference signal over an access link adopts the SRS pattern. Alternatively, in response to determining that the measurement reference signal is the uplink reference signal over the backhaul link, the pattern of the uplink reference signal may be selected between the CSI-RS pattern and the SRS pattern. Here, the backhaul link refers to a wireless link between two base stations and the access link refers to a link between a base station and a terminal.

A port number set, to which information about a number of ports included in the measurement reference signal belongs, is associated with the selection information of the parameter type set. In a case where the parameter type set is selected as a parameter set required for determining the CSI-RS pattern, the number of ports of the uplink measurement reference signal may be greater than 4. In a case where the parameter type set is selected as a parameter set required for determining the SRS pattern, the number of ports of the uplink measurement reference signal cannot be greater than 4.

The selection information of the parameter type set is associated with information about a sequence type used by the measurement reference signal. For example, in a case where the parameter type set is a parameter set required for determining the CSI-RS pattern, all sequence types of an uplink measurement reference signal are PN sequences; in a case where the parameter type set is a parameter set required for determining the SRS pattern, all sequence types of an uplink measurement reference signal are ZC sequences. The PN sequence and the ZC sequence may refer to a pseudo-random sequence in protocol 38.211, or the ZC sequence may refer to the ZC sequence in protocol 38.211.

The number of physical resource blocks occupied by the measurement reference signal is associated with the selection information of the parameter type set.

In this embodiment, an association between two pieces of information includes, but is not limited to, that one piece of information (referred to as second information) may be obtained according to the other piece of information (referred to as first information), and/or that the first information may be obtained according to the second information, and/or that a specific value of the first information and a specific value of the second information cannot appear at the same time, etc.

The first communication node is a communication node that sends the measurement reference signal, and the second communication node is a communication node that sends the first signaling information. For example, in an example, the first communication node may be an IAB node 2 in FIG. 1-1, the second communication node may be an IAB node 1 or an IAB donor node in FIG. 1-1, the third communication node may be an IAB node 3 or a UE in FIG. 1-1, and the fourth communication node may also be the IAB node 3 or the UE in FIG. 1-1.

In an example of this embodiment, the first communication node determines the parameter information of the measurement reference signal according to the first signaling information sent by the second communication node and/or the first parameter determination rule pre-negotiated with the second communication node; and the first communication node sends the measurement reference signal to the second communication node; where the parameter information determined by the first communication node includes at least one of: parameter information required for determining a pattern of a first-type reference signal or type selection information of a first-type reference signal. A type of a reference signal in this embodiment may include, but is not limited to, at least one of the downlink demodulation reference signal, the downlink measurement reference signal, the downlink phase-tracking reference signal, or the downlink synchronization signal. The first-type reference signal satisfies at least one of the following characteristics: the first-type reference signal is a reference signal sent by the second communication node; the first-type reference signal is a reference signal sent by the first communication node; or the first-type reference signal is a reference signal sent by the second communication node or the first communication node over a downlink.

In an example of this embodiment, the sent measurement reference signal may satisfy at least one of the following characteristics: the sent measurement reference signal is a measurement reference signal sent over an uplink; a time domain symbol where the sent measurement reference signal is located is one or more time domain symbols in one time unit; the pattern of the sent measurement reference signal is the CSI-RS pattern; the pattern of the sent measurement reference signal is the downlink reference signal pattern; a resource of the sent measurement reference signal occupies X groups of consecutive subcarriers in one physical resource block; the number of subcarriers occupied by a port of the sent measurement reference signal in one physical resource block includes {0.5, 1, 2}; or the number of ports of the measurement reference signal included in a resource of the sent measurement reference signal belongs to {1, 2, 4, 8, 12, 16, 24, 32}; where X is a positive integer.

In an example, the sent measurement reference signal may satisfy at least one of the following characteristics: the measurement reference signal and a first channel or signal (i.e., a first channel or a first signal) occupy different subcarriers on the same time domain symbol; in a case where the measurement reference signal and a first channel or signal occupy the same time domain symbol, the first channel or signal is unable to occupy a subcarrier occupied by the measurement reference signal; or in a case where a subcarrier occupied by the measurement reference signal overlaps with a subcarrier occupied by a first channel or signal, a priority between the measurement reference signal and the first channel or signal may be determined according to the first signaling information and/or the pre-negotiated first parameter determination rule. The first channel or signal is a channel or signal sent by the first communication node, and the first communication node in this embodiment may be the communication node that sends the measurement reference signal.

In this embodiment, the first channel includes, but is not limited to, at least one of a control channel or a data channel, and the first signal includes, but is not limited to, at least one of a reference signal or a random access signal.

In an example of this embodiment, at least one of the following information is associated with whether the first channel or signal and the measurement reference signal are able to be simultaneously sent on the same time domain symbol: the first signaling information; whether the pattern of the measurement reference signal belongs to a predetermined pattern type (which, for example, includes, but is not limited to, the CSI-RS pattern or the SRS pattern); whether transform precoding is enabled in response to sending the measurement reference signal and/or the first channel or signal, where for example, the enabled transform precoding adopts a transmit waveform of discrete Fourier transform-spread-OFDM (DFT-SC-OFDM) and the disabled transform precoding may adopt a transmit waveform of cyclic prefix-OFDM (CP-OFDM); whether the measurement reference signal is the uplink reference signal over the backhaul link; whether the measurement reference signal occupies subcarriers at equal intervals in one physical resource block; the sequence type used by the measurement reference signal; whether the measurement reference signal is the measurement reference signal for interference measurement or the measurement reference signal for channel measurement; or whether a use of the measurement reference signal belongs to a predetermined use set, where for example, a use in the use set includes, but is not limited to, "beam management", "antenna switching", "a code book", and "a non code book". The first channel or signal is a channel or signal sent by the first communication node, and the first communication node is a communication node that sends the measurement reference signal.

The first channel may include at least one of a control channel or a data channel, and the first signal may include at least one of a reference signal or a random access signal.

For ease of understanding, this embodiment is described below by using a specific application scenario as an example.

In an example of this application scenario, the uplink reference signal pattern includes a downlink CSI-RS pattern. For example, the uplink reference signal may be a CSI-RS pattern in New-Radio (NR), where the CSI-RS pattern may be obtained according to the following formula (1) in an example:

$$a_{k,l}^{(p,\mu)} = \beta_{CSIRS} w_f(k') \cdot w_t(l') \cdot r_{l,n_{l,f}}(m') \qquad (1)$$

$$m' = \lfloor n\alpha \rfloor + k' + \left\lfloor \frac{\bar{k}\rho}{N_{sc}^{RB}} \right\rfloor$$

$$k = nN_{sc}^{RB} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0, 1, \ldots$$

where, k',l',$\bar{l}$,$\hat{k}$,$\rho$ in formula (1) are obtained according to the following Table 1, k' represents a local subcarrier index in a group of subcarriers occupied by a CSI-RS, l' represents a local time domain symbol index in a group of time domain symbols occupied by the CSI-RS, $\bar{l}$ represents a subcarrier index of a starting subcarrier in the group of subcarriers occupied by the CSI-RS in one PRB, $\bar{k}$ represents a time domain symbol index of a starting time domain symbol in the group of time domain symbols occupied by the CSI-RS in one slot, and ρ represents density information of the CSI-RS. In this example, the density information of the CSI-RS may represent the average number of resource elements (REs) occupied by each CSI-RS port in each PRB, and/or the density information represents that the CSI-RS pattern is repeated once every 1/ρ PRBs, and/or the density information represents that the CSI-RS has an RE in one PRB every 1/ρ PRB groups. $N_{SC}^{RB}$ represents the number of subcarriers included in one PRB, and $\beta_{CSI-RS}$ represents power of the CSI-RS. $w_t(l')$, $w_f(k')$ represent an orthogonal code of time domain code division multiplexing and an orthogonal code of frequency domain code division multiplexing, respectively. $w_t(l')$,$w_f(k')$ corresponding to different code division multiplexing types indicated in Table 1 may be obtained by referring to Table 2 to Table 5. It is to be understood that the manner of obtaining parameter values in the above example is only an example, and it is not limited to the description in the above example.

Therefore, in this embodiment, to determine the CSI-RS pattern, the base station may notify the following parameters via Radio Resource Control (RRC) signaling (or another signaling): frequencyDomainAllocation (for acquiring $\{k_0, k_1, k_2, k_3, k_4, k_5\}$ in Table 1), nrofPorts (the number of ports of the CSI-RS), firstOFDMSymbolInTimeDomain (for notifying $l_0$ in Table 1), firstOFDMSymbolInTimeDomain2 (for notifying $l_1$ in Table 1), cdm-Type (the code division multiplexing type in Table 1), density (for notifying the density information in Table 1), freqBand (a set of consecutive physical resource blocks (PRBs) corresponding to the CSI-RS, where the CSI-RS occupies REs in all PRBs in the PRB set, or the CSI-RS occupies REs in PRBs distributed at equal intervals in the PRB set).

In Row1 of Table 1, the CSI-RS occupies a group of subcarriers distributed at equal intervals, that is, $\{k_0, k_0+4, k_0+8\}$. In Row6 of Table 1, the CSI-RS occupies four groups of subcarriers, where a first group is $\{k_0, k_0+1\}$, a second group is $\{k_1, k_1+1\}$, a third group is $\{k_2, k_2+1\}$, and a fourth group is $\{k_3, k_3+1\}$.

TABLE 1

| Row (Pattern index) | Ports X (Number of ports of the CSI-RS) | Density ρ (Average number of REs occupied by each port in each PRB) | CDMtype cdm-Type (Port multiplexing type) | $(\bar{k}, \bar{l})$ (Index of a starting subcarrier in the group of subcarriers occupied by the CSI-RS, index of a starting time domain symbol in the group of time domain symbols occupied by the CSI-RS) | CDM group index j (Index of the CDM group) | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0) (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_0, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_1, l_0 + 1), (k_2, l_0 + 1),$ $(k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1),$ $(k_1, l_1), (k_2, l_1), (k_3, l_1)$ | 0, 1, 2, 3, 4, 5, 6, 7 | 0, 1 | 0, 1 |

TABLE 1-continued

| Row (Pattern index) | Ports X (Number of ports of the CSI-RS) | Density ρ (Average number of REs occupied by each port in each PRB) | CDMtypecdm-Type (Port multiplexing type) | (k̄, l̄) (Index of a starting subcarrier in the group of subcarriers occupied by the CSI-RS, index of a starting time domain symbol in the group of time domain symbols occupied by the CSI-RS) | CDM group index j (Index of the CDM group) | k' | l' |
|---|---|---|---|---|---|---|---|
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

TABLE 2

| Index | $w_f(k')$ | $w_t(l')$ |
|---|---|---|
| 0 | 1 | 1 |

Table 2 shows sequences $w_f(k')$ and $w_t(l')$ when cdm-Type is "no CDM".

TABLE 3

| Index | $w_f(k')$ | $w_t(l')$ |
|---|---|---|
| 0 | [+1 +1] | 1 |
| 1 | [+1 −1] | 1 |

Table 3 shows the sequences $w_f(k')$ and $w_t(l')$ when cdm-Type is "FD-CDM2".

TABLE 4

| Index | $w_f(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

Table 4 shows the sequences $w_f(k')$ and $w_t(l')$ when cdm-Type is "CDM4".

TABLE 5

| Index | $w_f(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Table 5 shows the sequences $w_f(k')$ and $w_t(l')$ when cdm-Type is "CDM8".

Therefore, to enable the uplink reference signal to adopt the CSI-RS pattern, configuration information of the uplink reference signal (that is, the measurement reference signal) may include one or more of the following parameter information: frequencyDomainAllocation (information about a subcarrier index of a starting subcarrier, in each group of M groups of subcarriers occupied by the uplink measurement reference signal, in one PRB, that is, the lowest subcarrier index in each group of the M groups of subcarriers occupied by the uplink measurement reference signal in one physical resource block), nrofPorts (the number of ports of the uplink reference signal which may be, for example, any one of {1, 2, 4, 8, 12, 16, 24}), firstOFDMSymbolInTimeDomain (a time domain symbol index of a starting time domain symbol, in one group of time domain symbols occupied by the uplink reference signal, in one slot, that is, $l_0$ in Table 1), firstOFDMSymbolInTimeDomain2 (a time domain symbol index of a starting time domain symbol, in another group of time domain symbols occupied by the uplink reference signal, in one slot, that is, h in Table 1), cdm-Type (a multiplexing type of a port of the uplink reference signal), density (density information of the uplink reference signal), or freqBand (a PRB set of consecutive PRBs corresponding to the uplink reference signal; the uplink reference signal occupies REs in all PRBs in the PRB set, or the uplink reference signal occupies REs in PRBs distributed at equal intervals in the PRB set).

As analyzed above, in some examples, the uplink reference signal (i.e., the measurement reference signal) may select from the SRS pattern and the CSI-RS pattern so that the configuration information of the uplink reference signal includes selection information of a reference signal pattern. In response to selecting the SRS pattern, the configuration information of the uplink reference signal includes the following parameter information: nrofSRS-Ports (the number of ports of the uplink reference signal), transmissionComb (a comb-shaped offset corresponding to the uplink reference signal, which includes the total number of combs and the comb offset), startPosition (an index of a starting time domain symbol in the group of time domain symbols occupied by the uplink reference signal), nrofSymbols (the number of time domain symbols included in the group of time domain symbols occupied by the uplink reference signal), repetitionFactor (a time domain frequency-hopping unit or a repetition factor of the uplink reference signal, that is, a frequency domain position occupied by the uplink reference signal hops once every repetitionFactor time domain symbols), freqDomainPosition (information about a starting PRB occupied by the uplink reference signal), freqDomainShift (position information of a starting PRB of a bandwidth corresponding to a root in a tree structure occupied by the uplink reference signal, or an offset of the bandwidth, corresponding to the root in the tree structure occupied by the uplink reference signal, relative to a predetermined frequency domain position), freqHopping (a parameter related to frequency-hopping), groupOrSequenceHopping (a hopping parameter of a sequence group or a sequence number), or sequenceId (information about a sequence hopping parameter).

The selection information of the reference signal pattern described above may also be referred to as the selection information of the parameter type set. For example, it can be seen according to the above example that in an example, the first parameter type set includes the parameters required for determining the CSI-RS pattern {frequencyDomainAllocation, nrofPorts, firstOFDMSymbolInTimeDomain, firstOFDMSymbolInTimeDomain2, cdm-Type, density, freqBand}, and the second parameter type set includes the parameters for determining the SRS pattern {nrofSRS-Ports, transmissionComb, startPosition, nrofSymbols, repetitionFactor, freqDomainPosition, freqDomainShift, freqHopping, groupOrSequenceHopping, sequenceId}, where an intersection between the two parameter type sets is non-empty, for example, the two parameter type sets both include information about the number of ports. It is to be understood that, in some disclosure examples, an empty intersection between the two parameter type sets is not excluded. For example, the same parameter type in the two parameter sets is directly notified as a common item and not included in the two parameter type sets.

In the case where the pattern of the uplink reference signal (i.e., the measurement reference signal) may be selected between an SRS and the CSI-RS, another implementation of this embodiment is that information about the number of ports of the uplink reference signal included in a resource(s) of the uplink reference signal is associated with the selection information of the reference signal pattern.

As illustrated above, an association between two pieces of information in this embodiment may represent that one piece of information may be obtained according to the other piece of information or that a specific value of one piece of information and a specific value of the other piece of information cannot appear at the same time. For example, it is agreed that, in a case where the number of ports of the uplink reference signal is less than a predetermined value (for example, 4), the uplink reference signal adopts the SRS pattern; otherwise, the CSI-RS pattern is adopted; and/or in a case where the number of ports belongs to a predetermined set, the CSI-RS pattern cannot be adopted, and in a case where the number of ports does not belong to the predetermined set, a selection may be made between the CSI-RS pattern and the SRS pattern. A specific association (that is, the determination rule) may be flexibly determined according to specific application scenarios.

In a case where the uplink reference signal can adopt the CSI-RS pattern, whether a sequence used by the uplink reference signal is the pseudo-random sequence or a low-PAPR sequence needs to be determined. The generation of these two sequences, may specifically refer to protocol 38.211. In an example, one manner is to adopt the pseudo-random sequence permanently, and another manner may be that the base station or the IAB node 1/IAB donor node in FIG. 1-1 notifies the UE which sequence should be used via signaling.

In a case where the number of PRBs occupied by the uplink measurement reference signal is associated with the selection information of the parameter type set, for example, the number of PRBs occupied by the uplink measurement reference signal is less than a predetermined value, only the SRS pattern can be adopted; otherwise, a selection may be made between the SRS pattern and the CSI-RS pattern.

In an example of this application scenario, in a case where the uplink reference signal (i.e., the measurement reference signal which may specifically be the uplink measurement reference signal in this case) may select between the CSI-RS pattern and the SRS pattern, an association between pattern selection information of the uplink reference signal and sequence selection information of the uplink reference signal may be established. For example, the uplink reference signal is the SRS pattern adopting the low-PAPR sequence; the uplink reference signal is the CSI-RS pattern adopting the pseudo-random sequence permanently; it is agreed that the uplink reference signal is the SRS pattern not adopting the pseudo-random sequence; or the uplink reference signal is the CSI-RS pattern, and a selection may be made between the two sequences.

In another example of this application scenario, it may be set that whether the uplink reference signal is uplink backhaul reference is associated with the pattern selection information of the uplink reference signal. For example, in a case where the uplink reference signal is an uplink reference signal over the access link (in this case, the access link may refer to the link between the base station and the terminal in FIG. 1-3 or may be the link between the IAB node 2 and the IAB node 3/UE in FIG. 1-1), only the SRS pattern can be adopted; in a case where the uplink reference signal is the uplink reference signal over the backhaul link (here the backhaul link may refer to the link between IAB nodes in FIG. 1-2 or may be the link between the IAB node 2 and the upper-level node, i.e., the IAB donor/IAB node 1 in FIG. 1-1), only the CSI-RS pattern can be adopted or a selection may be made between the CSI-RS pattern and the SRS pattern; and the like. A specific association rule may also be flexibly selected according to specific application scenarios.

In addition, it is to be understood that only the CSI-RS pattern in NR is used as an example of the above-mentioned pattern of the downlink measurement reference signal, but it is to be understood that the pattern is not limited to the CSI-RS pattern in NR and may also be CSI-RS patterns in Long Term Evolution (LTE) or other systems.

The manner illustrated in the above example is that the pattern of the uplink reference signal (i.e., the uplink measurement reference signal) may adopt the pattern of the downlink measurement reference signal. However, it is to be understood that this embodiment does not exclude that the pattern of the uplink measurement reference signal may be the downlink reference signal pattern, where the downlink reference signal includes, but is not limited to, one or more of the downlink measurement reference signal, the downlink demodulation reference signal, the downlink synchronization signal, or the downlink phase-tracking signal.

Embodiment Two

Figures 1, 2, 3:
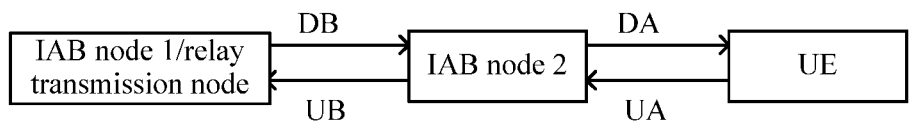
Figures 1, 2:
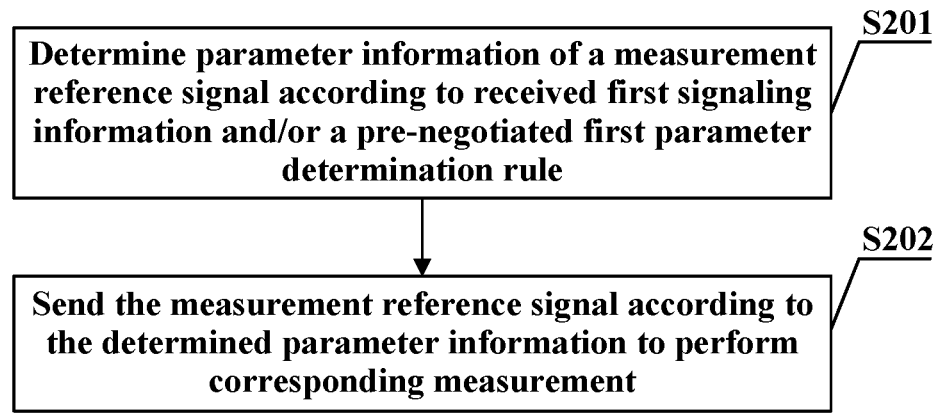
Figure 2:
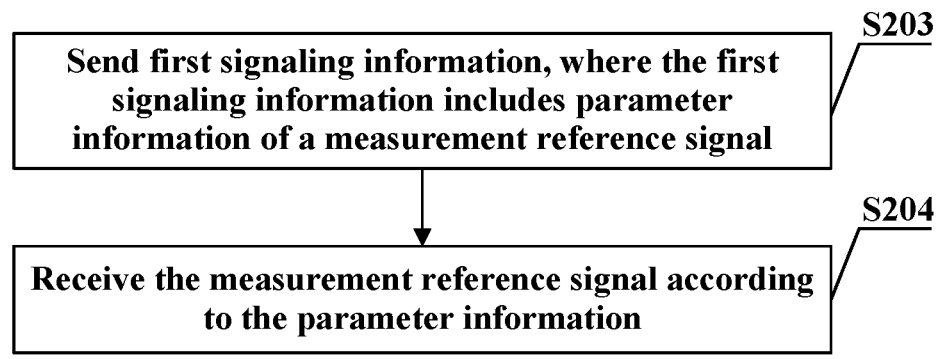
Figures 1, 3:
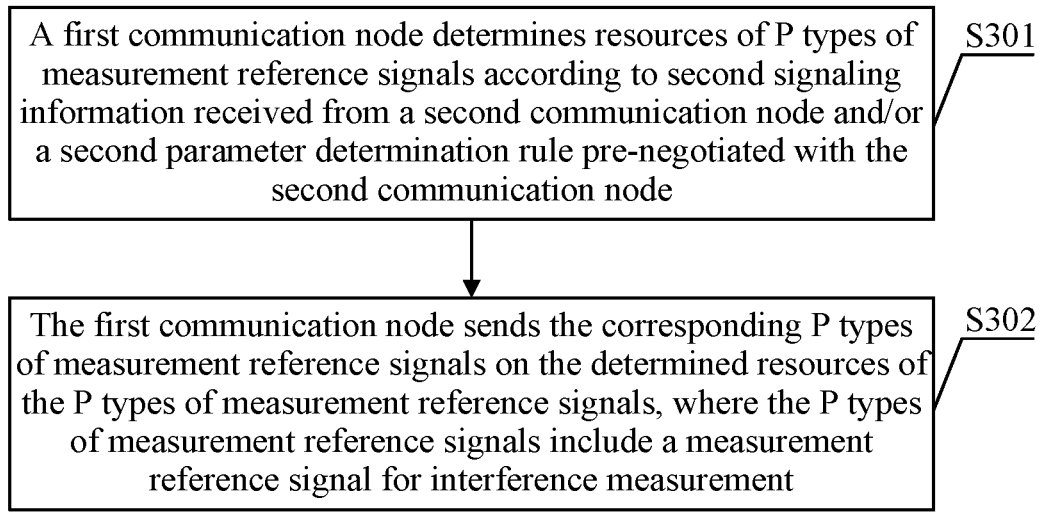
Figures 2, 3:
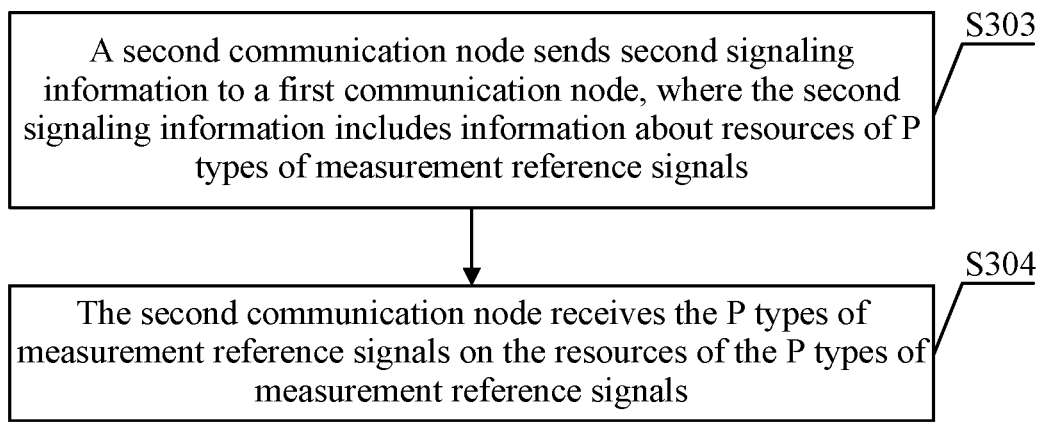

For ease of understanding, this embodiment is described below based on sending the measurement reference signal illustrated in embodiment one described above and by using an example in which an interference measurement reference signal included in the measurement reference signal is sent. An exemplary method for sending a measurement reference signal includes steps described below, as shown in FIG. 3-1.

In S301, a first communication node determines resources of P types of measurement reference signals according to second signaling information received from a second communication node and/or a second parameter determination rule pre-negotiated with a second communication node.

In S302, the first communication node sends the corresponding P types of measurement reference signals on the determined resources of the P types of measurement reference signals.

In this embodiment, P is a positive integer greater than or equal to 1. In this embodiment, the first communication node determines a resource of at least one type of measurement reference signal according to the second signaling information received from the second communication node and/or the second parameter determination rule pre-negotiated with the second communication node. For example, a resource of a measurement reference signal for interference measurement is at least determined in this embodiment. The P types of measurement reference signals sent in S302 include the measurement reference signal for interference measurement.

Correspondingly, this embodiment may further include a method for receiving a measurement reference signal. As shown in FIG. 3-2, the method includes steps described below.

In S303, a second communication node sends second signaling information to a first communication node, where the second signaling information includes information about resources of P types of measurement reference signals.

In S304, the second communication node receives the P types of measurement reference signals on the resources of the P types of measurement reference signals.

As illustrated above, the resources of the P types of measurement reference signals may include the resource of the measurement reference signal for interference measurement.

In an example of this embodiment, the method for receiving the measurement reference signal may further include that: the second communication node sends channel state report information to the first communication node; and/or the second communication node sends resource information to the first communication node, where the resource information is information about a resource occupied by channel state report information.

The channel state report information may satisfy, but is not limited to, at least one of the following characteristics: the channel state report information is obtained based on the P types of measurement reference signals; the channel state report information includes a signal-to-interference-plus-noise ratio (SINR); the channel state report information includes information about a performance difference between two types of the P types of measurement reference signals; the channel state report information is feedback information for an uplink channel state; a correspondence exists between the channel state report information and the P types of measurement reference signals; or the channel state report information is sent by the second communication node to the first communication node on a downlink channel or signal.

In an example of this embodiment, the determined resources of the P types of measurement reference signals may also include a resource of a measurement reference signal for channel measurement, and the first communication node may also send the measurement reference signal for channel measurement on the determined resource of the measurement reference signal for channel measurement.

For example, in an example, the first communication node may send request information to the second communication node, and the request information may include the measurement reference signal for interference measurement and/or the measurement reference signal for channel measurement, so as to perform the interference and/or channel measurement.

Through the interference measurement, the second communication node may know the interference caused by a signal, which is sent by the first communication node, over a DA link, to a signal on a UB link, so as to coordinate a multiplexing mode and a resource division between the UB link and the DA link. For example, the UB link and the DA link may occupy resources in an SDM mode on resources with low interference. Alternatively, the second communication node notifies the first communication node of a measurement result so that the first communication node decides how to match and combine SDM beam pairs of UB and DA, so as to reduce the mutual interference of UB and DA that adopt SDM.

In this example, the P types of measurement reference signals satisfy at least one of the following characteristics: the P types of measurement reference signals further include the measurement reference signal for channel measurement, where the resource of the measurement reference signal for channel measurement is used for the channel measurement; the P types of measurement reference signals correspond to a same spatial receive filtering parameter; the P types of measurement reference signals correspond to different spatial transmit filtering parameters; each type of the P types of measurement reference signals has corresponding configuration information of a spatial transmit filtering parameter; information about spatial transmit filtering parameters of the P types of measurement reference signals is associated with type information of the P types of measurement reference signals; or the P types of measurement reference signals are uplink measurement reference signals.

In an example of this embodiment, the measurement reference signal for interference measurement satisfies at least one of the following characteristics: configuration information of the measurement reference signal for interference measurement carries no configuration information of a spatial transmit filtering parameter; a signal between the first communication node and the second communication node carries no spatial filtering parameter of the interference measurement reference signal; a spatial filtering parameter of the measurement reference signal for interference measurement cannot be acquired according to a signal between the first communication node and the second communication node; an intersection between a spatial filtering parameter of the measurement reference signal for interference measurement and spatial filtering parameters in a predetermined spatial filtering parameter set is empty, where each of the spatial filtering parameters in the predetermined spatial filtering parameter set is associated with one signal between the first communication node and the second communication node; a spatial filtering parameter of the measurement reference signal for interference measurement is obtained according to a spatial transmit filtering parameter of a first reference signal sent by the first communication node to one or more third communication nodes; parameter information of the measurement reference signal for interference measurement is the same as parameter information of a second reference signal sent by the first communication node to one or more third communication nodes; a parameter type for determining the measurement reference signal for interference measurement is the same as a parameter type for determining a third reference signal sent by the first communication node to one or more third communication nodes; the first communication node sends a fourth reference signal to one or more third communication nodes on the resource of the measurement reference signal for interference measurement; the measurement reference signal for interference measurement is used for measuring interference of a signal, which is sent by the first communication node to one or more third communication nodes, reaching the second communication node; the measurement reference signal for interference measurement is used by the second communication node to measure interference; or the measurement reference signal for interference measurement is used by the second communication node to measure interference of a first-type signal, which is sent by the first communication node, reaching the second communication node. A control channel resource group where control signaling for scheduling the first-type signal is located and a control channel resource group where the second signaling information is located are two different control channel resource groups, and/or a frequency domain bandwidth where the first-type signal is located and a frequency domain bandwidth where the second signaling information is located are two different frequency domain bandwidths, and/or a frequency domain bandwidth where the first-type signal is located and a frequency domain bandwidth where a channel or signal scheduled by the second signaling information is located are two different frequency domain bandwidths.

Each of the first reference signal, the second reference signal, the third reference signal and the fourth reference signal may be at least one of a downlink measurement reference signal, a downlink demodulation reference signal, a downlink phase-tracking reference signal, or a synchronization signal.

In an example of this embodiment, the first communication node may also receive channel state report information sent by the third communication node, where a channel measurement resource of the channel state report information includes a resource of the fourth reference signal and/or the channel measurement resource of the channel state report information includes the resource of the measurement reference signal for interference measurement.

In an example of this embodiment, the second signaling information in S301 may include at least one of the following parameter information: a lowest subcarrier index or a highest subcarrier index in each group of M groups of subcarriers occupied by the measurement reference signal for interference measurement in one physical resource block; a lowest time domain symbol index or a highest time domain symbol index in each group of N groups of time domain symbols occupied by the measurement reference signal for interference measurement in one time unit; information about a physical resource block set occupied by the measurement reference signal for interference measurement; information about a code division multiplexing type of a port of the measurement reference signal for interference measurement; density information p of the measurement reference signal for interference measurement; information about a code division multiplexing length corresponding to one code division multiplexing group included in the measurement reference signal for interference measurement; a multiplexing length of one code division multiplexing group included in the measurement reference signal for interference measurement in frequency domain; a multiplexing length of one code division multiplexing group included in the measurement reference signal for interference measurement in time domain; information about a pattern type of the measurement reference signal for interference measurement, where the pattern type includes at least a first-type pattern and a second-type pattern; selection information of a parameter type set corresponding to the measurement reference signal for interference measurement; a total number of combs corresponding to the measurement reference signal for interference measurement; or a comb offset corresponding to the measurement reference signal for interference measurement; where M and N are positive integers.

In an example of this embodiment, when the preceding parameter information includes the following information, the following information satisfies at least one of the following characteristics: the information about the code division multiplexing type includes at least one of: no code division multiplexing; code division multiplexing with a frequency domain length of 2; code division multiplexing with a frequency domain length of 2, a time domain length of 2, and a total length of 4; or code division multiplexing with a frequency domain length of 2, a time domain length of 4, and a total length of 8; the density information p represents an average number of subcarriers occupied by each port of the measurement reference signal in each physical resource; the density information p represents that a pattern of the measurement reference signal is repeated once in the frequency domain every 1/p physical resource blocks; the density information p includes {0.5, 1, 3}; each group of the M groups of subcarriers is a group of subcarriers corresponding to one code division multiplexing group in the frequency domain; each group of the M groups of subcarriers is a group of subcarriers consecutive in the frequency domain; subcarriers in each of the M groups of subcarriers are distributed at equal intervals; the number of subcarriers included in each group of the M groups of subcarriers belongs to {1, 2}; each group of the N groups of time domain symbols is a group of time domain symbols corresponding to one code division multiplexing group in the time domain; each group of the N groups of time domain symbols is a group of time domain symbols consecutive in the time domain; time domain symbols in each group of the N groups of time domain symbols are distributed at equal intervals; the information about the physical resource block set corresponding to the measurement reference signal includes information about a starting physical resource index and the number of physical resource blocks; the physical resource block set corresponding to the measurement reference signal includes non-consecutive physical resource blocks; the measurement reference signal occupies physical resource blocks in the physical resource block set at equal intervals; the total number of combs corresponding to the measurement reference signal belongs to {1, 2, 4, 8, 12, a*12, b*4}, where a and b are positive integers, for example, a is a positive integer greater than or equal to 2 and b is a positive integer that makes b*4 greater than a*12; or a maximum value of the comb offset corresponding to the measurement reference signal belongs to {0, 1, 3, 7, 11, a*12−1, b*4−1}.

In an example of this embodiment, the first-type pattern is an SRS pattern; the first-type pattern is an uplink reference signal pattern; the second-type pattern is a CSI-RS pattern; the second-type pattern is a synchronization signal pattern; or the second-type pattern is a downlink reference signal pattern.

In an example of this embodiment, after sending the uplink measurement reference signals to the second communication node, the first communication node may further receive the channel state report information sent by the second communication node.

In an example, the channel state report information may satisfy at least one of the following characteristics: the channel state report information is obtained based on the measurement reference signals; the channel state report information includes the signal to interference plus noise ratio (SINR); the channel state report information includes the information about the performance difference between two types of the P types of measurement reference signals, where P is a positive integer greater than 1; the channel state report information is the feedback information for the uplink channel state; the correspondence exists between the channel state report information and the P types of measurement reference signals; or the channel state report information is received by the first communication node on the downlink channel or signal and sent by the second communication node.

In an example of this embodiment, the channel state report information sent by the second communication node may satisfy at least one of the following characteristics: the channel state report information includes information about a performance difference between a second measurement reference signal and the measurement reference signal for interference measurement both of which reach the second communication node; the channel state report information corresponds to the measurement reference signal for channel measurement and the measurement reference signal for interference measurement, where the measurement reference signal for channel measurement includes CC measurement reference signal resources, and the measurement reference signal for interference measurement includes CI measurement reference signal resources, where CC is a positive integer greater than or equal to 1 and CI is a positive integer less than or equal to CC; in a case where a sent measurement reference signal includes a predetermined type in the P types, the first communication node receives channel state report information corresponding to the measurement reference signal; in a case where a sent measurement reference signal does not include a predetermined type in the P types, the first communication node does not receive channel state report information corresponding to the measurement reference signal; type information of a measurement reference signal is associated with whether the first communication node receives the channel state report information sent by the second communication node; in a case where a sent measurement reference signal includes the measurement reference signal for interference measurement, the first communication node receives the channel state report information sent by the second communication node; or in a case where a sent measurement reference signal does not includes the measurement reference signal for interference measurement, the first communication node does not receive the channel state report information sent by the second communication node.

In an example of this embodiment, the method may further include that the first communication node sends request information to the second communication node, where the request information includes information about the measurement reference signal for interference measurement.

For example, in an example, the first communication node may be an IAB node 2 in FIG. 1-1, the second communication node may be an IAB node 1 or an IAB donor node in FIG. 1-1, the third communication node may be an IAB node 3 or a UE in FIG. 1-1, and the fourth communication node may also be the IAB node 3 or the UE in FIG. 1-1.

Embodiment Three

For ease of understanding, this embodiment is described based on the embodiments described above in conjunction with an exemplary measurement process in an application scenario shown in FIG. 1-1.

In this embodiment, a measurement reference signal includes an uplink measurement reference signal, and resources of the uplink measurement reference signal include an interference measurement resource. For example, in FIG. 1-1, when signals over UB and DA are SDM, the method illustrated in embodiment one or two described above needs to be adopted to measure the interference of a signal over DA on a signal over UB so that the IAB node 2 can send the signal over DA by using an appropriate beam when UB and DA adopt SDM. For example, the IAB node 2 and the IAB node 1/IAB donor node select a DA beam with minimum interference on UB to send the signal over DA. Alternatively, according to a measurement result, the IAB node 1/IAB donor node allocates a transmit beam of UB and/or a transmit beam of DA, and/or a situation of pairing between transmit beams of UB and transmit beams of DA, and/or a multiplexing mode or a resource occupation situation of allocating between UB and DA.

Figure 4:
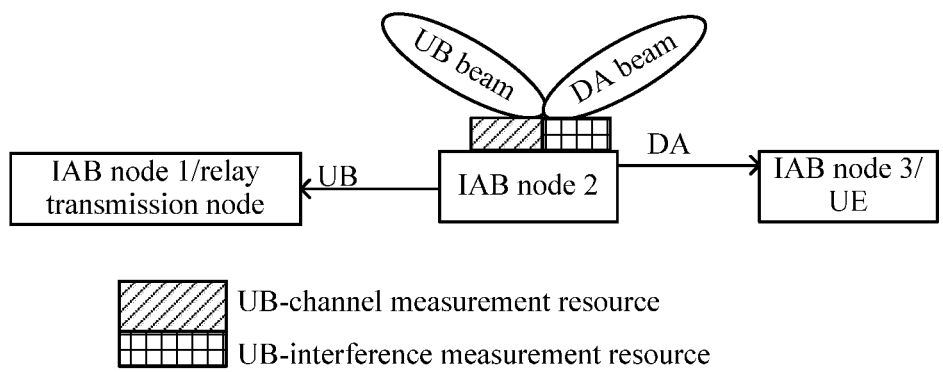
FIG. 4 is a schematic diagram in which an uplink interference measurement resource and an uplink channel measurement resource are introduced according to embodiment three of the present disclosure.

In an example, as shown in FIG. 4, the IAB donor node/IAB node 1 allocates an SRS resource 1 for the IAB donor node/IAB node 1 to measure a channel between the IAB node 2 and the IAB donor/IAB node 1 (that is, the channel through which a signal sent by the IAB node 2 and with the IAB donor node/IAB node 1 as a target node goes, i.e., a UB channel) and an SRS resource 2 for the IAB donor node/IAB node 1 to measure the interference between the IAB node 2 and the IAB donor node/IAB node 1 (that is, to measure a channel through which a signal, which is sent by the IAB node 2 to the IAB node 3/UE as the target node and reaches the IAB donor node/IAB node 1, goes, i.e., to measure the interference caused by a DA signal, which is sent by the IAB node 2 to the IAB node 3/UE, on a UB signal. The IAB node 2 may send a DA measurement reference signal to the IAB node 3/UE on the SRS resource 2.

On the side of the IAB donor node/IAB node 1, the SRS resource 1 is used for channel measurement, the SRS resource 2 is used for interference measurement, and the IAB donor node/IAB node 1 may confirm the interference between beams according to parameters such as signal strength of the received measurement reference signals.

Correspondingly, on the side of the IAB node 3/UE, the SRS resource 2 is used for channel measurement, and the SRS resource 1 is used for interference measurement. Configuration information of the SRS resource 1 and the SRS resource 2 may be delivered by the IAB donor node/IAB node 1 to the IAB node 3/UE or may be delivered by the IAB node 2 to the IAB node 3/UE after the IAB node 2 receives allocation information from the IAB donor node/IAB node 1.

As illustrated in embodiment one or two, a pattern of a measurement reference signal in the SRS resource 1 may be fixed to be an SRS pattern or selected between the SRS pattern and a CSI-RS pattern.

A pattern of a measurement reference signal in the SRS resource 2 may also be fixed to be the SRS pattern or the CSI-RS pattern, or may be selected between the SRS pattern and the CSI-RS pattern. At this time, when the IAB node 2 allocates an interference measurement resource to the IAB node 3/UE, the IAB node 2 may indicate that a reference signal pattern of the interference measurement resource may be the SRS pattern.

The pattern of the measurement reference signal in the SRS resource 2 may also be fixed to be the CSI-RS pattern. At this time, an interference measurement resource allocated by the IAB donor/IAB node 1 to the IAB node 2 adopts the CSI-RS pattern.

The pattern of the measurement reference signal in the SRS resource 2 may be selected between the CSI-RS pattern and the SRS pattern so that a selection may be made between the SRS pattern and the CSI-RS pattern when the IAB node 2 allocates a downlink interference measurement resource to the IAB node 3/UE. As illustrated in embodiment one or two, a pattern selection may also be referred to as a selection of a parameter type set. When an SRS is used as the interference measurement resource, the SRS may also be referred to as an NZP-SRS. The interference measurement resource over an uplink (or a UB link) allocated by the IAB donor node/IAB node 1 to the IAB node 2 may also be selected between the CSI-RS pattern and the SRS pattern.

Herein, the SDM of two links represents that time domain resources/frequency domain resources occupied by the two links overlap, and signals over the two links are distinguished by beams in spatial domain.

In the measurement process, one piece of channel feedback information (i.e., channel state report information) may correspond to multiple channel measurement resources and one interference measurement resource. Of course, it may also be set as needed that one piece of channel feedback information corresponds to one channel measurement resource and one interference measurement resource.

In this example, it may be set that feedback information of an uplink channel corresponds to multiple channel measurement resources and one interference measurement resource.

Figure 5:
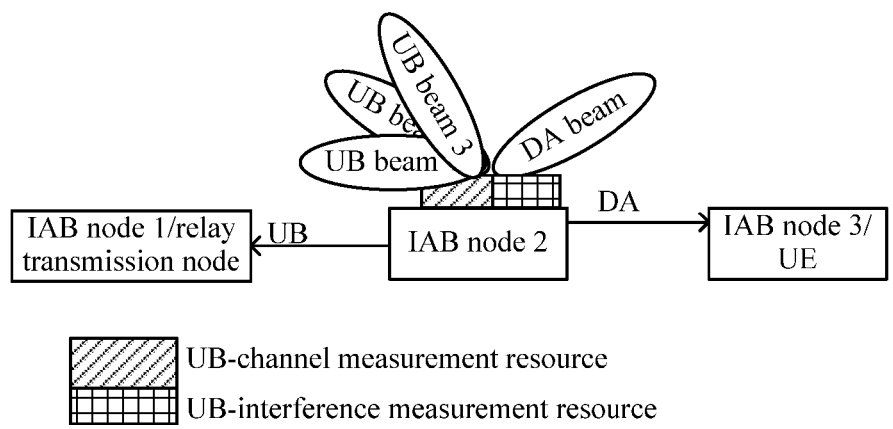
FIG. 5 is a schematic diagram one in which an uplink measurement report corresponds to multiple channel measurement resources and one interference measurement resource according to embodiment three of the present disclosure.

For example, as shown in FIG. 5, through uplink measurement, available beams for the UB link are beams in FIG. 5. These beams may be dynamically allocated by the IAB donor node/IAB node 1 to data channel transmissions over UB/control channel transmissions over UB/measurement reference signals over UB. When UB and DA adopt the SDM, a beam of DA, which causes relatively small interference to all candidate beams of UB, may be selected according to the measurement result.

Figure 6:
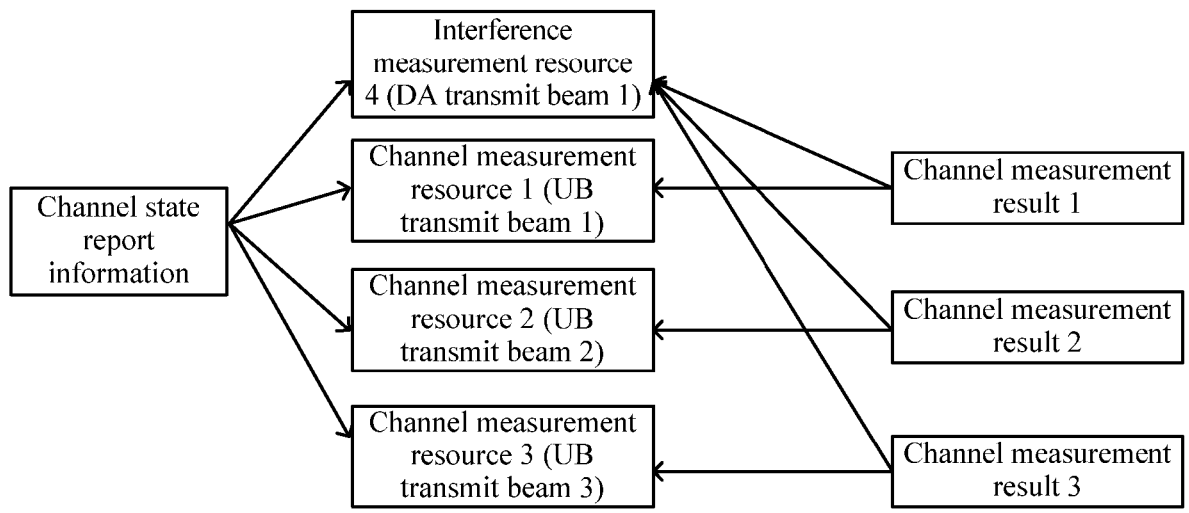
FIG. 6 is a schematic diagram two in which an uplink measurement report corresponds to multiple channel measurement resources and one interference measurement resource according to embodiment three of the present disclosure.
Figure 7:
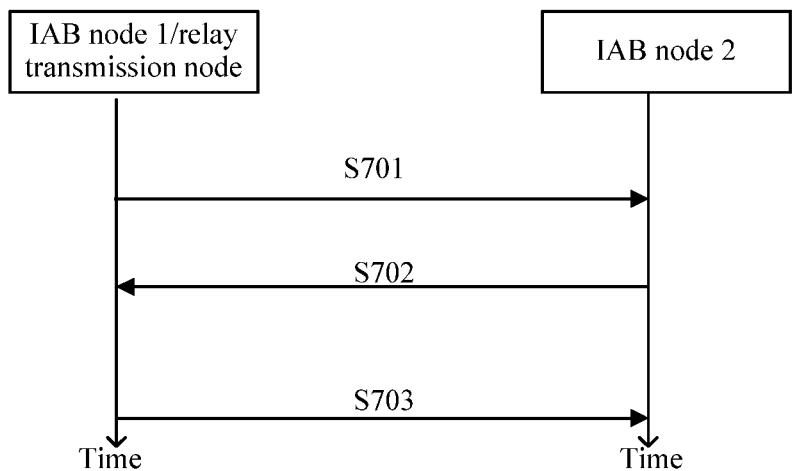
FIG. 7 is a flowchart of a configuration process in which an uplink measurement report corresponds to multiple channel measurement resources and one interference measurement resource according to embodiment three of the present disclosure.

Further, as shown in FIGS. 6 and 7, the IAB donor node/IAB node 1 allocates three channel measurement resources {resource 1, resource 2, resource 3} and one interference measurement resource {resource 4} to the IAB node 2. The IAB node 2 sends measurement reference signals on the three channel measurement resources over a UB link by using candidate transmit beams of the UB link in sequence, and the IAB node 2 sends a measurement reference signal on the interference measurement resource over the UB link by using a candidate transmit beam corresponding to the DA link. (The interference measurement resource over the UB link and a channel measurement resource over the DA link may be the same measurement resource, so it may be said that the interference measurement resource is sent over the UB link or the DA link.) The IAB donor node/IAB node 1 obtains in sequence a channel measurement result 1 (such as CQI1 or SINR1) corresponding to {channel measurement resource 1, interference measurement resource 4}, a channel measurement result 2 (such as CQI2 or SINR2) corresponding to {channel measurement resource 2, interference measurement resource 4}, and a channel measurement result 3 (such as CQI3 or SINR3) corresponding to {channel measurement resource 3, interference measurement resource 4} and feeds a channel measurement result, which is from {channel measurement result 1, channel measurement result 2, channel measurement results 3} and satisfies a predetermined characteristic, back to the IAB node 2 over a downlink.

A configuration process, as shown in FIG. 7, includes steps described above.

In S701, the IAB donor node/IAB node 1 allocates uplink channel measurement feedback information corresponding to {channel measurement resources 1 to 3, interference measurement resource 4} via downlink control signaling.

In S702, the IAB node 2 sends the channel measurement resources 1 to 3 and the interference measurement resource 4 over the uplink.

In S703, the IAB donor/IAB node 1 feeds back uplink channel measurement results over the downlink.

It is to be understood that the channel measurement result satisfying the predetermined characteristic may be one of {channel measurement result 1, channel measurement result 2, channel measurement result 3} with the worst performance and is fed back to the IAB node 2. For example, if the channel measurement results are CQIs, the IAB donor node/IAB node 1 feeds back one of {CQI1, CQI2, CQI3} with the lowest performance to the IAB node 2. Alternatively, if the channel measurement results are SINRs, the IAB donor node/IAB node 1 feeds back the lowest SINR value in {SINR1, SINR2, SINR3} to the IAB node 2. The maximum value of the multiple channel measurement results may be notified to the IAB node 2 as needed. After obtaining these channel measurement results, the IAB node 2 knows the situation of the interference caused by the beam of DA to the candidate beams of UB. For example, if the IAB donor/IAB node 1 feeds back the minimum value of the multiple measurement results, the IAB node 2 knows the minimum value of interference caused by the beam of DA to each candidate beam of UB, and then when the minimum value exceeds a predetermined threshold, the IAB node 2 knows that the beam of DA and the UB signal(s) cannot adopt the SDM mode.

In an example, the multiple channel measurement results may be notified to the IAB node 1, an optimal value of the channel measurement results is fed back to the IAB node 2 by an absolute value and other channel measurement results are fed back to the IAB node 2 by relative values.

When the IAB donor node/IAB node 1 allocates the preceding channel measurement resources {measurement reference signal resource 1 to measurement reference resource 3}, the IAB donor node/IAB node 1 may configure spatialRelationInfo for each measurement reference signal resource, that is, for configuring information about a spatial transmit filtering parameter used by the IAB node 2 to send the uplink measurement reference signal. For example, spatialRelationInfo of the SRS resource 1 may be configured to be CSI-RS/SSB sent by the IAB donor node/IAB node 1 to the IAB node 2, and the IAB node 2 obtains a spatial filtering parameter for sending the SRS resource 1 according to a spatial receive filtering parameter of the received CSI-RS/SSB. Alternatively, the spatialRelationInfo of the SRS resource 1 may also be configured to be an SRS resource 10 sent by the IAB node 2 to the IAB donor node/IAB node 1, and the IAB node 2 obtains a spatial transmit filtering parameter of the measurement reference signal on the SRS resource 1 according to a spatial transmit filtering parameter for sending the SRS resource 10. In this embodiment, one spatial filtering parameter is obtained according to another spatial filtering parameter in a way that the two spatial filtering parameters are the same or in another way that one spatial filtering parameter may be obtained according to the other spatial filtering parameter which may be not the same or may be slightly adjusted according to a specific application scenario.

In this embodiment, the method for determining a spatial filtering parameter of the preceding interference measurement resource 4 includes, but is not limited to, several examples described below.

Determination method one: The IAB node 2 and the IAB donor node/IAB node 1 agree (i.e., negotiate) that when a type of the uplink measurement reference signal is the interference measurement resource, the IAB node 2 itself decides the spatial filtering parameter for sending the uplink measurement reference signal.

Determination method two: The IAB node 2 and the IAB donor node/IAB node 1 agree that when the type of the uplink measurement reference signal is the interference measurement resource, the IAB node 2 cannot send the uplink measurement reference signal using spatial filtering parameter that is the same as any one of spatial filtering parameters in a predetermined spatial filtering parameter set, where the predetermined spatial filtering parameter set includes at least one of: a spatial filtering parameter configured in a Physical Uplink Control Channel (PUCCH), a spatial filtering parameter associated with an SRS resource in an SRS set that is used for a code book and associated with a Physical Uplink Shared Channel (PUSCH), a spatial filtering parameter associated with an SRS resource in an SRS set that is used for a non-code book and associated with a PUSCH, or a spatial filtering parameter configured in a PUSCH. Each spatial filtering parameter in the predetermined spatial filtering parameter set corresponds to one SSB/CSI-RS/SRS, that is, each spatial filtering parameter in the predetermined spatial filtering parameter set is associated with one reference signal between the IAB node 2 and the IAB donor/IAB node 1.

Determination method three: When the IAB donor node/IAB node 1 configures an uplink interference measurement reference signal resource for the IAB node 2, spatialRelationInfo (the specific meaning of this parameter may refer to the description of protocol 38.331 or protocol 38.214) of the uplink interference measurement reference signal resource is configured to be a downlink reference signal sent by the IAB node 2 to the IAB node 3/UE. In an embodiment, information about the downlink reference signal may be notified by the IAB node 2 to the IAB donor node/IAB node 1.

Determination method four: When the IAB donor node/IAB node 1 configures the uplink interference measurement reference signal resource for the IAB node 2, the spatialRelationInfo of the uplink interference measurement reference signal resource is configured to be a type of reference signal rather than a specific reference signal. This type of reference signal is downlink reference signals sent by the IAB node 2 to the IAB node 3/UE over the DA link, and specifically which downlink reference signal sent by the IAB node 2 to the IAB node 3/UE is used is an implementation of the IAB node 2.

Determination method five: The IAB donor node/IAB node 1 and the IAB node 2 agree that when the IAB donor node/IAB node 1 configures the uplink interference measurement reference signal resource for the IAB node 2, the spatialRelationInfo of the uplink interference measurement reference signal resource is a type of reference signal rather than a specific reference signal. This type of reference signal is the downlink reference signals sent by the IAB node 2 to the IAB node 3/UE over the DA link, and specifically which downlink reference signal sent by the IAB node 2 to the IAB node 3/UE is used is an implementation of the IAB node 2.

When the IAB node 2 sends measurement reference signals on {resource 1~resource 4}, for the IAB node 3/UE in FIG. 1-1 (that is, a user under the coverage of the IAB node 2 or a user who accesses the IAB node 2, i.e., a third communication node), one piece of downlink channel state feedback information corresponds to one channel measurement resource and three interference measurement resources, that is, the channel measurement resource is the resource 4 and the interference measurement resources are {resource 1~resource 3}. The IAB node 3/UE obtains three downlink channel measurement results {downlink measurement result 1, downlink measurement result 2, downlink measurement result 3} in sequence based on {channel measurement resource 4, interference measurement resource 1}, {channel measurement resource 4, interference measurement resource 2}, and {channel measurement resource 4, interference measurement resource 3} and feeds back a downlink measurement result satisfying a predetermined characteristic among three downlink measurement results to the IAB node 2 in an uplink channel or feeds back all the three downlink measurement results to the IAB node 2. In an embodiment, a maximum value may be fed back using an absolute value and other values are fed back using relative values.

UB may also be referred to as an uplink backhaul wireless link herein. Since wireless resources between the IAB donor node/IAB node 1 and the IAB node 2 in FIG. 1-1 are controlled and scheduled by the IAB donor node/IAB node 1, the IAB donor node/IAB node 1 controls and schedules UB/DB resources occupied by the IAB node 2.

Figure 8:
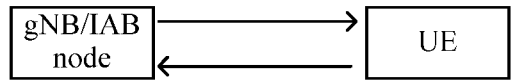
FIG. 8 is a schematic diagram of a connection between an IAB donor node/gNB and a UE according to embodiment three of the present disclosure.

One piece of uplink feedback information may also be referred to as an uplink report setting. The above method in which one piece of uplink channel feedback information corresponds to multiple channel measurement resources and one interference measurement resource is also applicable to uplink channel measurement between the IAB donor node and the common UE, as shown in FIG. 8; and/or the above method in which one piece of downlink channel feedback information corresponds to multiple interference measurement resources and one channel measurement resource is also applicable to downlink channel measurement between the IAB donor node and the common UE.

It is to be understood that the IAB donor node in this embodiment may also be a gNB.

Figure 9:
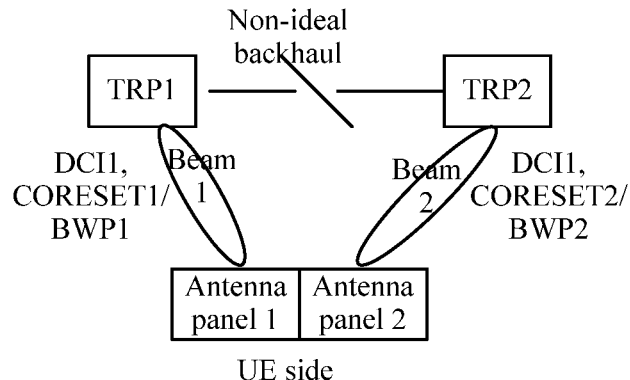
FIG. 9 is a schematic diagram of a connection between an IAB donor node/gNB and a UE according to embodiment three of the present disclosure.

Similarly, in an application scenario of transmission of multi-transmission reception point (multi-TRP) shown in FIG. 9, if there is no ideal backhaul between two TRPs, each TRP may independently schedule the UE. Then, the mutual interference between a beam 1 sent by a terminal to TRP1 on an antenna panel 1 and a beam 2 sent by the terminal to TRP2 on a panel 2 may be measured by the following method. For example, TRP1 sends second signaling information to instruct the terminal to send an uplink measurement reference signal for interference measurement on an SRS resource 3; the uplink measurement reference signal for interference measurement is used by TRP1 to measure interference of a first-type signal which is sent by the terminal and reaches TRP1, where a control channel resource group where control signaling for scheduling the first-type signal is located and a control channel resource group where the second signaling information is located are two different control channel resource groups, and/or a frequency domain bandwidth where the first-type signal is located and a frequency domain bandwidth where the second signaling information is located are two different frequency domain bandwidths, and/or the frequency domain bandwidth where the first-type signal is located and a frequency domain bandwidth where a channel or signal scheduled by the second signaling information is located are two different frequency domain bandwidths. Through these limitations, the terminal knows that the uplink measurement reference signal is sent on the SRS resource 3 by using the beam 2 as a transmit beam. The beam 2 is a beam used by an uplink signal sent by the terminal to TRP2. The first-type signal corresponds to the uplink signal sent by the terminal to TRP2. As shown in FIG. 9, a signal sent by the terminal to TRP1 is scheduled by TRP1, and a signal sent by the terminal to TPR2 is scheduled by TRP2, where TRP1 corresponds to one or two in CORESET1/BWP1 and TRP2 corresponds to one or two in CORESET2/BWP2.

Embodiment Four

For ease of understanding, a configuration of a measurement reference signal is exemplarily described below in this embodiment in conjunction with a specific application scenario.

In this embodiment, an IAB donor node/gNB may allocate an uplink measurement reference signal resource to an IAB node/UE through signaling information. The signaling information may include type information of the uplink measurement reference signal resource which, for example, may include, but is not limited to, a first-type uplink measurement reference signal resource and a second-type uplink measurement reference signal resource. The first-type uplink measurement reference signal resource is an uplink measurement reference signal for interference measurement, and the second-type uplink measurement reference signal resource is an uplink measurement reference signal for channel measurement.

When an uplink measurement reference signal is the uplink measurement reference signal for channel measurement, the IAB node/UE may not receive channel state information for an uplink channel (that is, a channel measurement result) which is sent by the IAB donor node/gNB on a downlink channel; and/or a spatial filtering parameter for sending the uplink measurement reference signal will be configured to be a downlink reference signal over DB or an uplink reference signal over UB between the IAB donor node/gNB and the IAB node/UE.

When an uplink measurement reference signal is the uplink measurement reference signal for interference measurement, the IAB node/UE receives channel state information for the uplink channel (that is, an interference measurement result) which is sent by the IAB donor node/gNB on the downlink channel; and/or a spatial filtering parameter for sending the uplink measurement reference signal cannot be configured to be the downlink reference signal or the uplink reference signal between the IAB donor node/gNB and the IAB node/UE.

Alternatively, when the measurement reference signal is configured to include two types of measurement reference signals: a reference signal for channel measurement and a reference signal for interference measurement, the IAB node/UE receives the channel state information for the uplink channel which is sent by the IAB donor node/gNB on the downlink channel. Alternatively, when the measurement reference signal includes only the reference signal for channel measurement, the IAB node/UE may not receive the channel state information for the uplink channel which is sent by the IAB donor node/gNB on the downlink channel, and the IAB donor node/gNB does not send the channel state information corresponding to the uplink channel on the downlink channel either.

It can be seen that, in this embodiment, the uplink measurement reference signal at least includes one type of uplink measurement reference signal for channel measurement and another type of measurement reference signal for channel measurement.

Embodiment Five

In this embodiment, an uplink measurement reference signal and an uplink channel may be simultaneously sent on the same time domain symbol.

Figure 10:
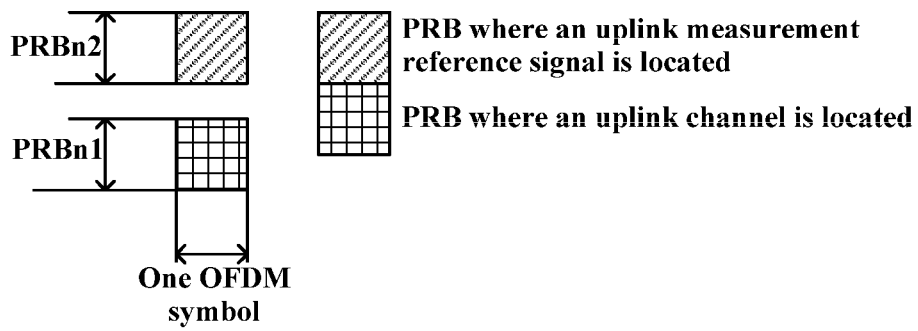
FIG. 10 is a schematic diagram illustrating that an uplink measurement reference signal and an uplink channel are located at different PRBs in one OFDM according to embodiment five of the present disclosure.

As shown in FIG. 10, the uplink measurement reference signal and the uplink channel are located on different PRBs of one OFDM symbol, where the uplink measurement reference signal and the uplink channel are located on different PRBs in one band width part (BWP) or different PRBs on different component carriers.

Figure 11:
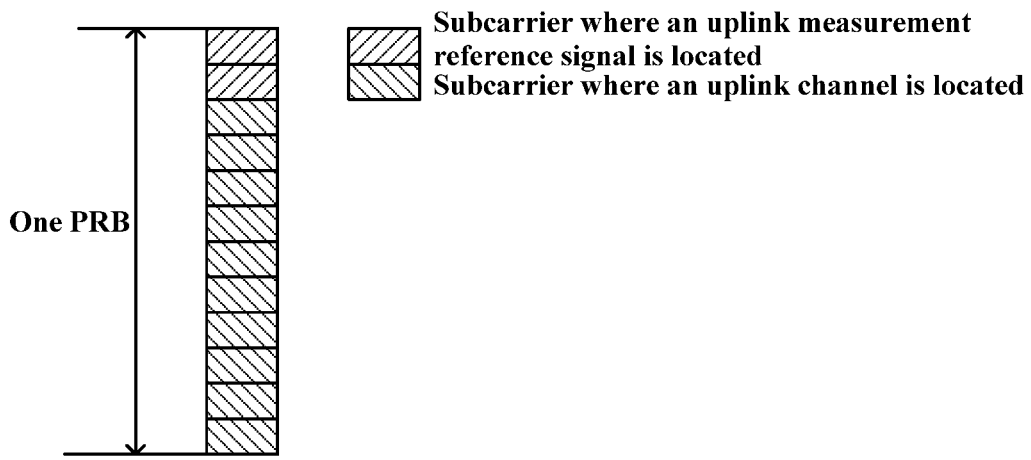
FIG. 11 is a schematic diagram illustrating that an uplink measurement reference signal and an uplink channel are located at one PRB in one OFDM according to embodiment five of the present disclosure.

Alternatively, as shown in FIG. 11, the uplink measurement reference signal and the uplink channel are located on different subcarriers of 12 subcarriers included in one PRB of one OFDM. In an embodiment, the uplink channel performs rate matching on subcarriers occupied by the uplink measurement reference signal.

In this embodiment, it may be determined whether the uplink measurement reference signal and the uplink channel may be simultaneously sent on the same time domain symbol according to at least one of the following information:

received signaling information, for example, an IAB node/UE determines whether the uplink measurement reference signal and the uplink channel may be simultaneously sent on the same time domain symbol according to signaling information sent by a gNB/IAB node;

whether a pattern of a measurement reference signal belongs to a predetermined pattern type, for example, in a case where a pattern type of the uplink measurement reference signal is a CSI-RS pattern, the uplink measurement reference signal and the uplink channel may be simultaneously sent on the same time domain symbol, and in a case where a pattern type of an uplink reference signal is an SRS pattern, the uplink measurement reference signal and the uplink channel cannot be simultaneously sent on the same time domain symbol;

whether transform precoding is enabled when the measurement reference signal and/or the uplink channel are sent, for example, it can be seen by referring to protocol 38.211 that: enabling the transform precoding is to use a transmit waveform of DFT-SC-OFDM and the power of a terminal is generally limited so that the uplink reference signal and the uplink channel cannot be sent on the same time domain symbol, and disabling the transform precoding is to use a transmit waveform of CP-OFDM and the power of the terminal is generally higher so that the uplink reference signal and the uplink channel may be sent on the same time domain symbol;

whether the measurement reference signal is an uplink reference signal on a backhaul link, for example, in a case where the measurement reference signal is the uplink measurement reference signal on the backhaul link, a sending node is the IAB node and there is no problem with transmit power so that the uplink measurement signal and the uplink channel may be simultaneously sent on the same time domain symbol, and in a case where the measurement reference signal is an uplink measurement reference signal on an access link, the uplink measurement signal and the uplink channel cannot be simultaneously sent on the same time domain symbol;

whether the measurement reference signal occupies subcarriers at equal intervals in one PRB, for example, in a case where the measurement reference signal occupies the subcarriers at equal intervals, the uplink measurement signal and the uplink channel cannot be simultaneously sent on the same time domain symbol, or otherwise the uplink measurement signal and the uplink channel can be simultaneously sent on the same time domain symbol;

a sequence type used by the measurement reference signal, for example, in a case where the sequence type is a pseudo-random sequence in protocol 38.211, the uplink measurement signal and the uplink channel can be simultaneously sent on the same time domain symbol, and in a case where the sequence type is a low-PAPR sequence in protocol 38.211, the uplink measurement signal and the uplink channel cannot be simultaneously sent on the same time domain symbol;

whether the measurement reference signal is a measurement reference signal for interference measurement or a measurement reference signal for channel measurement, where in a case where the measurement reference signal is the measurement reference signal for interference measurement, the uplink measurement signal and the uplink channel can be simultaneously sent on the same time domain symbol, and in a case where the measurement reference signal is the measurement reference signal for channel measurement, the uplink measurement signal and the uplink channel cannot be simultaneously sent on the same time domain symbol. For example, the measurement reference signal for interference measurement over a UB link in FIG. 5 and the uplink channel over the UB link may be simultaneously sent on the same time domain symbol, but the measurement reference signal for channel measurement over the UB link in FIG. 5 and the uplink channel over the UB link cannot be simultaneously sent on the same time domain symbol. This is because the measurement reference signal for interference measurement over UB generally causes relatively small interference to the uplink channel over the UB link, while the measurement reference signal for channel measurement over UB causes relatively large interference to the uplink channel over the UB link; or whether use of the measurement reference signal belongs to {"beam management", "antenna switching" } or {"code book", "non-code book" }, the former indicates that the uplink measurement reference signal and the uplink channel may be simultaneously sent on the same time domain symbol, and the latter indicates that the uplink measurement reference signal and the uplink channel cannot be simultaneously sent on the same time domain symbol.

Of course, it is to be understood that the above manners of determining whether the uplink measurement reference signal and the uplink channel may be simultaneously sent on the same time domain symbol are only several examples, and which manner or manners are specifically selected may be flexibly set according to application scenarios.

Embodiment Six

Figure 12:
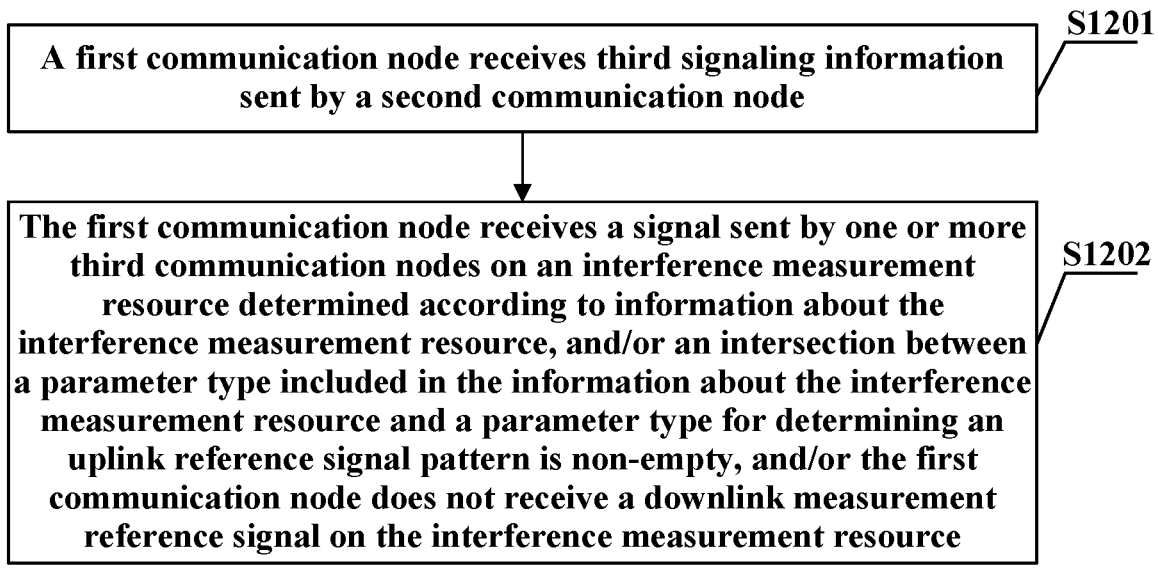
FIG. 12 is a flowchart of a method for receiving a measurement reference signal according to embodiment six of the present disclosure.

Correspondingly, in a measurement process, this embodiment further includes a method for receiving a measurement reference signal described below. As shown in FIG. 12, the method includes steps described below.

In S1201, a first communication node receives third signaling information sent by a second communication node.

The third signaling information includes information about an interference measurement resource.

In S1202, the first communication node receives a signal sent by one or more third communication nodes on the interference measurement resource determined according to the information about the interference measurement resource; and/or an intersection between a parameter type included in the information about the interference measurement resource and a parameter type for determining an uplink reference signal pattern is non-empty, and/or the first communication node does not receive a downlink measurement reference signal on the interference measurement resource.

In S1202 the signal, received by the first communication node and sent by the one or more third communication nodes on the interference measurement resource includes one or more of a reference signal or a random access signal.

Correspondingly, this embodiment may also include a method for receiving a measurement reference signal, which includes a step described below. A second communication node sends third signaling information to a first communication node. The third signaling information includes information about an interference measurement resource. The third signaling information is used for instructing the first communication node to receive a signal sent by one or more third communication nodes on the interference measurement resource determined according to the information about the interference measurement resource, and/or a non-empty intersection between a parameter type included in the information about the interference measurement resource and a parameter type for determining an uplink reference signal pattern, and/or the second communication node not to send a downlink signal on the interference measurement resource.

As illustrated above, in an example of this embodiment, at least one of the following may also be included: the signal sent by the third communication node is an uplink signal; the interference measurement resource is an interference measurement resource corresponding to channel state report information sent by the first communication node to the second communication node; the interference measurement resource is a NZP-CSI-RS interference measurement resource; the interference measurement resource and a channel measurement resource do not satisfy a quasi co-location relationship with respect to a spatial receive filtering parameter, where the interference measurement resource and the channel measurement resource correspond to same channel state report information; a quasi co-location reference signal of the interference measurement resource with respect to a spatial receive filtering parameter is a first quasi co-location reference signal, and a quasi co-location reference signal of a channel measurement resource with respect to the spatial receive filtering parameter is a second quasi co-location reference signal, where the interference measurement resource and the channel measurement resource correspond to same channel state report information; a pattern of the interference measurement resource is a CSI-RS pattern; a pattern of the interference measurement resource is an SRS pattern; the first communication node does not receive on the interference measurement resource a downlink measurement reference signal sent by the second communication node; the first communication node does not receive the downlink measurement reference signal on the interference measurement resource; or an intersection between a resource occupied by the interference measurement resource and a resource occupied by a measurement reference signal between the first communication node and the second communication node is empty.

The channel state report information is sent by the first communication node to the second communication node.

In an example, the first communication node sends the channel state report information to the second communication node, where the channel state report information may correspond to CC1 channel measurement resources and CI1 interference measurement resources, where CC1 is a positive integer less than or equal to CI1.

In an example, the third signaling information in S1201 includes at least one of: type information of the interference measurement resource which at least includes a first-type interference measurement resource and a second-type interference measurement resource; type information of a non-zero power (NZP)-interference measurement resource which at least includes a first-type NZP-interference measurement resource and a second-type NZP-interference measurement resource; pattern type selection information corresponding to the interference measurement resource; information about a group of time domain symbols occupied by the interference measurement resource in one time unit; information about a repetition factor of the interference measurement resource; a frequency-hopping parameter of the interference measurement resource; or information about a multi-level bandwidth structure of the interference measurement resource.

In an example, the first-type interference measurement resource satisfies at least one of the following characteristics that: the first communication node does not receive on the first-type interference measurement resource an uplink signal sent by the one or more third communication nodes; an intersection between a resource occupied by the first-type interference measurement resource and a resource occupied by a signal sent by the one or more third communication nodes to the first communication node is empty, that is, the intersection of resources occupied by the first-type interference measurement resource and resources occupied by the signal sent by the one or more third communication nodes to the first communication node is empty; the first-type interference measurement resource includes a downlink measurement reference signal resource; the first communication node receives on the first-type interference measurement resource the downlink measurement reference signal sent by the second communication node; or the first communication node receives a downlink measurement reference signal on the first-type interference measurement resource. Alternatively, the second-type interference measurement resource satisfies at least one of the following characteristics that: the first communication node receives on the second-type interference measurement resource an uplink signal sent by the one or more third communication nodes; the first communication node receives an uplink measurement reference signal on the second-type interference measurement resource; the second-type interference measurement resource corresponds to an uplink measurement reference signal resource; the second-type interference measurement resource is a NZP-CSI-RS interference measurement resource; the second-type interference measurement resource is a NZP-SRS interference measurement resource; the downlink measurement reference signal sent by the second communication node is not received on the second-type interference measurement resource; a downlink signal is not received on the second-type interference measurement resource; or an intersection between a resource occupied by the second-type interference measurement resource and a resource occupied by a signal between the first communication node and the second communication node is empty. And/or the pattern type selection information corresponding to the interference measurement resource is used for indicating a selection between an uplink measurement reference signal pattern and a downlink measurement reference signal pattern. And/or the first-type NZP-interference measurement resource is an NZP-CSI-RS, and the second-type NZP-interference measurement resource is an NZP-SRS.

In an example of this embodiment, the method may also include that the first communication node sends fourth signaling information to the third communication node. The fourth signaling information is used for instructing the third communication node to send a second signal. The second signal includes one or more of a data channel signal, a control channel signal, a demodulation reference signal, a measurement reference signal, or a phase-tracking reference signal. The second signal may also be an uplink signal, and an intersection between a resource occupied by the second signal and the resource occupied by the interference measurement resource is non-empty.

The resource in this example may include at least one of a time domain resource, a frequency domain resource, a code domain resource, or a spatial domain resource.

In an example of this embodiment, a parameter type set included in the third signaling information may include at least one of: the number of ports, a comb offset, information about a time domain symbol in one time unit, information about a time domain frequency-hopping unit, frequency domain information, a frequency domain offset in a multi-level bandwidth structure, information about frequency domain frequency-hopping, hopping information of a sequence group or a sequence number, a sequence generation parameter, or selection information of a pattern type of an interference measurement reference signal.

The pattern type may include, but is not limited to, at least one of the uplink reference signal pattern or a downlink reference signal pattern.

In this embodiment, the third communication node satisfies at least one of the following characteristics that: the third communication node is a communication node that accesses the first communication node; the third communication node is a communication node in a connected state and under the coverage of the first communication node; the first communication node sends downlink control signaling to the third communication node; the first communication node sends dedicated downlink control signaling information to the third communication node; or the third communication node receives the third signaling information and sends the measurement reference signal to the first communication node on the interference measurement resource.

For example, in the application scenario shown in FIG. 1-1, when DB and UA adopt SDM, the interference caused by UA to DB needs to be measured. Referring to FIG. 1-1, the IAB donor node/IAB node 1 allocates the interference measurement resource to the IAB node 2, so that the IAB node 2 is instructed to receive on the interference measurement resource a UA signal sent by the IAB node 3/UE, and/or the pattern of the interference measurement resource may be the uplink reference signal pattern, and/or the IAB donor node/IAB node 1 instructs the IAB node 2 not to receive on the interference measurement resource a downlink signal from the IAB donor node/IAB node 1 over a downlink.

The IAB donor node/IAB node 1 allocates channel state feedback information, such as a report setting, to the IAB node 2, where a channel measurement resource associated with the report setting is a DB downlink measurement reference signal and an interference measurement resource associated with the report setting is the preceding interference measurement resource, i.e., a UA uplink measurement reference signal.

The channel measurement resource and the interference measurement resource do not satisfy the quasi co-location relationship with respect to the spatial receive filtering parameter, for example, a quasi co-location reference signal of the channel measurement resource DB with respect to the spatial receive filtering parameter is another DB reference signal, and a quasi co-location reference signal of the interference measurement resource with respect to the spatial receive filtering parameter is a UA reference signal, that is, a receive filtering parameter of the interference measurement resource is obtained according to or the same as a receive filtering parameter adopted by the UA reference signal at the IAB node 2. Alternatively, the channel measurement resource and the interference measurement resource satisfy the quasi co-location relationship with respect to the spatial receive filtering parameter so that the IAB node 2 simply measures the interference caused by a UA signal, which is with the same receive beam as the channel measurement resource DB, to the DB, so as to measure the interference caused by UA to DB.

Embodiment Seven

Figure 13:
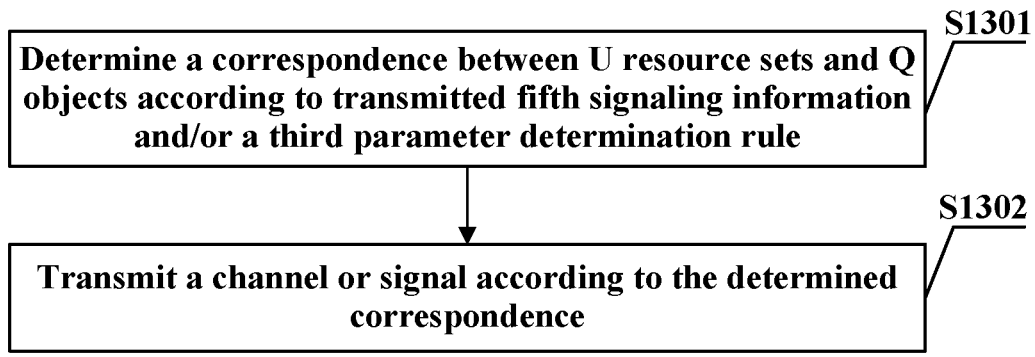
FIG. 13 is a flowchart of a signal transmission method according to embodiment seven of the present disclosure.

This embodiment provides a signal transmission method. In the transmission method, a signal and/or channel is received and sent based on a correspondence between a resource and a communication parameter set. An exemplary signal transmission method, as shown in FIG. 13, includes steps described below.

In S1301, a correspondence between U resource sets and Q objects is determined according to transmitted fifth signaling information and/or a third parameter determination rule. The objects are one of the following: spatial transmit filtering parameter sets, quasi co-location reference signal sets, sets of combinations of spatial transmit filtering parameters and quasi co-location reference signals, frequency domain resource sets, reference signal sets, frequency domain resource divisions of A links, power parameter sets, multiplexing mode sets of B links, or sets of combinations of C reference signal of C links; where U and Q are positive integers greater than or equal to 1, and A, B and C are positive integers greater than 1.

In this embodiment, the correspondence may be established based on measurement results in the embodiments described above or other results or configurations.

In S1302, a channel or signal is transmitted according to the determined correspondence. Correspondingly, the transmission includes, but is not limited to, sending or receiving the channel or signal on a corresponding resource.

In this embodiment, a resource in S1301 includes, but is not limited to, at least one of a time domain resource, a frequency domain resource, or a reference signal resource.

In this embodiment, the transmission includes sending or receiving.

In this embodiment, S1302 in which a channel or signal is sent or received on a resource according to the determined correspondence includes, but is not limited to, not expecting to receive configuration information that does not satisfy at least one of the following characteristics that: a spatial transmit filtering parameter of a first channel or signal on the resource belongs to a spatial filtering parameter set corresponding to the resource; a second channel or signal on the resource and at least one quasi co-location reference signal in a quasi co-location reference signal set corresponding to the resource satisfy a quasi co-location relationship with respect to a spatial receive filtering parameter; a spatial transmit filtering parameter of a first channel or signal on the resource is obtained according to a spatial transmit filtering parameter, where the spatial transmit filtering parameter is in at least one combination in a set of combinations of spatial transmit filtering parameters and quasi co-location reference signals, and the set of combinations corresponds to the resource; a second channel or signal on the resource and a quasi co-location reference signal satisfy a quasi co-location relationship with respect to a spatial receive filtering parameter, where the quasi co-location reference signal is in at least one combination in a set of combinations of spatial transmit filtering parameters and quasi co-location reference signals, and the set of combinations corresponds to the resource; a set corresponding to the channel or signal on the resource belongs to one set, which corresponds to the resource, of Q sets; or frequency domain resources occupied by channels or signals over the A links on the resource satisfy a frequency domain resource division of the A links corresponding to the resource.

The first channel or signal and the second channel or signal may satisfy at least one of the following characteristics that: the first channel or signal and the second channel or signal are simultaneously sent by a first communication node; the first channel or signal and the second channel or signal are simultaneously received by a first communication node; a time domain resource occupied by the first channel or signal overlaps with a time domain resource occupied by the second channel or signal; a frequency domain resource occupied by the first channel or signal overlaps with a frequency domain resource occupied by the second channel or signal; the first channel or signal is a channel or signal between a first communication node and a second communication node; or the second channel or signal is a channel or signal between a first communication node and a third communication node. The second communication node sends scheduling information about the first channel or signal to the first communication node, and the first communication node sends scheduling information about the second channel or signal to the third communication node; and/or the first communication node is a communication node that receives the fifth signaling information, the second communication node is a communication node that sends the fifth signaling information, and the third communication node receives control signaling sent by the first communication node.

In an example of this embodiment, the step of determining the correspondence between the U resource sets and the Q objects includes determining a correspondence between U time domain resource sets and Q frequency domain resource sets, where a frequency domain resource occupied by a channel or signal in one time unit is a subset of one of the Q frequency domain resource sets corresponding to one of the U time domain resource sets to which the one time unit belongs. And/or, the step of determining the correspondence between the U resource sets and the Q objects includes determining a correspondence between U time domain resource sets and Q reference signal sets, where a reference signal corresponding to a channel or signal in one time unit is a subset of one of the Q reference signal sets corresponding to one of the U time domain resource sets to which the one time unit belongs. And/or, the step of determining the correspondence between the U resource sets and the Q objects includes determining a correspondence between U time domain resource sets and Q frequency domain resource divisions of the A links, which satisfies at least one of the following characteristics that: a frequency domain resource occupied by a channel or signal in one time unit is a subset of a frequency domain resource set corresponding to a link to which the channel or signal belongs in one of the Q frequency domain resource divisions corresponding to one of the U time domain resource sets to which the one time unit belongs, or frequency domain resources occupied by channels or signals over the A links in one time unit satisfy one of the Q frequency domain resource divisions corresponding to one of the U time domain resource sets to which the one time unit belongs. And/or, the step of determining the correspondence between the U resource sets and the Q objects includes determining a correspondence between U time domain resource sets and Q power parameter sets, which satisfies at least one of the following characteristics that: a power parameter set corresponding to a channel or signal in one time unit is one of the Q power parameter sets corresponding to one of the U time domain resource sets to which the one time unit belongs, the Q power parameter sets include the same power parameter type, or the Q power parameter sets are Q configuration values for the same type of parameter set. And/or, the step of determining the correspondence between the U resource sets and the Q objects includes determining a correspondence between the U resource sets and Q multiplexing mode sets, where one multiplexing mode includes a multiplexing mode of the B links, and a multiplexing mode set of the B links in one resource belongs to one of the Q multiplexing mode sets corresponding to the one resource. And/or, the step of determining the correspondence between the U resource sets and the Q objects includes determining a correspondence between the U resource sets and Q reference signal combinations, where one of the Q reference signal combinations includes a reference signal corresponding to each of the C links, and a combination of reference signals over the C links in one resource belongs to a set of combinations of reference signals over the C links corresponding to the one resource.

S1302 in which the channel or signal is transmitted according to the correspondence may include: not sending or not receiving the channel or signal on the resource in response to receiving configuration information that does not satisfy at least one of the following characteristics that: a spatial filtering parameter of the channel or signal on the resource belongs to the spatial filtering parameter set corresponding to the resource; a quasi co-location reference signal of the channel or signal, on the resource, with respect to the spatial receive filtering parameter belongs to the quasi co-location reference signal set corresponding to the resource; the channel or signal on the resource and at least one quasi co-location reference signal in the quasi co-location reference signal set corresponding to the resource satisfy a quasi co-location relationship with respect to the spatial receive filtering parameter; the set corresponding to the channel or signal on the resource belongs to one set, which corresponds to the resource, of the Q sets; or the frequency domain resources occupied by the channels or signals over the A links on the resource satisfy the frequency domain resource division of the A links corresponding to the resource.

In some embodiments, the step of determining the correspondence between the U resource sets and the Q objects includes at least one of: determining a correspondence between the U resource sets and the Q sets; determining a correspondence between the U resource sets and Q SRS resource sets used for a code book; determining a correspondence between the U resource sets and Q SRS resource sets used for a non-code book; determining a correspondence between the U resource sets and Q transmission configuration indicator (TCI) state pools; or determining a correspondence between the U resource sets and Q sets of reference signal combinations, where one reference signal combination includes C reference signals over the C links. Each of the Q SRS resource sets corresponds to one spatial filtering parameter set, and each resource in an SRS resource set corresponds to a range of spatial filtering parameters; and each of the Q TCI state pools corresponds to one quasi co-location reference signal set, and each TCI state in a TCI state pools includes one quasi co-location reference signal; where U is a positive integer and Q is a positive integer less than or equal to U.

In some examples of this embodiment, the resource satisfies at least one of the following characteristics that: each resource set in the U resource sets has a correspondence with one of the Q sets; each resource set in the U resource sets has a correspondence with one of Q divisions; one channel or signal only falls within one resource; one channel or signal is unable to fall within more than one resource; or a range of spatial transmit filtering parameters corresponds to one reference signal.

In the resource in S1301, the U resource sets may satisfy at least one of the following characteristics that: an intersection between different resource sets is an empty set; different resource sets belong to one frequency domain band width part (BWP); a union of the U resource sets includes no non-consecutive resources; U time domain resources appear in turn; a difference set between different resource sets is non-empty; one resource set includes non-consecutive resources; one resource set includes resources periodically in time domain; or one resource set includes resources periodically in frequency domain.

In this embodiment, the empty intersection between different resources includes, but is not limited to, the following cases: a difference set between spatial filtering parameter sets corresponding to different resources is a non-empty set; a difference set between quasi co-location reference signal sets corresponding to different resources is a non-empty set; an intersection between spatial filtering parameter sets corresponding to different resources is a non-empty set; and an intersection between quasi co-location reference signal sets corresponding to different resources is a non-empty set.

In an example of this embodiment, each of the frequency domain resource sets includes I frequency domain resources, and each of the I frequency domain resources is one of a BWP, a frequency domain bandwidth included in a component carrier, a physical resource block, or a subcarrier; where I is a non-negative integer.

In an example of this embodiment, at least one of the following characteristics may also be satisfied: Q is a positive integer less than or equal to U; a difference set between the Q sets is non-empty; Q divisions are different divisions; the fifth signaling information is physical layer dynamic control information; the fifth signaling information includes switching indication information of the Q objects; information about the Q objects is included in higher-layer signaling information; the agreed rule includes initiating switching indication information of the Q objects at agreed time; a difference set between a set corresponding to a first time domain resource and a set corresponding to a second time domain resource is non-empty; or a frequency domain resource division corresponding to a first time domain resource is different from a frequency domain resource division corresponding to a second time domain resource; where a first time domain resource set and a second time domain resource set belong to the U time domain resource sets.

In an example of this embodiment, the non-empty difference set between the set corresponding to the first time domain resource and the set corresponding to the second time domain resource includes, but is not limited to: a non-empty difference set between a first frequency domain resource set corresponding to the first time domain resource set and a second frequency domain resource set corresponding to the second time domain resource set, a non-empty difference set between a first reference signal set corresponding to the first time domain resource set and a second reference signal set corresponding to the second time domain resource set, a non-empty difference set between a first power parameter set corresponding to the first time domain resource set and a second power parameter set corresponding to the second time domain resource set, or a non-empty difference set between a first multiplexing mode set corresponding to the first time domain resource set and a second multiplexing mode set corresponding to the second time domain resource set.

The frequency domain resource division corresponding to the first time domain resource being different from the frequency domain resource division corresponding to the second time domain resource includes, but is not limited to, that a first frequency domain resource division corresponding to the first time domain resource set is different from a second frequency domain resource division corresponding to the second time domain resource set.

For ease of understanding, this embodiment is further described based on the preceding content by using an example in which a correspondence between resources and spatial filtering parameter sets is established.

In this example, the correspondence between resources and spatial filtering parameter sets is established, and a channel or signal may be sent on a resource according to the established correspondence. The application scenario shown in FIG. 1-1 is also used as an example below.

Figure 14:
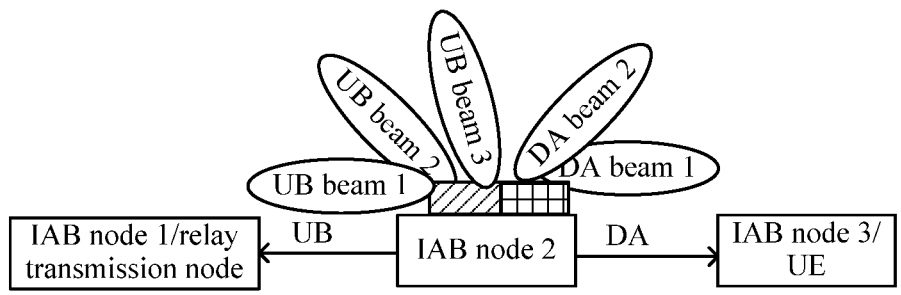
FIG. 14 is a schematic diagram of beam allocation according to embodiment seven of the present disclosure.

As shown in FIG. 14, through measurement (or according to a pre-configuration, etc.), candidate transmit beams on a UB link between an IAB node 2 and an IAB donor node/IAB node 1 are {UB transmit beam 1, UB transmit beam 2, UB transmit beam 3}, and candidate transmit beams on a DA link are {DA transmit beam 1, DA transmit beam 2}. Assuming that only {UB transmit beam 1, UB transmit beam 2} and {DA transmit beam 1} may adopt an SDM mode, when a UB signal adopts one or more of {UB transmit beam 1, UB transmit beam 2}, a DA signal adopts {DA transmit beam 1}, and a time-frequency resource occupied by the UB signal overlaps with a time-frequency resource occupied by the DA signal, the DA signal causes relatively small interference to the UB signal on the side of the IAB donor node/IAB node 1 and the UB signal causes relatively small interference to the DA signal on the side of an IAB node 3/UE. However, if the UB signal adopts one or more of {UB transmit beam 1, UB transmit beam 2}, the DA signal adopts {DA transmit beam 2}, and the time-frequency resource occupied by the UB signal overlaps with the time-frequency resource occupied by the DA signal, the DA signal causes relatively large interference to the UB signal on the side of the IAB donor node/IAB node 1 and/or the UB signal causes relatively large interference to the DA signal on the side of the IAB node 3/UE. {UB transmit beam 1, UB transmit beam 2} and {DA transmit beam 2} cannot adopt the SDM. Similarly, {UB transmit beam 3} and {DA transmit beam 2} may adopt the SDM.

Assuming that all UB resources adopt the same spatial filtering parameter set, for example, the spatial filtering parameter set is {UB transmit beam 1, UB transmit beam 2, UB transmit beam 3}, and the IAB donor node/IAB node 1 dynamically allocates one or more of {UB transmit beam 1, UB transmit beam 2, UB transmit beam 3} to be the transmit beam(s) of a PUSCH/PUCCH on the UB link, the IAB node 2 cannot invoke the DA signal on all the resources occupied by UB, that is, the UB signal and the DA signal cannot adopt the SDM.

In this example, one transmit beam may also be referred to as a range of transmit spatial filters or a range of spatial transmit filter parameters or a range of transmit spatial filter parameters. One transmit beam is expressed by one reference signal, that is, spatialRelationInfo is configured when an uplink reference signal is configured in protocol 38.331. One reference signal in the spatialRelationInfo is associated with one transmit beam, and a spatial transmit filtering parameter of the uplink reference signal is obtained according to a spatial transmit filtering parameter of a reference signal configured in the spatialRelationInfo.

Figures 1, 15:
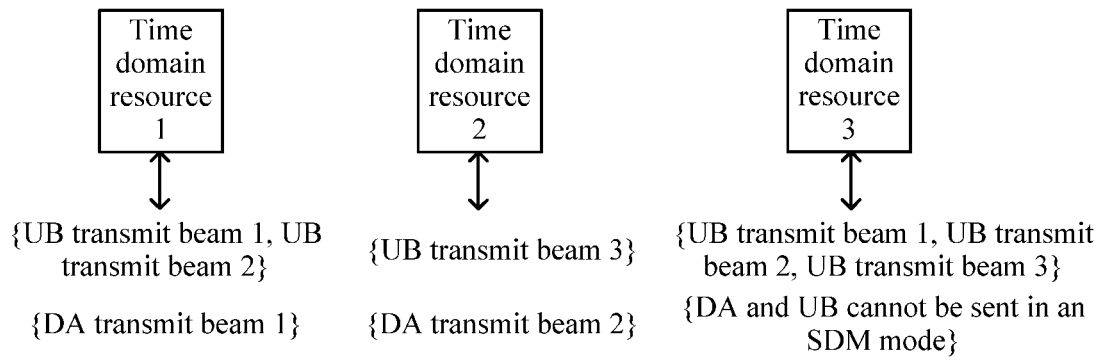
Figures 2, 15:
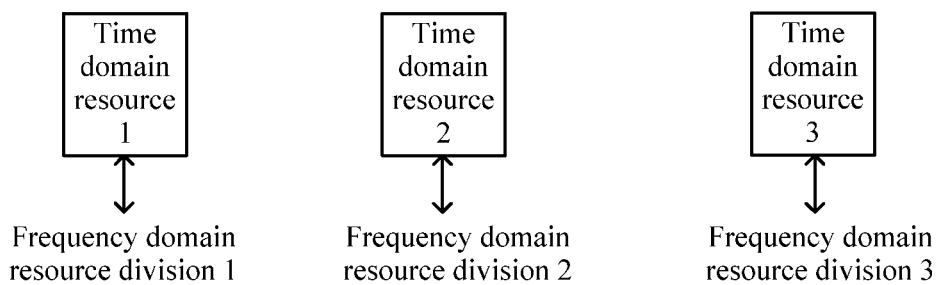
Figures 3, 15:
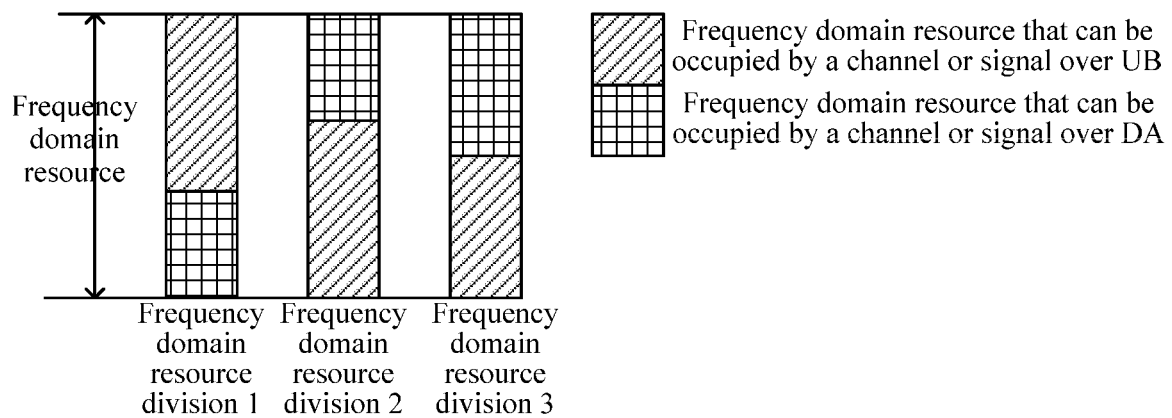
Figures 4, 15:
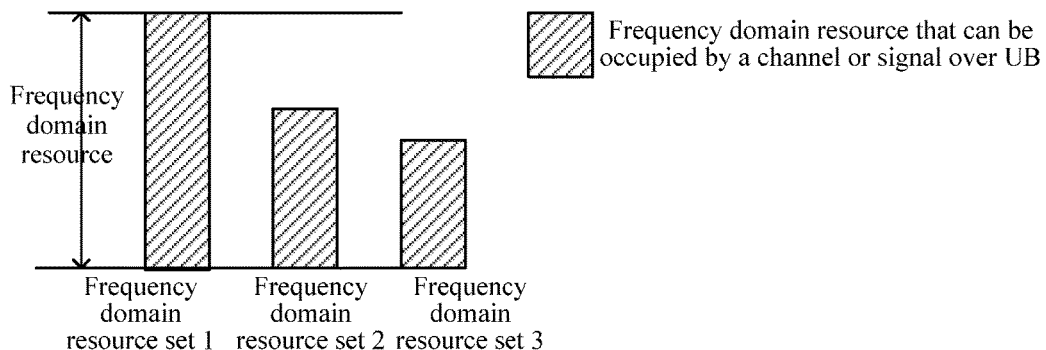
Figures 5, 15:
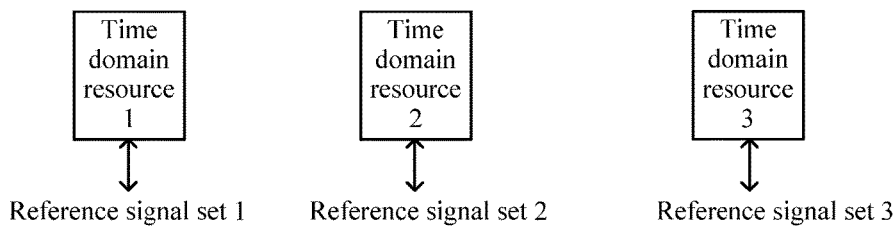
Figures 6, 15:
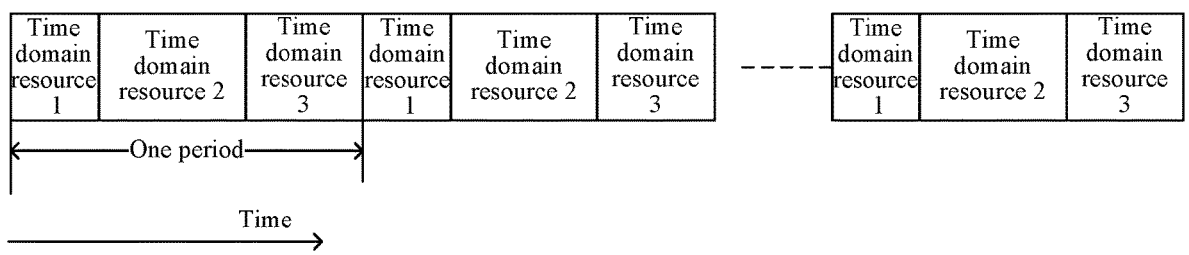

Therefore, the IAB donor node/IAB node 1 may send configuration information to the IAB node 2 and/or pre-agree a rule with the IAB node 2 to determine the correspondence between spatial transmit filtering parameter sets and resources. As shown in FIG. 15-1, it is assumed that a time domain resource 1 corresponds to {UB transmit beam 1, UB transmit beam 2} and a time domain resource 2 corresponds to {UB transmit beam 3}. Assuming that it is agreed that on the time domain resource 1 a transmit spatial filter that is allocated by the IAB donor node/IAB node 1 to the IAB node 2 for sending a UB channel or signal can only belong to {UB transmit beam 1, UB transmit beam 2}, the IAB node 2 may invoke a DA channel or signal using {DA transmit beam 1}, where the DA channel or signal and the UB channel or signal are multiplexed in an SDM mode.

In another example, assuming that it is agreed that on the time domain resource 2 a transmit spatial filter that is allocated by the IAB donor node/IAB node 1 to the IAB node 2 for sending the UB channel or signal can only belong to {UB transmit beam 3}, the IAB node 2 may invoke the DA signal using {DA transmit beam 2}, where the DA signal and the UB signal are multiplexed in the SDM mode.

In the preceding examples, it is agreed that the transmit spatial filtering parameter of the UB channel or signal on the time domain resource has to belong to a spatial filtering parameter set corresponding to the time domain resource. In another example of this embodiment, it may be further limited that a transmit spatial filtering parameter of a UB channel or signal dynamically scheduled on a time domain resource belongs to a spatial transmit filtering parameter set corresponding to the time domain resource, and a transmit spatial filtering parameter of a UB channel or signal that is not dynamically scheduled and falls in the resource (such as a channel or signal semi-statically scheduled through Radio Resource Control (RRC)/Medium Access Control Control Element (MAC-CE)) is not limited. Specifically, for example, the time domain resource 1 is associated with a UB-SRS set 1 for a "non code book", and the time domain resource 2 is associated with a UB-SRS set 2 for a "non code book". Correspondingly, a transmit spatial filtering parameter of a PUSCH that is dynamically scheduled and falls in the time domain resource 1 can only be selected from the UB-SRS set 1, and a transmit spatial filtering parameter of a PUSCH that is dynamically scheduled and falls in the time domain resource 2 can only be selected from the UB-SRS set 2.

In the preceding example, an intersection between the transmit spatial filtering parameter set corresponding to the time domain resource 1 and the transmit spatial filtering parameter set corresponding to the time domain resource 2 is empty. In this embodiment, it is not excluded that an intersection between transmit spatial filtering parameters corresponding to different time domain resources is non-empty. As shown in FIG. 15-1, a time domain resource 3 may correspond to {UB transmit beam 1, UB transmit beam 2, UB transmit beam 3}. In an embodiment, on the time domain resource 3, UB and DA channels or signals cannot adopt the SDM mode.

In FIG. 15-1, different time domain resources correspond to different spatial transmit filtering parameter sets. Similarly, according to the requirements of specific application scenarios, different frequency domain resources may correspond to different spatial filtering transmit parameter sets, different time-frequency resources correspond to different spatial filtering transmit parameter sets, or different reference signal sets correspond to different spatial filtering parameter sets. For example, a demodulation reference signal set {0-3} corresponds to a first spatial filtering parameter set and a demodulation reference signal set {4-7} correspond to a second spatial filtering parameter set.

Figure 16:
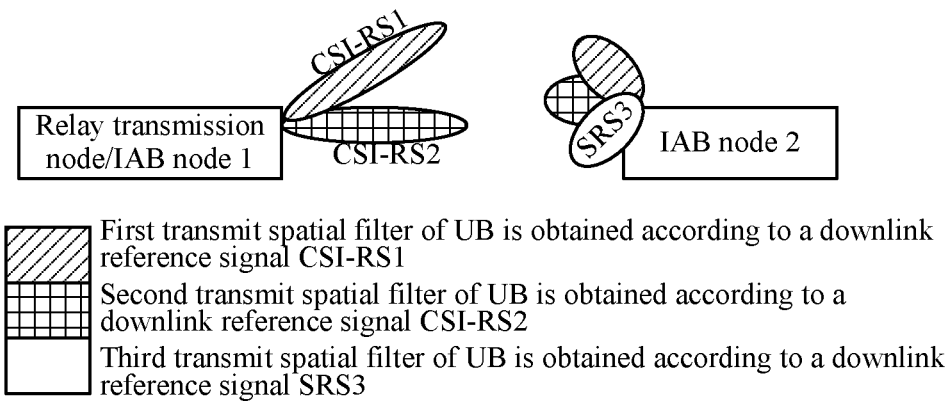
FIG. 16 is a schematic diagram illustrating that spatial transmit filtering parameter sets are associated with reference signal sets according to embodiment seven of the present disclosure.

Each range of spatial transmit filtering parameters in the spatial filtering parameter set in the preceding example is associated with one reference signal. The one reference signal may be an uplink reference signal between the IAB donor node/IAB node 1 and the IAB node 2 or a downlink reference signal between the IAB donor node/IAB node 1 and the IAB node 2. As shown in FIG. 16, a reference signal set associated with a spatial transmit filtering parameter set is {CSI-RS1, CSI-RS2, SRS3}, and the spatial transmit filtering parameter set corresponds to a resource 4. Then spatialRelationInfo of a channel or signal on the resource 4 (or a dynamically scheduled channel or signal on the resource 4) can only be configured to be a reference signal in the set {CSI-RS1, CSI-RS2, SRS3}, that is, a spatial transmit filtering parameter of the channel or signal on the resource 4 (or the dynamically scheduled channel or signal on the resource 4) can only be obtained according to a spatial transmit filtering parameter corresponding to the reference signal in {CSI-RS1, CSI-RS2, SRS3}.

In the preceding examples, a relationship between resources and spatial transmit filtering parameter sets is established. A correspondence between resources and sets of combinations of (spatial transmit filtering parameters, quasi co-location reference signals) or a correspondence between resources and quasi co-location reference signal sets may also be established. For example, in FIG. 1-1, the IAB donor node/IAB node 1 obtains through measurement that: (UB transmit beam 1, DA transmit beam 1) have a relatively good beam differentiating degree and may be used for the UB link and the DA link respectively, and signals over the two links are multiplexed in the SDM mode; (UB transmit beam 2, DA transmit beam 2) have a relatively good beam differentiating degree and may be used for the UB link and the DA link respectively, and signals over the two links are multiplexed in the SDM mode. Therefore, the IAB donor node/IAB node 1 allocates to the IAB node 2 a resource 1 on which UB and DA beam pairs are {(UB transmit beam 1, DA transmit beam 1), (UB transmit beam 2, DA transmit beam 2)}, a resource 2 all of which is occupied by a backhaul channel and/or signal, and a resource 3 all of which is occupied by an access channel or signal.

Similarly, the IAB donor node/IAB node 1 and the IAB node 2 may determine the following correspondence through signaling or an agreed rule: a correspondence between U time domain resources and Q objects, where the Q objects are at least one of the frequency domain resource sets, the frequency domain resource divisions of the A links, the reference signal sets, the power parameter sets, or the multiplexing mode sets of the B links. U and Q are positive integers greater than or equal to 1, and A and B are positive integers greater than 1.

As shown in FIG. 15-2, different time domain resources correspond to different frequency domain divisions between UB and DA. Specifically, a frequency domain division between UB and DA corresponding to a time domain resource i in FIG. 15-2 is a frequency domain resource division i (i=1, 2, 3) shown in FIG. 15-3. FIG. 15-2 shows frequency domain divisions between two links UB and DA. This embodiment does not exclude that the time domain resources and the frequency domain resource divisions of the A links need to be determined in response to multi-hop backhaul links.

Different time domain resources in FIG. 15-2 correspond to different frequency domain resource sets available for UB. The time domain resource i in FIG. 15-2 corresponds to a different frequency domain resource set in FIG. 15-4. The frequency domain resource set includes one or more frequency domain resources, and one frequency domain resource may be one subcarrier, one PRB, or one BWP. For example, the BWP occupied by the UB in the time domain resource 1 may be one or more BWPs in {BWP1, BWP2}, the BWP occupied by the UB in the time domain resource 2 may be one or more BWPs in {BWP1, BWP2, BWP3}, and the BWP occupied by the UB in the time domain resource 3 may be one or more BWPs in {BWP4, BWP5, BWP7}, where the frequency domain resource sets corresponding to the different time domain resources are only examples, and other frequency domain resource sets are not excluded.

Similarly, different time domain resources and/or different frequency domain resources correspond to different reference signal sets of UB. For example, the time domain resource i in FIG. 15-2 corresponds to a reference signal set i in FIG. 15-5, where i=1, 2, 3. This is because UB and/or DA may occupy a different reference signal set in response to a different multiplexing mode between UB and DA. For example, when UB and DA adopt SDM, UB and DA need to occupy orthogonal reference signals, and UB and/or DA occupies a subset of all reference signals. When UB and DA adopt time-division multiplexing and/or frequency-division multiplexing, both UB and DA may occupy all the reference signals such as all demodulation reference signal ports.

Similarly, different time domain resources and/or different frequency domain resources correspond to different reference signal set divisions between UB and DA.

Similarly, different time domain resources correspond to different multiplexing mode sets between UB and DA. For example, the time domain resource i in FIG. 15-2 corresponds to an i-th multiplexing mode set. One multiplexing mode set includes at least one of the following multiplexing modes: time-division multiplexing, frequency-division multiplexing, or space-division multiplexing. The multiplexing modes may also be extended to a multiplexing mode of the B links, where B is a positive integer greater than or equal to 2.

Similarly, different time domain resources correspond to different power parameters of UB. For example, when UB and DA adopt the space-division multiplexing or the frequency-division multiplexing, transmit power of UB needs to consider transmit power of DA so that the total power cannot exceed the total transmit power at IAB. When UB and DA adopt the time-division multiplexing, the transmit power of UB does not need to consider the transmit power of DA. On the other hand, considering power saving and coverage, different power parameters may be configured in correspondence to different time domain resources. For example, different target power P is configured so that the IAB node or the UE sends uplink signals using different levels of transmit power on different time domain resources, to achieve a compromise between power saving and coverage.

FIG. 15-2 shows three time domain resources, but it is to be understood that other values of U are not excluded in this embodiment, i.e., there are U time domain resources, where U is a positive integer greater than or equal to 1. The U time domain resources satisfy at least one of the following characteristics: an intersection between any two of the U time domain resource sets is empty; a time domain resource set composed of a union of the U time domain resource sets constitutes consecutive time domain resources; a time domain resource set composed of a union of the U time domain resource sets does not include non-consecutive time domain resources; or the U time domain resource sets constitute time domain resources with U periods. As shown in FIG. 15-6, the U time domain resources appear in turn. Alternatively, other division manners of the U time domain resource sets are not excluded in this embodiment.

Further, a correspondence between U resources and Q sets or a correspondence between U resources and Q frequency domain resource divisions may be included in control signaling, and/or the U time domain resources correspond to a validity period of the control signaling.

The correspondence between U resources and Q sets is configured in semi-static control signaling such as RRC. In another implementation of this embodiment, the correspondence between U resources and Q objects may be established in dynamic signaling, or the division of the U resources is determined via the dynamic signaling, and/or indication information of the Q objects is indicated via the dynamic signaling. When indicated new objects are different from current objects, an object switching process is initiated. For example, the UB-SRS set 2 and the UB-SRS set 1 are configured through RRC, and the UB-SRS set 1 is activated by default, then a base station may indicate the switching from the UB-SRS set 1 to the UB-SRS set 2 via the dynamic signaling. In an embodiment, the switching between two sets requires a predetermined switching delay, and the UB-SRS set 2 is always used as the activated set until new switching signaling is received or predetermined time arrives, that is, a transmit spatial filtering parameter in the PUSCH can only be from the UB-SRS set 2. Similarly, this may be used for the switching between other sets described above. For example, Q objects are configured in higher-layer signaling and the indication information of the Q objects is notified in physical layer dynamic control signaling. When the indicated Q objects are different from the current objects, the object switching process is initiated to switch the current objects to the new objects, and the new objects are activated; and the new objects notified in the physical layer dynamic control signaling are adopted on the time domain resources after the switching. Alternatively, in a manner of agreeing time, one object may be switched to another object or one time domain resource set may be switched to another time domain resource set.

Embodiment Eight

Figure 17:
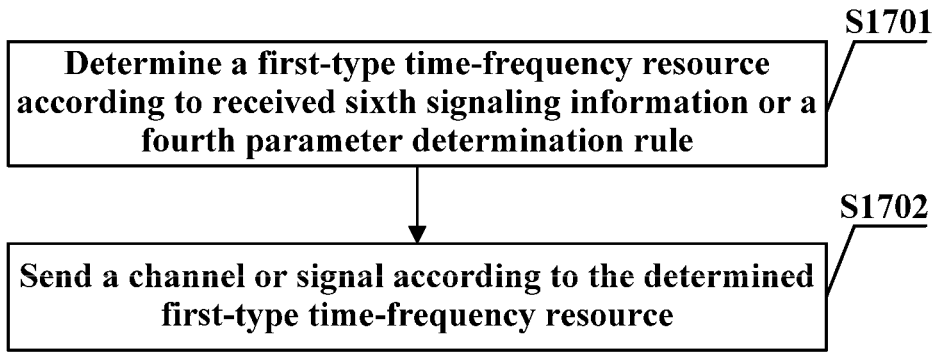
FIG. 17 is a flowchart of a signal sending method according to embodiment eight of the present disclosure.

This embodiment provides a signal sending method that can implement accurate and reliable sending of a signal. As shown in FIG. 17, the method includes steps described below.

In S1701, a first-type time-frequency resource is determined according to received sixth signaling information or a fourth parameter determination rule.

In S1702, a channel or signal is sent according to the determined first-type time-frequency resource.

The above channel or signal cannot occupy the first-type time-frequency resource.

In an example of this embodiment, the sixth signaling information includes at least one of the following information about the first-type time-frequency resource: information about a physical resource block set; position information of a time domain symbol occupied in one time unit; time behavior information which includes, but is not limited to, periodic behavior, semi-persistent behavior, or aperiodic behavior, etc.; period information; period offset information; information about a set of indexes of subcarriers occupied in one physical resource block; a lowest subcarrier index or a highest subcarrier index in each group of D groups of subcarriers occupied in one physical resource block; a lowest time domain symbol index or a highest time domain symbol index in each group of J groups of time domain symbols occupied in one time unit; information about a downlink reference signal pattern; or selection information of a pattern type which at least includes a first-type pattern and a second-type pattern; where D and J are positive integers.

In an example of this embodiment, the first-type pattern is an uplink reference signal pattern, and the second-type pattern is a downlink reference signal pattern; or the first-type pattern is an SRS pattern, and the second-type pattern is a CSI-RS pattern.

In this embodiment, a reserved resource or a rate matching resource are configured for a data channel and/or a control channel and/or a measurement reference signal over a UB link, which are collectively referred to as a first-type time domain resource and/or frequency domain resource here. The data channel and/or the control channel and/or the measurement reference signal over the UB link cannot occupy the resource occupied by the first-type time domain resource and/or frequency domain resource, and the data channel and/or the control channel and/or the measurement reference signal over the UB link should perform rate matching on the first-type time domain resource and/or frequency domain resource.

Figure 18:
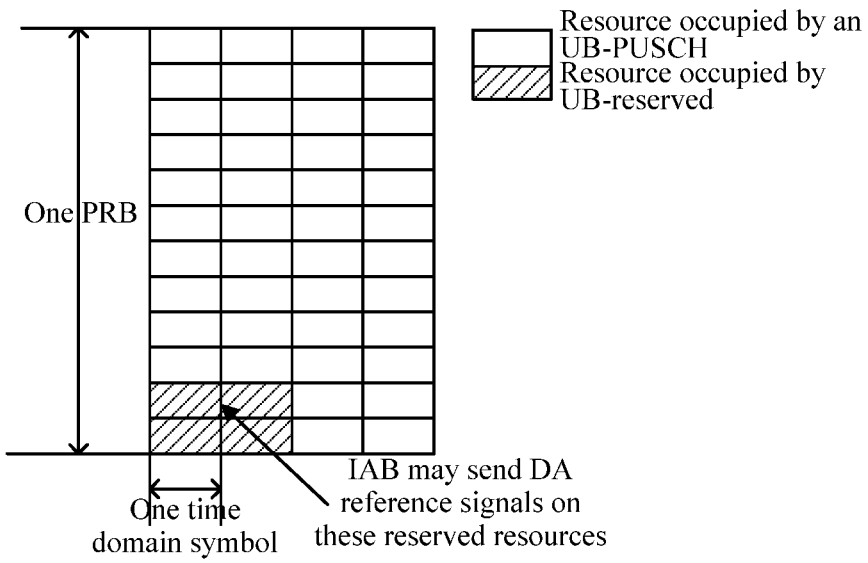
FIG. 18 is a schematic diagram of a CSI-RS pattern occupied by a reserved resource or a rate matching resource over a UB link according to embodiment eight of the present disclosure.

Configuration information of the first-type time domain and/or frequency domain resource includes, but is not limited to, at least one of information described below. Information one is the information about the physical resource block set, and UB channels and/or signals cannot occupy resources in the physical resource block set, where one physical resource block is frequency domain resources included in the one PRB. Information two is the position information of the time domain symbol occupied in one time unit, such as time domain symbols in one slot and/or information about the number of occupied slots and/or a lowest time domain symbol index or a highest time domain symbol index in each group of N groups of time domain symbols occupied in one time unit, where each group of time domain symbols includes one or more consecutive time domain symbols, and N is a positive integer. Information three is the time behavior information, for example, whether the first-type time domain resource and/or frequency domain resource is periodic, semi-persistent, or aperiodic. Information four is the period information, for example, a period is P1 slots. Information five is the period offset information, for example, when the period is the P1 slots, the period offset information indicates which slot in the period the first-type time domain resource and/or frequency domain resource are located. Information six is the information about the set of indexes of subcarriers occupied in one PRB, for example, a 12-bit mapping manner is used for indicating a set of subcarriers occupied by the first-type time domain resource and/or frequency domain resource in one PRB or indicating a lowest subcarrier index or a highest subcarrier index in each group of M groups of subcarriers occupied in one PRB, where each group of subcarriers includes one or more consecutive subcarriers, and M is a positive integer. Information seven is the information about the downlink reference signal pattern, for example, an IAB donor node/IAB node 1 allocates reserved/rate matching resources of UB to an IAB node 2, and the UB channels and/or signals cannot occupy resources in the reserved/rate matching resources, where configuration information of the reserved/rate matching resources includes information about the CSI-RS pattern so that the IAB node 2 can send DA reference signals on these reserved resources and the orthogonality of DA and UB reference signals can be guaranteed when DA and UB adopt SDM. For example, as shown in FIG. 18, a pattern of UB-reserved in FIG. 18 is only an example, and the pattern of resources occupied by the UB-reserved may also be one or more of other CSI-RS patterns, such as one or more of a pattern of a DA downlink reference signal, a pattern of a DA phase-tracking reference signal, or a pattern of a DA synchronization signal. Information eight is the selection information of the pattern type which at least includes the first-type pattern and the second-type pattern, where the pattern of UB-reserved may also be selected between the SRS pattern and the CSI-RS pattern.

Embodiment Nine

This embodiment provides a channel or signal receiving method which can implement accurate and reliable reception of a channel or signal. As shown in FIG. 19, the method includes steps described below.

In S1901, a second-type time-frequency resource is determined according to received seventh signaling information or a fifth parameter determination rule.

In S1902, the channel or signal is received according to the determined second-type time-frequency resource.

The above channel or signal does not occupy the second-type time-frequency resource.

In this embodiment, the seventh signaling information includes at least one of the following information about the second-type time-frequency resource: a number of ports; a comb offset; information about a time domain symbol in one time unit; information about a time domain frequency-hopping unit; information about frequency domain frequency-hopping; information about a pattern of an uplink reference signal; or selection information of a pattern type which at least includes a first-type pattern and a second-type pattern.

The first-type pattern may be an uplink reference signal pattern, and the second-type pattern may be a downlink reference signal pattern; or the first-type pattern may be an SRS pattern, and the second-type pattern may be a CSI-RS pattern.

For example, in an example of the application scenario shown in FIG. 1-1, an IAB donor node/IAB node 1 allocates reserved resources and/or rate matching resources of DB to an IAB node 2, where a pattern of the reserved resources and/or the rate matching resources of DB which are occupied may be the SRS pattern. For example, as shown in FIG. 20, the IAB node 2 may receive UA reference signals on these reserved resources and/or rate matching resources so that the orthogonality of reference signals can be guaranteed when a UB link and a DA link adopt space-division multiplexing.

Embodiment Ten

This embodiment also provides a signaling information transmission method that can implement a flexible and reliable transmission of signaling information. The method includes that: a first communication node sends eighth signaling information to a second communication node, and/or the first communication node receives ninth signaling information from the second communication node. The eighth signaling information and/or the ninth signaling information may include, but is not limited to, at least one of: information about a first signal set including a reference signal, or information about a second signal set including a reference signal. A first channel or signal and at least one signal in the first signal set satisfy a quasi co-location relationship with respect to one or more channel large-scale characteristic parameters; and/or a spatial transmit filtering parameter of a second channel or signal is obtained according to at least one signal in the second signal set. The first channel or signal is a channel or signal sent by the first communication node to one or more third communication nodes, and the second channel or signal is a channel or signal sent by one or more third communication nodes to the first communication node.

In an example of this embodiment, the method may also include steps described below. The first communication node sends tenth signaling information to the one or more third communication nodes, where the tenth signaling information is used for instructing the one or more third communication nodes to receive a signal in the first signal set; and/or, the first communication node sends eleventh signaling information to the one or more third communication nodes, where the eleventh signaling information is used for instructing the one or more third communication nodes to send a signal in the second signal set.

In an example of this embodiment, the first communication node may send the signal in the first signal set over a downlink; and the first communication node may receive the signal in the second signal set over an uplink.

For example, by still using the scenario shown in FIG. 1-1 as an example, it is assumed that an IAB donor node/IAB node 1 determines through measurement a beam set that may be used by an IAB node 2 over an access link, where one beam is associated with one reference signal. In an embodiment, when these beams are used for communication over the access link, a backhaul link and the access link may be space-division multiplexed so that the IAB donor node/IAB node 1 notifies the IAB node 2 of beam information (i.e., information about a reference signal set), and the IAB node 2 can communicate with an IAB node 3/UE over the access link by using only the beams in the beam set.

In an example, the IAB donor node/IAB node 1 notifies the IAB node 2 of information about a beam set in a UA link, i.e., the second signal set (e.g., the second signal includes a reference signal and/or a synchronization signal). A spatial filtering parameter of a signal in the UA link has to be obtained according to one or more reference signals in the second signal set, i.e., the signal in the UA link has to be transmitted using the beam in the notified beam set. That the spatial filtering parameter of one signal is obtained according to one reference signal represents that: the spatial filtering parameter of the one signal is the same as a spatial filtering parameter of the one reference signal; or the spatial filtering parameter of the one signal is obtained according to a spatial filtering parameter of the one reference signal, which may be slightly adjusted according to specific requirements.

The IAB donor node/IAB node 1 may also notify the IAB node 2 of information about a beam set in a DA link, i.e., the first signal set (e.g., the first signal includes a reference signal and/or a synchronization signal). A signal in the DA link and one or more reference signals in the first signal set have to satisfy a quasi co-location relationship with respect to the spatial filtering parameter. That is, the signal in the DA has to be transmitted using the beam in the notified beam set.

The IAB node 2 may also send request information to the IAB donor node/IAB node 1, where the request information includes the information about the first signal set and/or the information about the second signal set.

Herein, the spatial filtering parameter includes a spatial transmit filtering parameter and/or a spatial receive filtering parameter.

Herein, that two reference signals satisfy the quasi co-location relationship with respect to the spatial filtering parameter represents that: the spatial filtering parameter of one reference signal may be obtained from the spatial filtering parameter of the other reference signal.

Herein, that two reference signals satisfy the quasi co-location relationship with respect to one type of channel large-scale information represents that: the channel large-scale information of one reference signal may be obtained from the channel large-scale information of the other reference signal. One type of channel large-scale parameter includes at least one of: a Doppler shift, a Doppler spread, an average delay, a delay spread, or a spatial receive parameter. The channel large-scale parameter may also be referred to as a quasi co-location parameter herein.

The IAB node 2 may also send the request information to the IAB donor node/IAB node 1, where the request information includes the information about the first signal set and/or the information about the second signal set.

Embodiment Eleven

In this embodiment, a type of a resource needs to be determined. Types of different resources are distinguished according to a relationship between a predetermined threshold and an interval, where the interval is between a channel or signal falling in the resource and physical layer dynamic control signaling that schedules the channel or signal. Alternatively, types of different resources are distinguished according to a relationship between a predetermined threshold and an interval, where the interval is between the resource and a physical layer control channel closest to the resource. For example, in a first-type resource, the interval is greater than or equal to the predetermined threshold, and in a second-type resource, the interval is less than or equal to the predetermined threshold.

In an example, determining the type of the resource may also be referred to as determining a type of a time domain resource.

In an example, the physical layer control channel closest to the resource is a physical layer control channel that needs to be detected by a terminal.

In an example, control information in the physical layer control channel may schedule the channel or signal in the resource, for example, the physical layer control channel and the resource are in the same component carrier (CC)/BWP, or the control information in the physical layer control channel may schedule the channel or signal in the resource across CCs.

In an example, the physical layer control channel and the resource belong to the same component carrier or the same bandwidth part (BWP).

In an example, the resource type is associated with at least one of a multiplexing mode of A links, a resource division of A links, or a resource set occupied by one link.

The resource includes at least one of a time domain resource, a frequency domain resource, a reference signal resource, a sequence resource, a port resource, or a spatial domain resource.

In an example, a union of time domain resource sets included in different resource types does not include non-consecutive time domain resources.

In an example, time domain resources included in one resource type include non-consecutive time domain resources.

In an example, time domain resources included in different resource types appear in turn.

In an example, a validity period of time domain resource sets included in different resource types is control signaling.

Figures 2, 21:
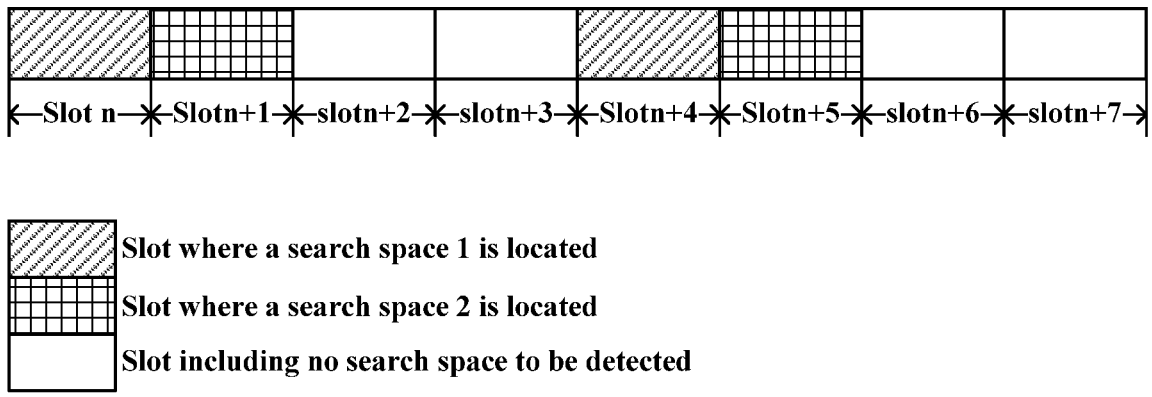
Figures 3, 21:
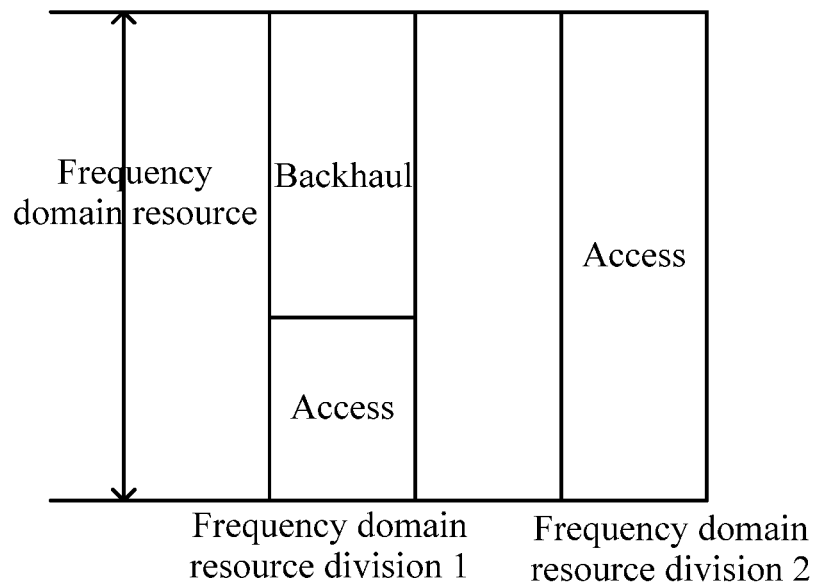

As shown in FIG. 21-1, an IAB donor node/IAB node 1 allocates a control channel to be detected over a DB link to the IAB node 2 every four slots and downlink control information (DCI) configured via RRC dynamically notifies that an interval is 1 in time domain, that is, an interval between the DCI and a PDSCH/AP-CSI-RS is at most one slot. For example, the PDSCH/AP-CSI-RS scheduled by the DCI in slotn can only fall in slotn and slotn+1. Therefore, the IAB donor node/IAB node 1 cannot dynamically give signals on backhaul resources to the IAB node 2 on {slotn+2, slotn+3, slotn+6, slotn+7} in FIG. 21-1; and on {slotn+2, slotn+3, slotn+6, slotn+7} an access link can occupy all frequency domain resources and reference signal resources, or other resources on {slotn+2, slotn+3, slotn+6, slotn+7} except resources occupied by a semi-static backhaul channel or signal may all be used as access resources. However, on {slotn, slotn+1, slotn+4, slotn+5}, the IAB donor node/IAB node 1 may schedule a DB/UB channel or signal for the IAB node 2, and a backhaul link and the access link can only semi-statically negotiate resources occupied by themselves. For example, the backhaul link and the access link adopt frequency division or space division, and each of the backhaul link and the access link occupies a part of reference signal resources. {slot4$n$+2, slot4$n$+3, n=0, 1, 2, . . . } is referred to as a first-type of resources and {slot4$n$, slot4$n$+1, n=0, 1, 2, . . . } is referred to as a second-type of resources. For example, a resource division between the backhaul link and the access link on the first-type of resources satisfies a frequency domain resource division 2 shown in FIG. 21-3, and a resource division between the backhaul link and the access link on the second-type of resources satisfies a frequency domain resource division 1 shown in FIG. 21-3.

In an example, the interval between the channel or signal in the resource and the physical layer dynamic control signaling that schedules the channel or signal is a minimum value of the intervals between the channel or signal in the resource and the physical layer dynamic control signaling. For example, as shown in FIG. 21-2, a control channel in a search space 2 may perform scheduling on slotn+2, so that the first-type of resources is {slotn+3, slotn+7}, that is, {slot4$n$+3, n=0, 1, 2, . . . }, and the second-type of resources is {slotn, slotn+1, slotn+2, slotn+4, slotn+5, slotn+6}, that is, {slot4$n$, slot4$n$+1, slot4$n$+2, n=0, 1, 2, . . . }.

Similarly, on different types of time domain resources, available BWP sets for the backhaul link are different, or available frequency domain resource sets for the backhaul link are different.

Similarly, on different types of time domain resources, the backhaul link and the access link correspond to different reference signal divisions.

Similarly, on different types of time domain resources, available reference signal sets for the backhaul link are different.

Similarly, on different types of time domain resource, available spatial domain resource sets for the backhaul link are different. One spatial domain resource is associated with one reference signal, for example, a spatial filtering transmit parameter of a spatial domain resource of an uplink signal is obtained according to a spatial transmit filtering parameter of the reference signal, and a downlink signal and the reference signal satisfy a quasi co-location relationship with respect to a spatial receive parameter of the spatial domain resource.

Similarly, on different types of time domain resources, the backhaul link and the access link have different available multiplexing mode sets.

Embodiment Twelve

In this embodiment, on resources where reference signals and/or control channels are located, a multiplexing mode of A links belongs to a predetermined multiplexing mode set.

For example, when a multiplexing mode between UB and DA on a resource belongs to {time-division multiplexing, frequency-division multiplexing}, reference signals of UB and/or DA may be transmitted on the resource, and/or control channels of UB and/or DA may be transmitted on the resource. When the multiplexing mode between UB and DA on a resource is SDM, the reference signals of UB and/or DA are not transmitted on the resource, and/or the control channels of UB and/or DA are not transmitted on the resource.

Similarly, when a multiplexing mode between DB and UA on a resource belongs to {time-division multiplexing, frequency-division multiplexing}, reference signals of DB and/or UA may be transmitted on the resource, and/or control channels of DB and/or UA may be transmitted on the resource. When the multiplexing mode between DB and UA on a resource is the SDM, the reference signals of DB and/or UA are not transmitted on the resource, and/or the control channels of DB and/or UA are not transmitted on the resource.

Embodiment Thirteen

In this embodiment, the number of different elements included in a spatial domain resource set associated with one time domain resource is associated with a set of multiplexing modes of A links, where A is a positive integer greater than 1.

For example, one spatial domain resource in DB is represented by one TCI state and one TCI state is used for establishing a relationship between T reference signal (RS) sets and T demodulation reference signal (DMRS) groups, where one of the T DMRS groups and one RS in one of the T RS sets satisfy a quasi co-location relationship with respect to a class of quasi co-location parameter.

For example, when UB and DA adopt SDM and/or frequency-division multiplexing, an available TCI state pool of DA can only include four TCI states and/or an SRS set for a 'code book' (or an SRS set for a 'non code book') of UB includes four SRS resources. When UB and DA adopt time-division multiplexing, the available TCI state pool of DA may include eight TCI states and/or the SRS set for the 'code book' (or the SRS set for the 'non code book') of UB includes eight SRS resources.

Similarly, when DB and UA adopt the SDM and/or the frequency-division multiplexing, an available TCI state pool of DB can only include four TCI states and/or an SRS set for the 'code book' (or an SRS set for the 'non code book') of UA includes four SRS resources. When DB and UA adopt the time-division multiplexing, the available TCJ state pool of DB may include eight TCJ states and/or the SRS set for the 'code book' (or the SRS set for the 'non code book') of UA includes eight SRS resources.

This is because two links need to share spatial domain resources on an IAB side in response to the SDM and/or the frequency-division multiplexing, but the two links do not need to share the spatial domain resources on the IAB side in response to the time-division multiplexing.

Herein, information about a multi-level bandwidth structure includes one or more of CSRS or BSRS, where for specific meanings of CSRS and BSRS, reference may be made to protocol 38.211.

Embodiment Fourteen

Figures 1, 22:
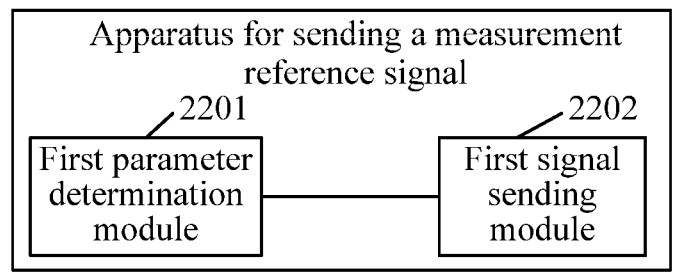
Figures 2, 22:
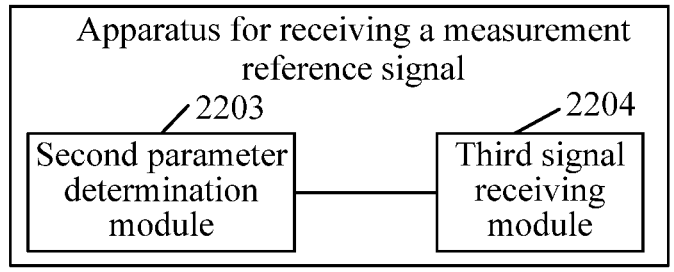

This embodiment provides an apparatus for sending a measurement reference signal. The apparatus may be applied to a communication node device, which may serve as any one of the communication nodes which, for example, include, but are not limited to, the first communication node in the embodiments described above according to application scenarios. As shown in FIG. 22-1, the apparatus includes a first parameter determination module 2201 and a first signal sending module 2202. The first parameter determination module 2201 is configured to determine parameter information of a measurement reference signal according to received first signaling information and/or a pre-negotiated first parameter determination rule. The first signal sending module 2202 is configured to send the measurement reference signal according to the parameter information.

This embodiment further provides an apparatus for receiving a measurement reference signal. The apparatus may also be applied to a communication node device according to disclosure requirements. The communication node device may serve as any one of the communication nodes which, for example, include, but are not limited to, the second communication node in the embodiments described above according to application scenarios. As shown in FIG. 22-2, the apparatus includes a second parameter determination module 2203 and a third signal receiving module 2204. The second parameter determination module 2203 is configured to send first signaling information. The first signaling information includes parameter information of a measurement reference signal.

The third signal receiving module 2204 is configured to receive the measurement reference signal according to the parameter information determined by the second parameter determination module 2203.

In this embodiment, the parameter information determined by the first parameter determination module 2201 and/or the second parameter determination module 2203 includes, but is not limited to, at least one of: a lowest subcarrier index or a highest subcarrier index in each group of M groups of subcarriers occupied by the measurement reference signal in one physical resource block; a lowest time domain symbol index or a highest time domain symbol index in each group of N groups of time domain symbols occupied by the measurement reference signal in one time unit; information about a code division multiplexing type of a port of the measurement reference signal; density information p of the measurement reference signal; information about a physical resource block set corresponding to the measurement reference signal; information about a code division multiplexing length corresponding to one code division multiplexing group included in the measurement reference signal; a multiplexing length of one code division multiplexing group, included in the measurement reference signal in time domain; a multiplexing length of one code division multiplexing group included in the measurement reference signal, in frequency domain; the number of ports of the measurement reference signal; a total number of combs of the measurement reference signal; a comb offset of the measurement reference signal; or a non-empty intersection between a parameter type set included in the parameter information and a parameter type set required for determining a pattern of a downlink measurement reference signal; where M and N are positive integers.

In an example of this embodiment, the parameter information determined by the first parameter determination module 2201 and/or the second parameter determination module 2203 may include selection information of a parameter type set. The parameter type set includes at least one of a first parameter type set or a second parameter type set. The first parameter type set includes parameter information required for determining a pattern of a first-type measurement reference signal, and the second parameter type set includes parameter information required for determining a pattern of a second-type measurement reference signal.

In an example of this embodiment, the measurement reference signal sent by the first signal sending module 2202 satisfies at least one of the following characteristics: the measurement reference signal is a measurement reference signal sent over an uplink; a time domain symbol where the measurement reference signal is located is one or more time domain symbols in one time unit; a pattern of the measurement reference signal is a CSI-RS pattern; a pattern of the measurement reference signal is a downlink reference signal pattern; a resource of the measurement reference signal occupies X groups of consecutive subcarriers in one physical resource block; the number of subcarriers occupied by a port of the measurement reference signal in one physical resource block includes {0.5, 1, 2}; or the number of ports of the measurement reference signal included in a resource of the measurement reference signal belongs to {1, 2, 4, 8, 12, 16, 24, 32}; where X is a positive integer.

In an example of this embodiment, the measurement reference signal sent by the first signal sending module 2202 may also satisfy at least one of the following conditions that: the measurement reference signal and a first channel or signal occupy different subcarriers on the same time domain symbol; in a case where the measurement reference signal and a first channel or signal occupy the same time domain symbol, the first channel or signal is unable to occupy a subcarrier occupied by the measurement reference signal; or in a case where a subcarrier occupied by the measurement reference signal overlaps with a subcarrier occupied by a first channel or signal, a priority between the measurement reference signal and the first channel or signal is determined according to the first signaling information and/or the pre-negotiated first parameter determination rule. The first channel or signal is a channel or signal sent by the first communication node.

In an example of this embodiment, at least one of the following information is associated with whether the first channel or signal and the measurement reference signal are able to be simultaneously sent on the same time domain symbol: the first signaling information; whether the pattern of the measurement reference signal belongs to a predetermined pattern type; whether transform precoding is enabled in response to sending the measurement reference signal and/or the first channel or signal; whether the measurement reference signal is an uplink reference signal over a backhaul link; whether the measurement reference signal occupies subcarriers at equal intervals in one physical resource block; a sequence type used by the measurement reference signal; whether the measurement reference signal is the measurement reference signal for interference measurement or the measurement reference signal for channel measurement; or whether a use of the measurement reference signal belongs to a predetermined use set. The first channel or signal is a channel or signal sent by the first communication node. In this embodiment, the first communication node may be a communication node that sends the preceding measurement reference signal.

It is to be understood that in this embodiment, for the process in which the first parameter determination module 2201 and/or the second parameter determination module 2203 determine the parameter information according to the first signaling information and/or the first parameter determination rule and the conditions that the determined parameter information may satisfy, reference may be made to the embodiments described above and repetition is not made in this embodiment. For the process in which the first signal sending module 2202 sends the measurement reference signal according to the parameter information determined by the first parameter determination module, the conditions that the sent measurement reference signal needs to satisfy, and the process in which the third signal receiving module 2204 receives the measurement reference signal according to the parameter information determined by the second parameter determination module 2203, etc., reference may also be made to the embodiments described above and repetition is not made in this embodiment, either.

In addition, it is to be understood that the functions of the first parameter determination module 2201 and the first signal sending module 2202 may be implemented by a processor or controller in the communication node device; and the functions of the second parameter determination module 2203 and the third signal receiving module 2204 may also be implemented by the processor or controller in the communication node device. This embodiment may further provide a communication system including the apparatuses described above.

Embodiment Fifteen

Figures 1, 23:
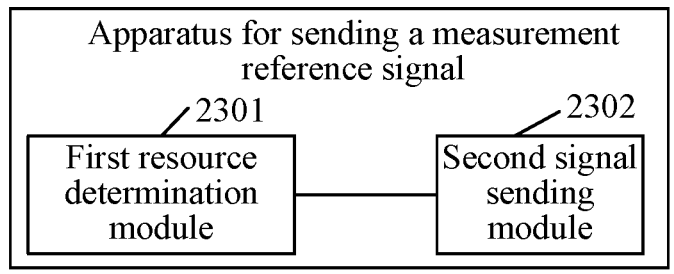
Figures 2, 23:
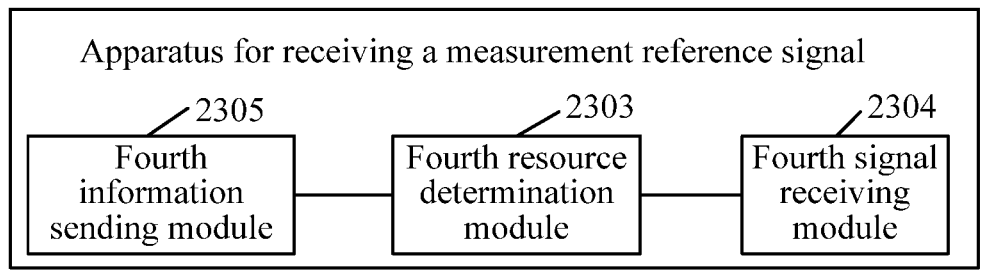

This embodiment provides an apparatus for sending a measurement reference signal which may, but may not necessarily, be applied to a first communication node illustrated in the embodiments described above, and it is to be understood that the first communication node is not limited to the cases illustrated in the embodiments described above and may be flexibly determined according to application scenarios. The apparatus for sending the measurement reference signal, as shown in FIG. 23-1, may include a first resource determination module 2301 and a second signal sending module 2302. The first resource determination module 2301 is configured to determine resources of P types of measurement reference signals according to second signaling information received from a second communication node and/or a second parameter determination rule pre-negotiated with a second communication node. The second signal sending module 2302 is configured to send the P types of measurement reference signals on the resources of the P types of measurement reference signals. The determined resources of the P types of measurement reference signals may include, but are not limited to, a resource of a measurement reference signal for interference measurement; and P is a positive integer.

This embodiment further provides an apparatus for receiving a measurement reference signal which may, but may not necessarily, be applied to the second communication node illustrated in the embodiments described above, and it is to be understood that the second communication node is not limited to the cases illustrated in the embodiments described above and may be flexibly determined according to application scenarios. In this embodiment, the apparatus for receiving the measurement reference signal, as shown in FIG. 23-2, includes a fourth resource determination module 2303 and a fourth signal receiving module 2304. The fourth resource determination module 2303 is configured to send second signaling information to a first communication node, where the second signaling information includes information about resources of P types of measurement reference signals. The fourth signal receiving module 2304 is configured to receive the P types of measurement reference signals on the determined resources of the P types of measurement reference signals.

As illustrated above, the resources of the P types of measurement reference signals include the resource of the measurement reference signal for interference measurement.

In an example of this embodiment, as shown in FIG. 23-2, the apparatus for receiving the measurement reference signal may further include a fourth information sending module 2305. The fourth information sending module 2305 is configured to send channel state report information to the first communication node, and/or cause the second communication node to send resource information to the first communication node, where the resource information is information about a resource occupied by the channel state report information.

In an example, the channel state report information may satisfy, but is not limited to, at least one of the following characteristics that: the channel state report information is obtained based on the P types of measurement reference signals; the channel state report information includes a signal-to-interference-plus-noise ratio (SINR); the channel state report information includes information about a performance difference between two types of the P types of measurement reference signals; the channel state information is feedback information for an uplink channel state; a correspondence exists between the channel state information and the P types of measurement reference signals; or the channel state information is sent by the second communication node to the first communication node on a downlink channel or signal.

In an example of this embodiment, the measurement reference signal for interference measurement, which is sent by the second signal sending module 2302 and/or received by the fourth signal receiving module 2304, may satisfy, but is not limited to, at least one of the following characteristics that: configuration information of the measurement reference signal for interference measurement carries no configuration information of a spatial transmit filtering parameter; a signal between the first communication node and the second communication node carries no spatial filtering parameter of the measurement reference signal for interference measurement; for example, the spatial filtering parameter of the measurement reference signal for interference measurement cannot be acquired according to the signal between the first communication node and the second communication node, and a reference signal associated with the spatial filtering parameter of the measurement reference signal for interference measurement does not belong to a reference signal between the first communication node and the second communication node. An intersection between a spatial filtering parameter of the measurement reference signal for interference measurement and spatial filtering parameters in a predetermined spatial filtering parameter set is empty, where each of the spatial filtering parameters in the predetermined spatial filtering parameter set is associated with one signal between the first communication node and the second communication node; a spatial filtering parameter of the measurement reference signal for interference measurement is obtained according to a spatial transmit filtering parameter of a first reference signal sent by the first communication node to one or more third communication nodes; parameter information of the measurement reference signal for interference measurement is the same as parameter information of a second reference signal sent by the first communication node to one or more third communication nodes; a parameter type for determining the measurement reference signal for interference measurement is the same as a parameter type for determining a third reference signal sent by the first communication node to one or more third communication nodes; the first communication node sends a fourth reference signal to one or more third communication nodes on the resource of the measurement reference signal for interference measurement; the measurement reference signal for interference measurement is used for measuring interference of a signal, which is sent by the first communication node to one or more third communication nodes, reaching the second communication node; the measurement reference signal for interference measurement is used by the second communication node to measure interference; or the measurement reference signal for interference measurement is used by the second communication node to measure interference of a first-type signal, which is sent by the first communication node, reaching the second communication node. A control channel resource group where control signaling for scheduling the first-type signal is located and a control channel resource group where the second signaling information is located are two different control channel resource groups, and/or a frequency domain bandwidth where the first-type signal is located and a frequency domain bandwidth where the second signaling information is located are two different frequency domain bandwidths, and/or the frequency domain bandwidth where the first-type signal is located and a frequency domain bandwidth where a channel or signal scheduled by the second signaling information is located are two different frequency domain bandwidths. Each of the first reference signal, the second reference signal, the third reference signal, and the fourth reference signal may be at least one of a downlink measurement reference signal, a downlink demodulation reference signal, a downlink phase-tracking reference signal, or a synchronization signal.

In an example of this embodiment, the second signaling information received from the second communication node may include, but is not limited to, at least one of the following parameter information: a lowest subcarrier index or a highest subcarrier index in each group of M groups of subcarriers occupied by the measurement reference signal for interference measurement in one physical resource block; a lowest time domain symbol index or a highest time domain symbol index in each group of N groups of time domain symbols occupied by the measurement reference signal for interference measurement in one time unit; information about a physical resource block set occupied by the measurement reference signal for interference measurement; information about a code division multiplexing type of a port of the measurement reference signal for interference measurement; density information p of the measurement reference signal for interference measurement; information about a code division multiplexing length corresponding to one code division multiplexing group included in the measurement reference signal for interference measurement; a multiplexing length of one code division multiplexing group included in the measurement reference signal for interference measurement in frequency domain; a multiplexing length of one code division multiplexing group included in the measurement reference signal for interference measurement in time domain; information about a pattern type of the measurement reference signal for interference measurement, where the pattern type includes at least a first-type pattern and a second-type pattern; selection information of a parameter type set corresponding to the measurement reference signal for interference measurement; a total number of combs corresponding to the measurement reference signal for interference measurement; or a comb offset corresponding to the measurement reference signal for interference measurement; where M and N are positive integers.

In an example of this embodiment, the P types of measurement reference signals sent by the second signal sending module 2302 may satisfy, but are not limited to, at least one of the following characteristics that: the P types of measurement reference signals further include a measurement reference signal for channel measurement; the P types of measurement reference signals correspond to a same spatial receive filtering parameter; the P types of measurement reference signals correspond to different spatial transmit filtering parameters; each type of the P types of measurement reference signals has corresponding configuration information of a spatial transmit filtering parameter; information about spatial transmit filtering parameters of the P types of measurement reference signals is associated with type information of the P types of measurement reference signals; or the P types of measurement reference signals are uplink measurement reference signals.

It is to be understood that in this embodiment, for the process in which the first resource determination module 2301 determines the resources of the P types of measurement reference signals according to the second signaling information and/or the second parameter determination rule, the process in which the fourth resource determination module 2303 determines the resources of the P types of measurement reference signals according to the second signaling information sent to the first communication node and/or the second parameter determination rule pre-negotiated with the first communication node, and the conditions that the determined resources of the P types of measurement reference signals may satisfy, etc., reference may be made to the embodiments described above and repetition is not made here. The process in which the second signal sending module 2302 sends the P types of measurement reference signals on the resources of the P types of measurement reference signals, the conditions that the sent P types of measurement reference signals need to satisfy, and the process in which the fourth signal receiving module 2304 receives the P types of measurement reference signals on the determined resources of the P types of measurement reference signals, etc., reference may also be made to the embodiments described above and repetition is not made here, either.

In addition, it is to be understood that the functions of the first resource determination module 2301 and the second signal sending module 2302 may be implemented by a processor or controller in a communication node device; and the functions of the fourth resource determination module 2303 and the fourth signal receiving module 2304 may be implemented by the processor or controller in the communication node device. This embodiment may further provide a communication system including the apparatuses described above.

Embodiment Sixteen

Figures 1, 24:
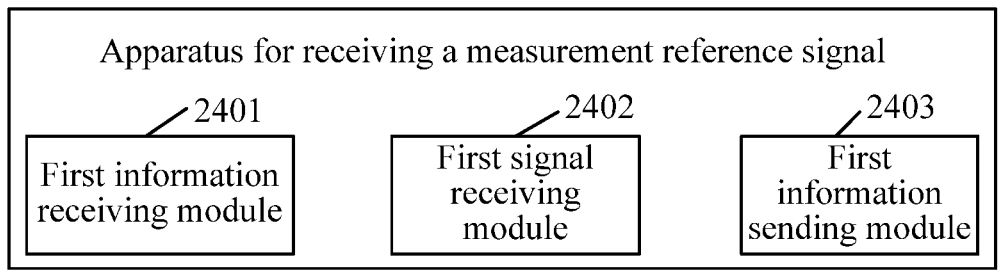
Figures 2, 24:
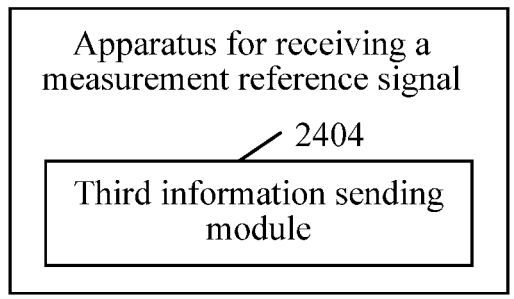

This embodiment further provides an apparatus for receiving a measurement reference signal which may, but may not necessarily, be applied to a first communication node illustrated in the embodiments described above, and it is to be understood that the first communication node is not limited to the cases illustrated in the embodiments described above and may be flexibly determined according to application scenarios. The apparatus for receiving the measurement reference signal, as shown in FIG. 24-1, includes a first information receiving module 2401 and a first signal receiving module 2402. The first information receiving module 2401 is configured to receive third signaling information sent by a second communication node, and the third signaling information includes information about an interference measurement resource. The first signal receiving module 2402 is configured to receive at least one signal sent by one or more third communication nodes on the interference measurement resource determined according to the information about the interference measurement resource; and/or an intersection between a parameter type included in the information about the interference measurement resource and a parameter type for determining an uplink reference signal pattern is non-empty, and/or the first communication node does not receive a downlink measurement reference signal on the interference measurement resource.

This embodiment further provides an apparatus for receiving a measurement reference signal which may, but may not necessarily, be applied to the second communication node illustrated in the embodiments described above, and it is to be understood that the second communication node is not limited to the cases illustrated in the embodiments described above and may be flexibly determined according to application scenarios. The apparatus for receiving the measurement reference signal, as shown in FIG. 24-2, includes a third information sending module 2404. The third information sending module 2404 is configured to send third signaling information to a first communication node, and the third signaling information includes information about an interference measurement resource. The third signaling information is used for instructing the first communication node to receive a signal sent by one or more third communication nodes on the interference measurement resource determined according to the information about the interference measurement resource, and/or a non-empty intersection between a parameter type included in the information about the interference measurement resource and a parameter type for determining an uplink reference signal pattern, and/or the second communication node not to send a downlink signal on the interference measurement resource.

In an example of this embodiment, the preceding signal or resource satisfies, but is not limited to, at least one of the following conditions: the signal sent by the third communication node is an uplink signal; the interference measurement resource is an interference measurement resource corresponding to channel state information, where the channel state information is channel state information sent by the first communication node to the second communication node; the interference measurement resource and a channel measurement resource do not satisfy a quasi co-location relationship with respect to a spatial receive filtering parameter, where the interference measurement resource and the channel measurement resource correspond to same channel state report information; a quasi co-location reference signal of the interference measurement resource with respect to a spatial receive filtering parameter is a first quasi co-location reference signal, and a quasi co-location reference signal of the channel measurement resource with respect to the spatial receive filtering parameter is a second quasi co-location reference signal, where the interference measurement resource and the channel measurement resource correspond to same channel state report information; a pattern of the interference measurement resource is a CSI-RS pattern; a pattern of the interference measurement resource is an SRS pattern; the first communication node does not receive on the interference measurement resource a downlink measurement reference signal sent by the second communication node; the first communication node does not receive the downlink measurement reference signal on the interference measurement resource; or an intersection between a resource occupied by the interference measurement resource and a resource occupied by a measurement reference signal between the first communication node and the second communication node is empty.

The channel state information is channel state information sent by the first communication node to the second communication node.

In an embodiment of this embodiment, the third signaling information received by the first information receiving module 2401 may include, but is not limited to, at least one of: type information of the interference measurement resource which at least includes a first-type interference measurement resource and a second-type interference measurement resource; type information of a non-zero power (NZP)-interference measurement resource which at least includes a first-type NZP-interference measurement resource and a second-type NZP-interference measurement resource; pattern type selection information corresponding to the interference measurement resource; information about one group of time domain symbols occupied by the interference measurement resource in one time unit; information about a repetition factor of the interference measurement resource; a frequency-hopping parameter of the interference measurement resource; or information about a multi-level bandwidth structure of the interference measurement resource.

As shown in FIG. 24-1, in an example of this embodiment, the apparatus for receiving the measurement reference signal further includes a first information sending module 2403. The first information sending module 2403 is configured to send fourth signaling information to the third communication node. The fourth signaling information is used for instructing the third communication node to send a second signal. An intersection between a resource occupied by the second signal and the resource occupied by the interference measurement resource is non-empty, and the occupied resource includes at least one of a time domain resource, a frequency domain resource, a code domain resource, or a spatial domain resource.

In an example of this embodiment, a parameter type set included in the third signaling information received by the first information receiving module 2401 includes, but is not limited to, at least one of: the number of ports, a comb offset, information about a time domain symbol in one time unit, information about a time domain frequency-hopping unit, frequency domain information, a frequency domain offset in a multi-level bandwidth structure, information about frequency domain frequency-hopping, frequency-hopping information of a sequence group or a sequence number, a sequence generation parameter, or selection information of a pattern type of an interference measurement reference signal. The pattern type includes, but is not limited to, at least one of an uplink reference signal pattern or a downlink reference signal pattern.

It is to be understood that in this embodiment, for the process in which the first information receiving module 2401 receives the third signaling information, the process in which the third information sending module 2404 sends the third signaling information to the first communication node, the content that may be included in the third signaling information, and the conditions that the third signaling information may satisfy, etc., reference may be made to the embodiments described above and repetition is not made here. For the process in which the first signal receiving module 2402 receives the at least one signal sent by one or more third communication nodes on the interference measurement resource determined according to the information about the interference measurement resource, the content and type of the received signal, and the conditions that the received signal may satisfy, etc., reference may be made to the embodiments described above, and repetition is not made here. The manner in which the first information sending module 2403 sends the fourth signaling information to the third communication node and the content that may be included in the fourth signaling information, etc. may also be flexibly set according to application scenarios.

In addition, it is to be understood that the functions of the first information receiving module 2401, the first signal receiving module 2402, and the first information sending module 2403 may be implemented by a processor or controller in a communication node device; and the function of the third information sending module 2404 may be implemented by the processor or controller in the communication node device. This embodiment may further provide a communication system including the apparatuses described above.

Embodiment Seventeen

Figure 25:
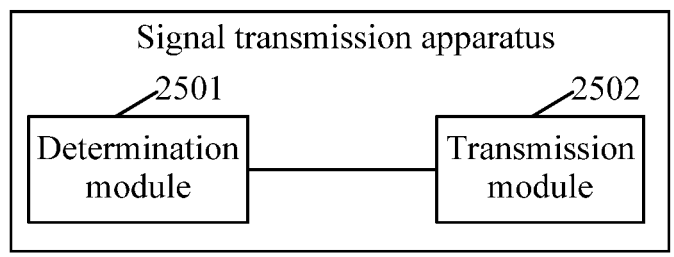
FIG. 25 is a structural diagram of a signal transmission apparatus according to embodiment seventeen of the present disclosure.

This embodiment provides a signal transmission apparatus, which may be applied to various devices at communication nodes. As shown in FIG. 25, the apparatus includes a determination module 2501 and a transmission module 2502. The determination module 2501 is configured to determine a correspondence between U resource sets and Q objects according to transmitted fifth signaling information and/or a third parameter determination rule. The objects are one of: spatial transmit filtering parameter sets, quasi co-location reference signal sets, sets of combinations of spatial transmit filtering parameters and quasi co-location reference signals, frequency domain resource sets, reference signal sets, frequency domain resource divisions of A links, power parameter sets, multiplexing mode sets of B links, or sets of combinations of C reference signals over C links. The transmission module 2502 is configured to transmit a channel or signal according to the correspondence. In this embodiment, a transmission includes sending or receiving. U and Q are positive integers greater than or equal to 1, A and B are positive integers greater than 1, and a resource includes at least one of a time domain resource, a frequency domain resource, or a reference signal resource.

In an example of this embodiment, the operation in which the determination module 2501 determines the correspondence between the U resource sets and the Q objects includes determining a correspondence between U time domain resource sets and Q frequency domain resource sets. A frequency domain resource occupied by a channel or signal in one time unit is a subset of one of the Q frequency domain resource sets corresponding to one of the U time domain resource sets to which the one time unit belongs. And/or, the operation in which the determination module 2501 determines the correspondence between the U resource sets and the Q objects includes that the determination module 2501 determines a correspondence between U time domain resource sets and Q reference signal sets, where a reference signal corresponding to a channel or signal in one time unit is a subset of one of the Q reference signal sets corresponding to one of the U time domain resource sets to which the one time unit belongs. And/or, the operation in which the determination module 2501 determines the correspondence between the U resource sets and the Q objects includes determining a correspondence between U time domain resource sets and Q frequency domain resource divisions of the A links, which satisfies at least one of the following characteristics that: a frequency domain resource occupied by a channel or signal in a time unit is a subset of a frequency domain resource set corresponding to a link to which the channel or signal belongs in one of the Q frequency domain resource divisions corresponding to one of the U time domain resource sets to which the time unit belongs; or frequency domain resources occupied by channels or signals over the A links in a time unit satisfy one of the Q frequency domain resource divisions corresponding to one of the U time domain resource sets to which the time unit belongs. And/or, the operation in which the determination module 2501 determines the correspondence between the U resource sets and the Q objects includes determining a correspondence between U time domain resource sets and Q power parameter sets, which satisfies at least one of the following characteristics that: a power parameter set corresponding to a channel or signal in one time unit is one of the Q power parameter sets corresponding to one of the U time domain resource sets to which the time unit belongs, the Q power parameter sets include the same power parameter type, or the Q power parameter sets are Q configuration values for the same type of parameter set. And/or, the operation in which the determination module 2501 determines the correspondence between the U resource sets and the Q objects includes determining a correspondence between the U resource sets and Q multiplexing mode sets, where one multiplexing mode includes a multiplexing mode of the B links, and a multiplexing mode set of the B links in one resource belongs to one of the Q multiplexing mode sets corresponding to the one resource. And/or, the operation in which the determination module 2501 determines the correspondence between the U resource sets and the Q objects includes determining a correspondence between the U resource sets and Q reference signal combinations, where one of the Q reference signal combinations includes a reference signal corresponding to each of the C links, and a combination of reference signals over the C links in one resource belongs to a set of combinations of reference signals over the C links corresponding to the one resource.

In an application scenario of this embodiment, the operation in which the determination module 2501 determines a correspondence between the U resource sets and Q sets includes at least one of: determining a correspondence between the U resource sets and the Q sets; determining a correspondence between the U resource sets and Q SRS resource sets used for a code book; determining a correspondence between the U resource sets and Q SRS resource sets used for a non-code book; determining a correspondence between the U resource sets and Q TCI state pools; or determining a correspondence between the U resource sets and Q sets of combinations (of first reference signals and quasi co-location reference signals). Each of the Q SRS resource sets corresponds to one spatial filtering parameter set, each resource in an SRS resource set corresponds to a range of spatial filtering parameters; each of the Q TCI state pools corresponds to one quasi co-location reference signal set, and each TCI state in a TCI state pool includes one quasi co-location reference signal; where U is a positive integer and Q is a positive integer less than or equal to U.

In an example of this embodiment, the operation in which the transmission module 2502 transmits the channel or signal according to the correspondence includes: not sending or not receiving a channel or signal on the resource in response to receiving configuration information that does not satisfy at least one of the following characteristics that: a spatial filtering parameter of the channel or signal on the resource belongs to a spatial filtering parameter set corresponding to the resource; a quasi co-location reference signal of the channel or signal, on the resource, with respect to a spatial receive filtering parameter belongs to a quasi co-location reference signal set corresponding to the resource; the channel or signal on the resource and at least one quasi co-location reference signal in a quasi co-location reference signal set corresponding to the resource satisfy a quasi co-location relationship with respect to a spatial receive filtering parameter; a set corresponding to the channel or signal on the resource belongs to one set, which corresponds to the resource, of the Q sets; or frequency domain resources occupied by channels or signals over the A links on the resource satisfy a frequency domain resource division of the A links corresponding to the resource.

It is to be understood that in this embodiment, for the process in which the determination module 2501 determines the correspondence between the U resource sets and the Q objects according to the received fifth signaling information and/or the third parameter determination rule, the content of the U resource sets, and the conditions that the U resource sets may satisfy, etc., reference may be made to the embodiments described above and repetition is not made here. For the process in which the transmission module 2502 transmits the channel or signal according to the correspondence, reference may also be made to the embodiments described above and repetition is not made here.

In addition, it is to be understood that the functions of the determination module 2501 and the transmission module 2502 may be implemented by a processor or controller in a communication node device. This embodiment may further provide a communication system including the apparatuses described above.

Embodiment Eighteen

Figure 26:
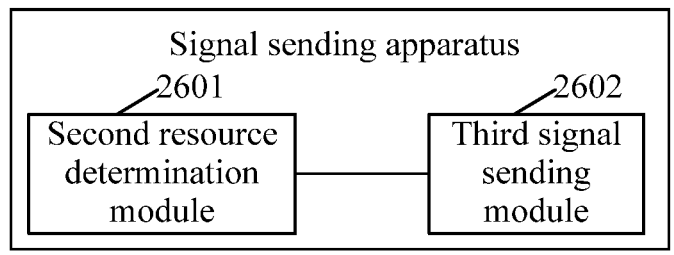
FIG. 26 is a structural diagram of a signal sending apparatus according to embodiment eighteen of the present disclosure.

This embodiment further provides a signal sending apparatus that may be applied to various devices at communication nodes. As shown in FIG. 26, the apparatus includes a second resource determination module 2601 and a third signal sending module 2602. The second resource determination module 2601 is configured to determine a first-type time-frequency resource according to received sixth signaling information or a fourth parameter determination rule. The third signal sending module 2602 is configured to send a channel or signal according to the determined first-type time-frequency resource. The channel or signal is unable to occupy the first-type time-frequency resource.

In an example of this embodiment, the sixth signaling information received by the second resource determination module 2601 may include, but is not limited to, at least one of the following information about the first-type time-frequency resource: information about a physical resource block set; position information of a time domain symbol occupied in one time unit; time behavior information; period information; period offset information; information about a set of indexes of subcarriers occupied in one physical resource block; a lowest subcarrier index or a highest subcarrier index in each group of D groups of subcarriers occupied in one physical resource block; a lowest time domain symbol index or a highest time domain symbol index in each group of J groups of time domain symbols occupied in one time unit; information about a downlink reference signal pattern; or selection information of a pattern type which includes at least a first-type pattern and a second-type pattern; where D and J are positive integers.

In an embodiment of this embodiment, the first-type pattern is an uplink reference signal pattern, and the second-type pattern is a downlink reference signal pattern. In another embodiment of this embodiment, the first-type pattern is an SRS pattern, and the second-type pattern is a CSI-RS pattern. A configuration may be flexibly set according to application scenarios.

It is to be understood that in this embodiment, for the process in which the second resource determination module 2601 determines the first-type time-frequency resource according to the received sixth signaling information or the fourth parameter determination rule, the content of the first-type time-frequency resource, and the conditions that the first-type time-frequency resource may satisfy, etc., reference may be made to the embodiments described above and repetition is not made here. For the process in which the third signal sending module 2602 sends the channel or signal according to the determined first-type time-frequency resource, reference may also be made to the embodiments described above and repetition is not made here.

In addition, it is to be understood that the functions of the second resource determination module 2601 and the third signal sending module 2602 may be implemented by a processor or controller in a communication node device. This embodiment may further provide a communication system including the apparatuses described above.

Embodiment Nineteen

Figure 27:
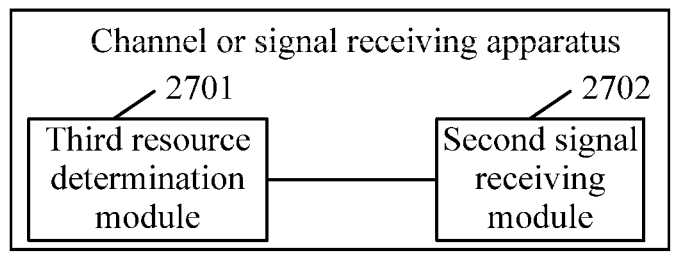
FIG. 27 is a structural diagram of a channel or signal receiving apparatus according to embodiment nineteen of the present disclosure.

This embodiment further provides a channel or signal receiving apparatus which may be applied to various devices at communication nodes. As shown in FIG. 27, the apparatus includes a third resource determination module 2701 and a second signal receiving module 2702. The third resource determination module 2701 is configured to determine a second-type time-frequency resource according to received seventh signaling information or a fifth parameter determination rule. The second signal receiving module 2702 is configured to receive a channel or signal according to the determined second-type time-frequency resource. The channel or signal does not occupy the second-type time-frequency resource.

In an example of this embodiment, the seventh signaling information received by the third resource determination module 2701 includes, but is not limited to, at least one of the following information about the second-type time-frequency resource: a number of ports; a comb offset; information about a time domain symbol in one time unit; information about a time domain frequency-hopping unit; frequency domain information; a frequency domain offset in a multi-level bandwidth structure; information about frequency domain frequency-hopping; information about a pattern of an uplink reference signal; or selection information of a pattern type which includes at least a first-type pattern and a second-type pattern.

In an embodiment of this embodiment, the first-type pattern is an uplink reference signal pattern, and the second-type pattern is a downlink reference signal pattern. In another embodiment of this embodiment, the first-type pattern is an SRS pattern, and the second-type pattern is a CSI-RS pattern. A configuration may be flexibly set according to application scenarios.

It is to be understood that in this embodiment, for the process in which the third resource determination module 2701 determines the second-type time-frequency resource according to the received seventh signaling information or the fifth parameter determination rule, the content of the second-type time-frequency resource, and the conditions that the second-type time-frequency resource may satisfy, etc., reference may be made to the embodiments described above and repetition is not made here. For the process in which the second signal receiving module 2702 receives the channel or signal according to the determined second-type time-frequency resource, reference may also be made to the embodiments described above and repetition is not made here.

In addition, it is to be understood that the functions of the third resource determination module 2701 and the second signal receiving module 2702 may be implemented by a processor or controller in a communication node device. This embodiment may further provide a communication system including the apparatuses described above.

Embodiment Twenty

Figure 28:
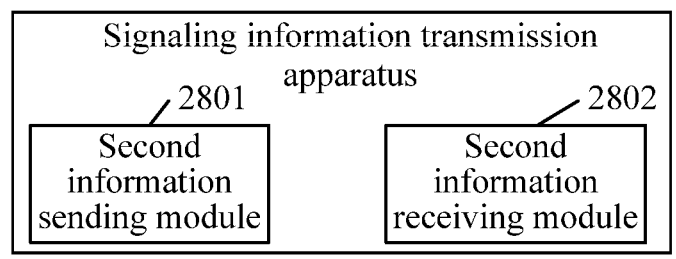
FIG. 28 is a structural diagram of a signaling information transmission apparatus according to embodiment twenty of the present disclosure.

This embodiment further provides a signaling information transmission apparatus which may, but may not necessarily, be applied to a first communication node illustrated in the embodiments described above, and it is to be understood that the first communication node is not limited to the cases illustrated in the embodiments described above and may be flexibly determined according to application scenarios. The signaling information transmission apparatus, as shown in FIG. 28, includes a second information sending module 2801 and/or a second information receiving module 2802. The second information sending module 2801 is configured to send eighth signaling information to a second communication node. The second information receiving module 2802 is configured to receive ninth signaling information sent by the second communication node. In some examples, the eighth signaling information and/or the ninth signaling information include at least one of information about a first signal set including a reference signal or information about a second signal set including a reference signal. A first channel or signal and at least one signal in the first signal set satisfy a quasi co-location relationship with respect to one or more channel large-scale characteristic parameters; and/or a spatial transmit filtering parameter of a second channel or signal is obtained according to at least one signal in the second signal set. The first channel or signal is a channel or signal sent by the first communication node to one or more third communication nodes, and the second channel or signal is a channel or signal sent by one or more third communication nodes to the first communication node.

In some application scenarios, the second information sending module 2801 may be further configured to send tenth signaling information to the one or more third communication nodes. The tenth signaling information is used for instructing the one or more third communication nodes to receive a signal in the first signal set. And/or, the second information sending module 2801 is further configured to send eleventh signaling information to the one or more third communication nodes. The eleventh signaling information is used for instructing the one or more third communication nodes to send a signal in the second signal set.

It is to be understood that in this embodiment, for the process in which the second information sending module 2801 sends the eighth signaling information to the second communication node, the content included in the eighth signaling information, and the conditions that the eighth signaling information may satisfy, etc., reference may be made to the embodiments described above and repetition is not made here. For the process in which the second information receiving module 2802 receives the ninth signaling information sent by the second communication node, the content included in the ninth signaling information, and the conditions that the ninth signaling information may satisfy, etc., reference may be made to the embodiments described above and repetition is not made here, either.

In addition, it is to be understood that the functions of the second information sending module 2801 and the second information receiving module 2802 may be implemented by a processor or controller in a communication node device. This embodiment may further provide a communication system including the apparatuses described above.

Embodiment Twenty-One

Figure 29:
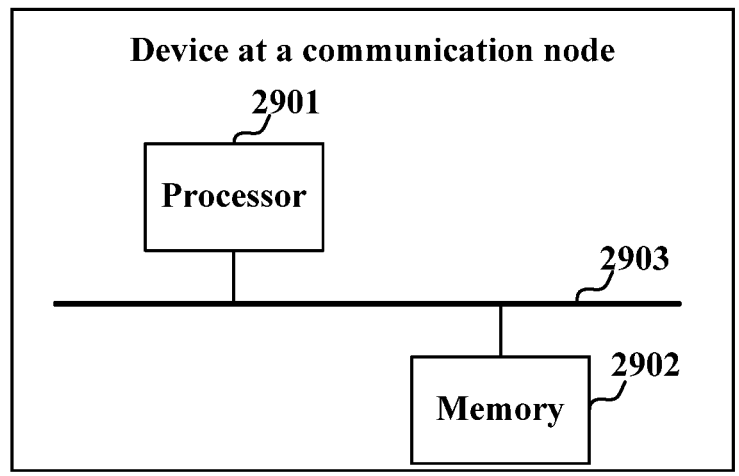
FIG. 29 is a structural diagram of a communication node device according to embodiment twenty-one of the present disclosure.

This embodiment further provides a communication node device. The communication node device may serve as any one of the communication nodes in the embodiments described above according to application scenarios. In an application scenario of this embodiment, a communication system including at least two devices at communication nodes that have different roles may be provided. As shown in FIG. 29, the communication node device includes a processor 2901, a memory 2902, and a communication bus 2903. The communication bus 2903 is configured to implement a communication connection between the processor 2901 and the memory 2902. The processor 2901 and the memory 2902 may be configured to perform at least one of functions described below. The memory 2902 is configured to store one or more first programs, and the processor 2901 is configured to perform the one or more first programs to implement steps of the method for sending the measurement reference signal illustrated in the embodiments described above. Alternatively, the memory 2902 is configured to store one or more second programs, and the processor 2901 is configured to perform the one or more second programs to implement steps of the method for receiving the measurement reference signal illustrated in the embodiments described above. Alternatively, the memory 2902 is configured to store one or more third programs, and the processor 2901 is configured to perform the one or more third programs to implement steps of the method for sending the measurement reference signal illustrated in the embodiments described above. Alternatively, the memory 2902 is configured to store one or more fourth programs, and the processor 2901 is configured to perform the one or more fourth programs to implement steps of the method for receiving the measurement reference signal described above. Alternatively, the memory 2902 is configured to store one or more fifth programs, and the processor 2901 is configured to perform the one or more fifth programs to implement steps of the method for receiving the measurement reference signal illustrated in the embodiments described above. Alternatively, the memory 2902 is configured to store one or more sixth programs, and the processor 2901 is configured to perform the one or more sixth programs to implement steps of the method for receiving the measurement reference signal illustrated in the embodiments described above. Alternatively, the memory 2902 is configured to store one or more seventh programs, and the processor 2901 is configured to perform the one or more seventh programs to implement steps of the signal transmission method illustrated in the embodiments described above. Alternatively, the memory 2902 is configured to store one or more eighth programs, and the processor 2901 is configured to perform the one or more eighth programs to implement steps of the signal sending method illustrated in the embodiments described above. Alternatively, the memory 2902 is configured to store one or more ninth programs, and the processor 2901 is configured to perform the one or more ninth programs to implement steps of the channel or signal receiving method illustrated in the embodiments described above. Alternatively, the memory 2902 is configured to store one or more tenth programs, and the processor 2901 is configured to perform the one or more tenth programs to implement steps of the signaling information transmission method illustrated in the embodiments described above.

It is to be understood that in some circumstances, the illustrated or described at least one step may be performed in sequences different from those described in the embodiments described above.

This embodiment further provides a computer-readable storage medium. The computer-readable storage medium includes volatile or nonvolatile and removable or non-removable media implemented in any method or technology for the storage of information (such as computer-readable instructions, data structures, computer program modules, or other data). The computer-readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital versatile disc (DVD) or other optical disc storage, a magnetic cassette, a magnetic tape, disk storage, or other magnetic storage apparatuses, or any other medium that may be used for storing desired information and accessed by a computer.

In this embodiment, the computer-readable storage medium may be configured to perform at least one of functions described below. The computer-readable storage medium may be configured to store one or more first programs, and the one or more first programs are executable by one or more processors to implement steps of the method for sending the measurement reference signal described above. The computer-readable storage medium may be configured to store one or more second programs, and the one or more second programs are executable by one or more processors to implement steps of the method for receiving the measurement reference signal described above. The computer-readable storage medium may be configured to store one or more third programs, and the one or more third programs are executable by one or more processors to implement steps of the method for sending the measurement reference signal described above. The computer-readable storage medium may be configured to store one or more fourth programs, and the one or more fourth programs are executable by one or more processors to implement steps of the method for receiving the measurement reference signal described above. The computer-readable storage medium may be configured to store one or more fifth programs, and the one or more fifth programs are executable by one or more processors to implement steps of the method for receiving the measurement reference signal described above. The computer-readable storage medium may be configured to store one or more sixth programs, and the one or more sixth programs are executable by one or more processors to implement steps of the method for receiving the measurement reference signal described above. The computer-readable storage medium may be configured to store one or more seventh programs, and the one or more seventh programs are executable by one or more processors to implement steps of the signal transmission method described above. The computer-readable storage medium may be configured to store one or more eighth programs, and the one or more eighth programs are executable by one or more processors to implement steps of the signal sending method described above. The computer-readable storage medium may be configured to store one or more ninth programs, and the one or more ninth programs are executable by one or more processors to implement steps of the channel or signal receiving method described above. The computer-readable storage medium may be configured to store one or more tenth programs, and the one or more tenth programs are executable by one or more processors to implement steps of the signaling information transmission method described above.

This embodiment further provides a computer program (or computer software) which may be distributed on a computer-readable medium and executed by a computing apparatus to implement at least one step of the methods illustrated in at least one embodiment described above. In some circumstances, the at least one step illustrated or described may be executed in sequences different from those described in the embodiments described above. Therefore, the computer program in this embodiment may include at least one of the programs described above according to specific disclosure requirements.

It is to be understood that in some circumstances, the illustrated or described at least one step may be performed in sequences different from those described in the embodiments described above.

This embodiment further provides a computer program product including a computer-readable apparatus on which the computer program illustrated above is stored. The computer-readable apparatus in this embodiment may include the computer-readable storage medium illustrated above.

It can be seen that those skilled in the art should understand that functional modules/units in all or part of the steps of the method, the system, and the apparatus disclosed above may be implemented as software (which may be implemented by computer program codes executable by a computing apparatus), firmware, hardware, and appropriate combinations thereof. In the hardware implementation, the division of the functional modules/units mentioned in the above description may not correspond to a division of physical components. For example, one physical component may have several functions or one function or step may be performed jointly by several physical components. Some or all physical components may be implemented as software executed by processors such as central processing units, digital signal processors, or microcontrollers, may be implemented as hardware, or may be implemented as integrated circuits such as disclosure-specific integrated circuits.

In addition, as is known to those of ordinary skill in the art, a communication medium generally includes computer-readable instructions, data structures, computer program modules, or other data in modulated data signals such as carriers or other transmission mechanisms and may include any information delivery medium. Therefore, the present disclosure is not limited to any particular combination of hardware and software.

The above is a more detailed description of the embodiments of the present disclosure in conjunction with specific implementations, and the specific implementations of the present disclosure cannot be construed as being limited to the description. For those of ordinary skill in the art to which the present disclosure pertains, several simple deductions or substitutions may also be made without departing from the concept of the present disclosure and should fall within the scope of the present disclosure.

What is claimed is:

1. A method for receiving a measurement reference signal, comprising:
   receiving, by a first communication node, third signaling information sent by a second communication node, wherein the third signaling information comprises information about an interference measurement resource;
   wherein an intersection between a parameter type set comprised in the information about the interference measurement resource and a parameter type set for determining a pattern of an uplink sounding reference signal (SRS) is non-empty;
   determining, by the first communication node, an interference measurement resource according to the information about the interference measurement resource;
   receiving, by the first communication node, an uplink measurement reference signal sent by a third communication node on the interference measurement resource; and
   sending, by the first communication node, channel state report information to the second communication node based on the received uplink measurement reference signal.

2. The method of claim 1, wherein the third signaling information further comprises at least one of:
   type information of the interference measurement resource which at least comprises a first-type interference measurement resource and a second-type interference measurement resource;
   type information of a non-zero power (NZP)-interference measurement resource which at least comprises a first-type NZP-interference measurement resource and a second-type NZP-interference measurement resource;
   pattern type selection information corresponding to the interference measurement resource;
   information about a group of time domain symbols occupied by the interference measurement resource in one time unit;
   information about a repetition factor of the interference measurement resource;

a frequency-hopping parameter of the interference measurement resource; or information about a multi-level bandwidth structure of the interference measurement resource.

3. The method of claim 2, further comprising at least one of:

receiving, by the first communication node on the first-type interference measurement resource, no uplink signal sent by the third communication node;

receiving, by the first communication node, a signal on the first-type interference measurement resource, wherein an intersection between a resource occupied by the first-type interference measurement resource and a resource occupied by the signal sent by the third communication node to the first communication node is empty;

receiving, by the first communication node, a downlink measurement reference signal on the first-type interference measurement resource; or receiving, by the first communication node, a downlink measurement reference signal sent by the second communication node on the first-type interference measurement resource.

4. The method of claim 2, further comprising at least one of:

receiving, by the first communication node, on the second-type interference measurement resource an uplink signal sent by the third communication node;

receiving, by the first communication node, an uplink measurement reference signal on the second-type interference measurement resource;

receiving, by the first communication node, a non-zero power sounding reference signal (NZP-SRS) on the second-type interference measurement resource;

receiving, by the first communication node, no downlink measurement reference signal sent by the second communication node on the second-type interference measurement resource;

receiving, by the first communication node, no downlink signal on the second-type interference measurement resource; or receiving, by the first communication node, a signal on the second-type interference measurement resource, wherein an intersection between a resource occupied by the second-type interference measurement resource and a resource occupied by a signal between the first communication node and the second communication node is empty.

5. The method of claim 2, wherein the pattern type selection information corresponding to the interference measurement resource is used for indicating a selection between an uplink measurement reference signal pattern and a downlink measurement reference signal pattern.

6. The method of claim 2, wherein the first-type NZP-interference measurement resource is an NZP-CSI-RS, and the second-type NZP-interference measurement resource is an NZP-SRS.

7. The method of claim 1, further comprising:

sending, by the first communication node, fourth signaling information to the third communication node, wherein the fourth signaling information is used for instructing the third communication node to send a second signal;

wherein an intersection between a resource occupied by the second signal and the resource occupied by the interference measurement resource is non-empty, and the occupied resource comprises at least one of a time domain resource, a frequency domain resource, a code domain resource, or a spatial domain resource.

8. The method of claim 1, wherein the parameter type set comprised in the third signaling information comprises at least one of:

a number of ports, a comb offset, information about a time domain symbol in one time unit, information about a time domain unit of frequency-hopping, frequency domain information, a frequency domain offset of a multi-level bandwidth structure, information about frequency-hopping, information about a sequence group hopping or a sequence number hopping, a sequence generation parameter, or selection information of a pattern type of the interference measurement reference signal;

wherein the pattern type comprises the uplink reference signal pattern and a downlink reference signal pattern.

9. The method of claim 1, further comprising:

receiving, by the first communication node, a signal on the interference measurement resource sent by a third communication node;

wherein the third communication node satisfies at least one of following characteristics:

the third communication node is a communication node that accesses the first communication node;

the third communication node is a communication node in a connected state and under coverage of the first communication node;

the first communication node sends downlink control signaling to the third communication node;

the first communication node sends dedicated downlink control signaling information to the third communication node; or the third communication node receives the third signaling information and sends the first signal to the first communication node on the interference measurement resource.

10. The method of claim 1, further comprising: sending, by the first communication node, channel state report information to the second communication node, wherein the channel state report information corresponds to CI1 interference measurement resources, wherein CI1 is a positive integer greater than or equal to 1.

11. A method for receiving channel state report information, comprising:

sending, by a second communication node, third signaling information to a first communication node, wherein the third signaling information comprises information about an interference measurement resource, the first communication node is configured to determine an interference measurement resource according to the information about an interference measurement resource and to receive an uplink measurement reference signal sent by a third communication node on the interference measurement resource determined according to the information about an interference measurement resource;

wherein an intersection between a parameter type set comprised in the information about the interference measurement resource and a parameter type set for determining a pattern of an uplink sounding reference signal (SRS) is non-empty; and receiving, by the second communication node, a-channel state report information sent by the first communication node based on the uplink measurement reference signal.

12. The method of claim 11, wherein the third signaling information further comprises at least one of:
- type information of the interference measurement resource which at least comprises a first-type interference measurement resource and a second-type interference measurement resource;
- type information of a non-zero power (NZP)-interference measurement resource which at least comprises a first-type NZP-interference measurement resource and a second-type NZP-interference measurement resource;
- pattern type selection information corresponding to the interference measurement resource;
- information about a group of time domain symbols occupied by the interference measurement resource in one time unit;
- information about a repetition factor of the interference measurement resource;
- a frequency-hopping parameter of the interference measurement resource; or
- information about a multi-level bandwidth structure of the interference measurement resource.

13. The method of claim 11, wherein the parameter type set comprised in the third signaling information comprises at least one of:
- a number of ports, a comb offset, information about a time domain symbol in one time unit, information about a time domain unit of frequency-hopping, frequency domain information, a frequency domain offset of a multi-level bandwidth structure, information about frequency-hopping, information about a sequence group hopping or a sequence number hopping, a sequence generation parameter, or selection information of a pattern type of an interference measurement reference signal;
- wherein the pattern type comprises the uplink reference signal pattern and a downlink reference signal pattern.

14. An apparatus for receiving a measurement reference signal, applied to a first communication node, comprising: a processor and a storage device, wherein the storage device stores processor-executable programs, and wherein the processor, when executing the processor-executable programs, performs:
- receiving, third signaling information sent by a second communication node, wherein the third signaling information comprises information about an interference measurement resource;
- wherein an intersection between a parameter type set comprised in the information about the interference measurement resource and a parameter type set for determining a pattern of an uplink sounding reference signal (SRS) is non-empty;
- determining, an interference measurement resource according to the information about the interference measurement resource;
- receiving, an uplink measurement reference signal sent by a third communication node on the interference measurement resource; and
- sending, channel state report information to the second communication node based on the received uplink measurement reference signal.

15. The apparatus of claim 14, wherein the third signaling information comprises at least one of:
- type information of a non-zero power (NZP)-interference measurement resource which at least comprises a first-type NZP-interference measurement resource and a second-type NZP-interference measurement resource;
- pattern type selection information corresponding to the interference measurement resource;
- information about a group of time domain symbols occupied by the interference measurement resource in one time unit;
- information about a repetition factor of the interference measurement resource;
- a frequency-hopping parameter of the interference measurement resource; or
- information about a multi-level bandwidth structure of the interference measurement resource.

16. The apparatus of claim 7 wherein the parameter type set comprised in the third signaling information comprises at least one of:
- a number of ports, a comb offset, information about a time domain symbol in one time unit, information about a time domain unit of frequency-hopping, frequency domain information, a frequency domain offset in a multi-level bandwidth structure, information about frequency-hopping, information about a sequence group hopping or a sequence number hopping, a sequence generation parameter, or selection information of a pattern type of an interference measurement reference signal;
- wherein the pattern type comprises an uplink reference signal pattern and a downlink reference signal pattern.

17. The apparatus of claim 14, wherein the third signaling information further comprises at least one of:
- type information of the interference measurement resource which at least comprises a first-type interference measurement resource and a second-type interference measurement resource;
- type information of a non-zero power (NZP)-interference measurement resource which at least comprises a first-type NZP-interference measurement resource and a second-type NZP-interference measurement resource;
- pattern type selection information corresponding to the interference measurement resource;
- information about a group of time domain symbols occupied by the interference measurement resource in one-time unit;
- information about a repetition factor of the interference measurement resource;

a frequency-hopping parameter of the interference measurement resource; or
- information about a multi-level bandwidth structure of the interference measurement resource.

18. The apparatus of claim 17, wherein the processor, when executing the processor-executable programs, further performs at least one of:
- receiving on the first-type interference measurement resource, no uplink signal sent by the third communication node;
- receiving a signal on the first-type interference measurement resource, wherein an intersection between a resource occupied by the first-type interference measurement resource and a resource occupied by the signal sent by the third communication node to the first communication node is empty;
- receiving a downlink measurement reference signal on the first-type interference measurement resource; or
- receiving a downlink measurement reference signal sent by the second communication node on the first-type interference measurement resource.

19. The apparatus of claim 17, wherein the processor, when executing the processor-executable programs, further performs at least one of:

receiving on the second-type interference measurement resource an uplink signal sent by the third communication node;

receiving an uplink measurement reference signal on the second-type interference measurement resource;

receiving a non-zero power sounding reference signal (NZP-SRS) on the second-type interference measurement resource;

receiving no downlink measurement reference signal sent by the second communication node on the second-type interference measurement resource;

receiving no downlink signal on the second-type interference measurement resource; or receiving a signal on the second-type interference measurement resource, wherein an intersection between a resource occupied by the second-type interference measurement resource and a resource occupied by a signal between the first communication node and the second communication node is empty.

* * * * *